United States Patent
You et al.

(10) Patent No.: US 12,127,171 B2
(45) Date of Patent: Oct. 22, 2024

(54) METHOD AND APPARATUS FOR SETTING SLOT FORMAT FOR IAB NODE

(71) Applicant: LG ELECTRONICS INC., Seoul (KR)

(72) Inventors: Hyangsun You, Seoul (KR); Sukhyon Yoon, Seoul (KR); Hyunsoo Ko, Seoul (KR); Haewook Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 367 days.

(21) Appl. No.: 17/597,131

(22) PCT Filed: Jun. 25, 2020

(86) PCT No.: PCT/KR2020/008282
§ 371 (c)(1),
(2) Date: Dec. 27, 2021

(87) PCT Pub. No.: WO2020/262982
PCT Pub. Date: Dec. 30, 2020

(65) Prior Publication Data
US 2022/0248399 A1 Aug. 4, 2022

Related U.S. Application Data

(60) Provisional application No. 62/888,399, filed on Aug. 16, 2019.

(30) Foreign Application Priority Data

Jun. 28, 2019 (KR) .................. 10-2019-0078336
Nov. 8, 2019 (KR) .................. 10-2019-0142919

(51) Int. Cl.
*H04B 7/155* (2006.01)
*H04L 5/00* (2006.01)
(Continued)

(52) U.S. Cl.
CPC .... *H04W 72/0446* (2013.01); *H04B 7/15507* (2013.01); *H04B 7/15542* (2013.01);
(Continued)

(58) Field of Classification Search
CPC ....... H04B 7/14–17; H04L 5/0001–26; H04W 8/22–245; H04W 28/02–26;
(Continued)

(56) References Cited

U.S. PATENT DOCUMENTS

2022/0110112 A1* 4/2022 Wei .................. H04W 72/0446

FOREIGN PATENT DOCUMENTS

WO WO-2020144654 A1 * 7/2020 ........ H04W 72/0446

OTHER PUBLICATIONS

Huawei et al., "Consideration on slot format configuration for IAB," R1-1903942, 3GPP TSG RAN WG1 Meeting #96bis, Apr. 2019, 5 pages (Year: 2019).*
(Continued)

*Primary Examiner* — Timothy J Weidner
(74) *Attorney, Agent, or Firm* — LEE, HONG, DEGERMAN, KANG & WAIMEY

(57) ABSTRACT

In the present specification, settings for a link direction and link availability of a time resource for a DU child link may be referred to as DU setting. The resource types from an IAB node DU perspective are UL, DL, and F, and the settings for availability may be classified into NA, hard resources, and soft resources, respectively. Specifically, the IAB node may receive resource setting information, wherein the resource setting information may include link direction information and availability information. The link direction information may indicate whether the type of a specific resource is UL, DL, or F, and the availability information may indicate whether a specific resource is a hard resource, an NA resource, or a soft resource. Considering the feature of
(Continued)

(a)

(b)

sharing resources in a TDM scheme between a MT and a DU in the IAB node, the present specification proposes a feature to be had by a slot format setting for the IAB node.

16 Claims, 56 Drawing Sheets

(51) Int. Cl.
    *H04W 72/0446*     (2023.01)
    *H04W 72/29*     (2023.01)
    *H04W 84/04*     (2009.01)
    *H04W 88/08*     (2009.01)
    *H04W 88/12*     (2009.01)
    *H04W 92/02*     (2009.01)
    *H04W 92/12*     (2009.01)

(52) U.S. Cl.
    CPC .......... *H04L 5/0092* (2013.01); *H04L 5/0096* (2013.01); *H04W 72/29* (2023.01); *H04W 84/047* (2013.01); *H04W 88/085* (2013.01); *H04W 88/12* (2013.01); *H04W 92/02* (2013.01); *H04W 92/12* (2013.01)

(58) Field of Classification Search
    CPC ... H04W 40/005–38; H04W 48/02–20; H04W 72/02–569; H04W 74/002–008; H04W 84/005–22; H04W 88/005–188; H04W 92/02–24

See application file for complete search history.

(56) References Cited

OTHER PUBLICATIONS

PCT International Application No. PCT/KR2020/008282, International Search Report dated Sep. 22, 2020, 2 pages.

Samsung, "Resource Multiplexing between Backhaul and Access Links," R1-1904417, 3GPP TSG RAN WG1 #96bis, Apr. 2019, 8 pages.

Lenovo et al., "Discussion on resource partitioning for IAB network," R1-1900394, 3GPP TSG RAN WG1 Ad-Hoc Meeting 1901, Jan. 2019, 10 pages.

Vivo, "Discussion on resource multiplexing among backhaul and access links," R1-1906136, 3GPP TSG RAN WG1 #97, May 2019, 7 pages.

Huawei et al., "Consideration on slot format configuration for IAB," R1-1903942, 3GPP TSG RAN WG1 Meeting #96bis, Apr. 2019, 5 pages.

NTT DOCOMO, Inc., "Mechanisms for resource multiplexing among backhaul and access links," R1-1904955, 3GPP TSG RAN WG1 #96bis, Apr. 2019, 8 pages.

\* cited by examiner (a)

METHOD AND APPARATUS FOR SETTING SLOT FORMAT FOR IAB NODE

CROSS-REFERENCE TO RELATED APPLICATIONS

This application is the National Stage filing under 35 U.S.C. 371 of International Application No. PCT/KR2020/008282, filed on Jun. 25, 2020, which claims the benefit of earlier filing date and right of priority to Korean Application Nos. 10-2019-0078336, filed on Jun. 28, 2019 and 10-2019-0142919, filed on Nov. 8, 2019, and also claims the benefit of U.S. Provisional Application No. 62/888,399, filed on Aug. 16, 2019, the contents of which are all hereby incorporated by reference herein in their entireties.

BACKGROUND OF THE DISCLOSURE

Field of the Disclosure

The present disclosure relates to a wireless communication.

Related Art

One of potential technologies which enable a future cellular network deployment scenario and application is to support a wireless backhaul and a relay link, which enables the flexible and very dense deployment of NR cells without densifying a transport network proportionally.

With the massive MIMO or the native deployment of a multi-beam system, a wider bandwidth is expected to be usable in NR in comparison with LTE (e.g., mmWave spectrum), and an opportunity for an integrated access and a development and deployment of a backhaul link occurs. This constructs a multiple control and data channel/procedure defined to provide an access for terminals and allows an easier deployment of a dense network of an NR cell which is self-backhauled of more integrated scheme. Such a system is called an integrated access and backhaul links (IAB).

In an IAB node, it may be configured a slot format configuration for a communication with a parent node and a slot format configuration for a communication with a child node/access terminal.

SUMMARY

The present disclosure provides the slot format configuration in consideration of characteristics of sharing a resources in a TDM scheme between an MT and a DU in an IAB node.

Advantageous Effects

According to a communication of an IAB node based on the slot format configuration proposed in the present disclosure, a more resource-efficient communication is available, and further, overall communication efficiency of an IAB system increases.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

FIG. 39 illustrates an example of slot formats of an MT and a DU for SDM/FDM.

FIG. 40 illustrates an example of a transmission and reception timing between IAB nodes.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
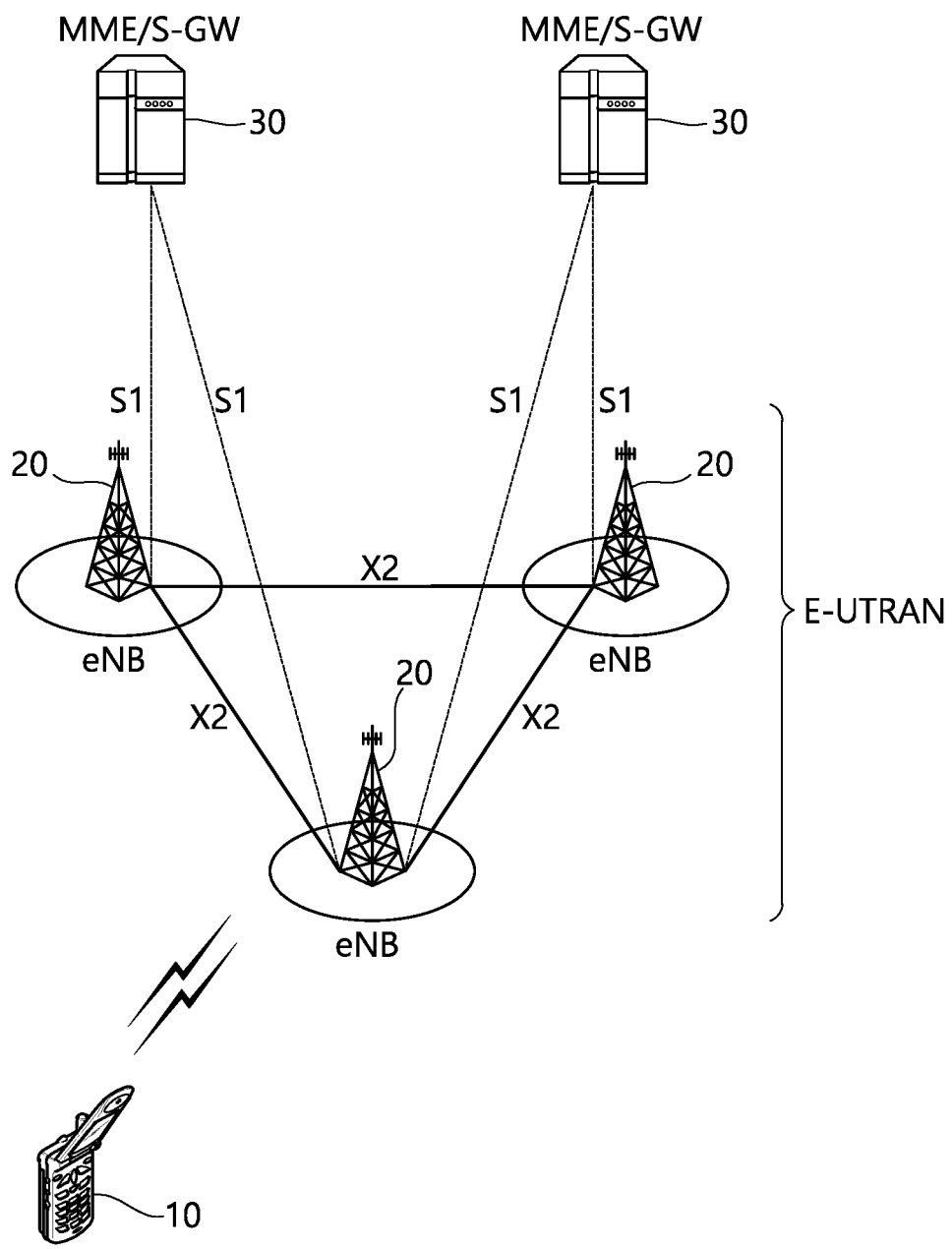
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
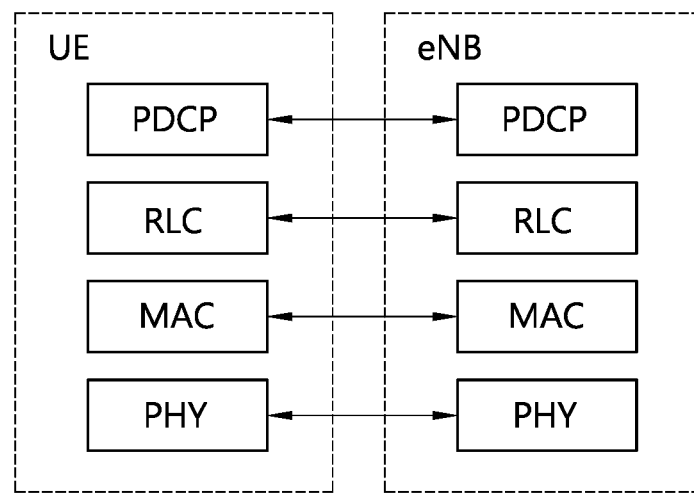
FIG. 2 is a diagram showing a wireless protocol architecture for a user plane.
Figure 3:
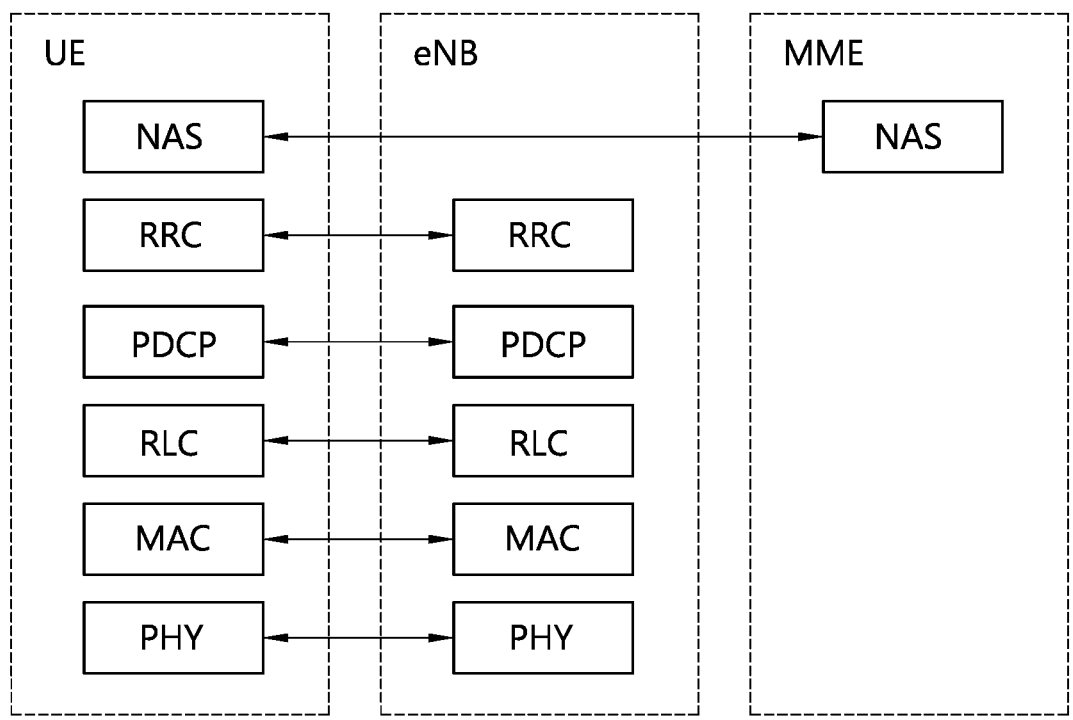
FIG. 3 is a diagram showing a wireless protocol architecture for a control plane. The user plane is a protocol stack for user data transmission.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
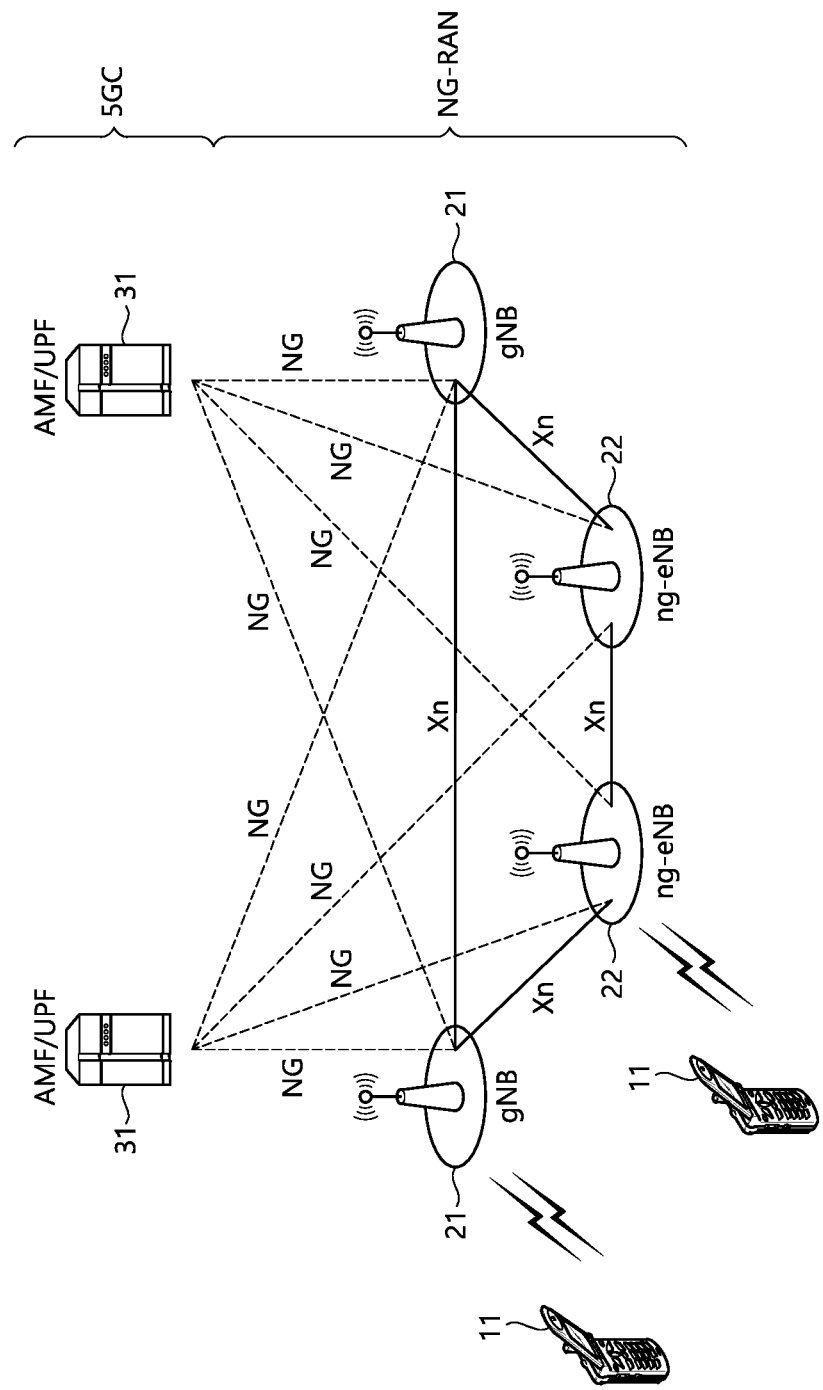
FIG. 4 shows another example of a wireless communication system to which a technical feature of the present disclosure can be applied.

FIG. 4 shows another example of a wireless communication system to which a technical feature of the present disclosure can be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5th generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
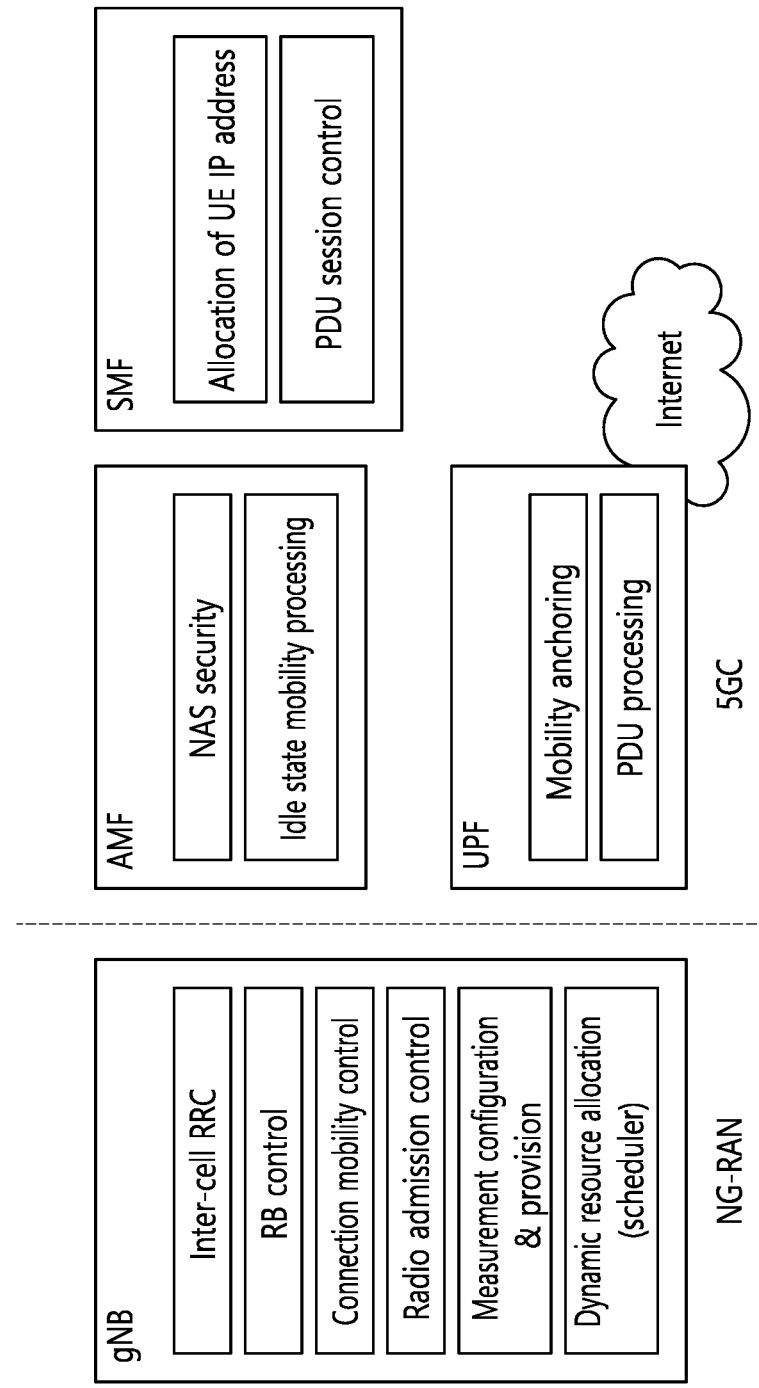
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
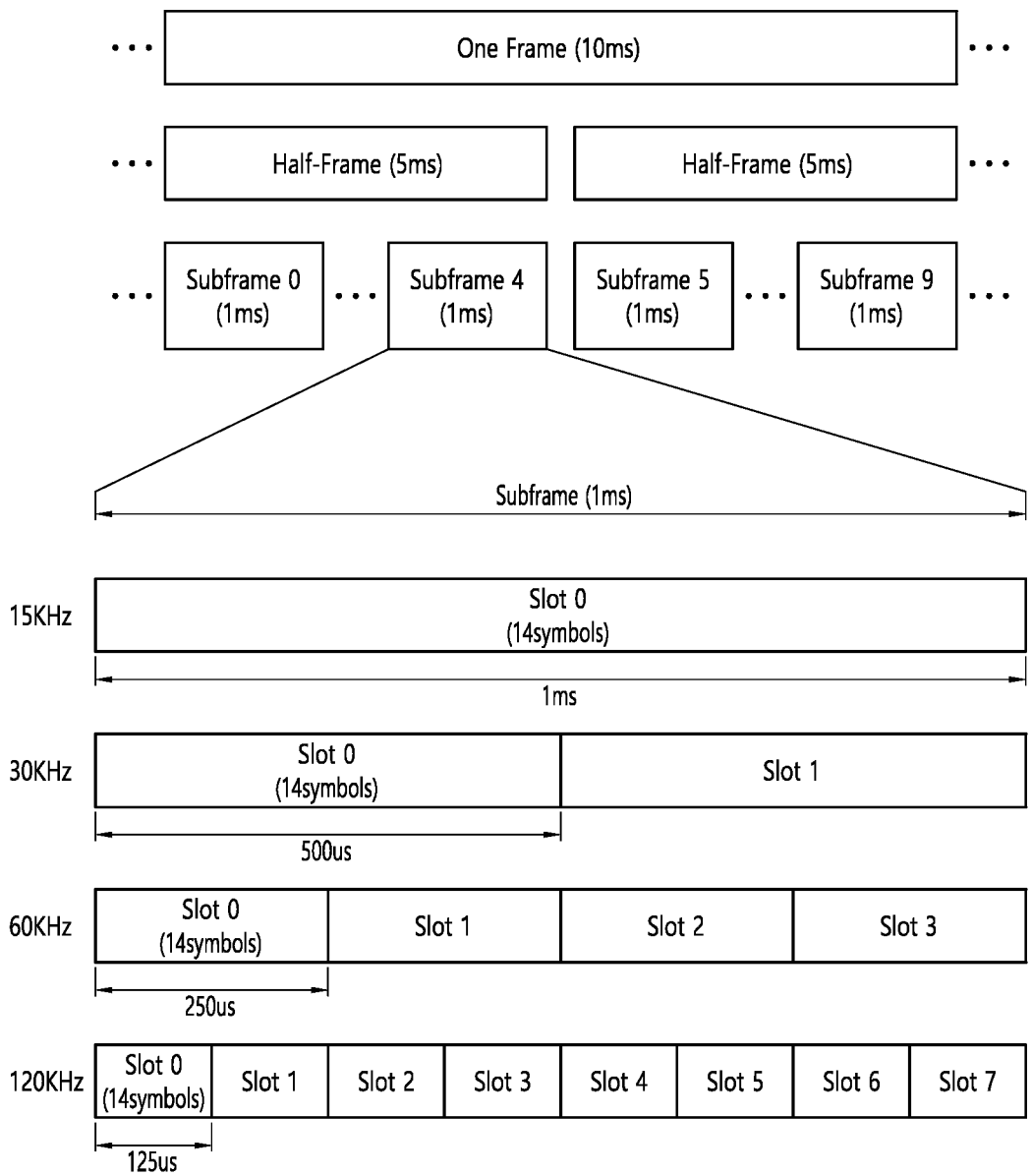
FIG. 6 illustrates a frame structure applicable in NR.

FIG. 6 illustrates a frame structure applicable in NR.

Referring to FIG. 6, a frame may be configured to have a length of 10 millisecond (ms), and may include 10 subframes each having a length of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in the SF according to a subcarrier spacing.

The following table 1 illustrates a subcarrier spacing configuration μ.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS($15*2^\mu$) | $N^{slot}_{symb}$ | $N^{frame,\mu}_{slot}$ | $N^{subframe,\mu}_{slot}$ |
|---|---|---|---|
| 60 KHz (μ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
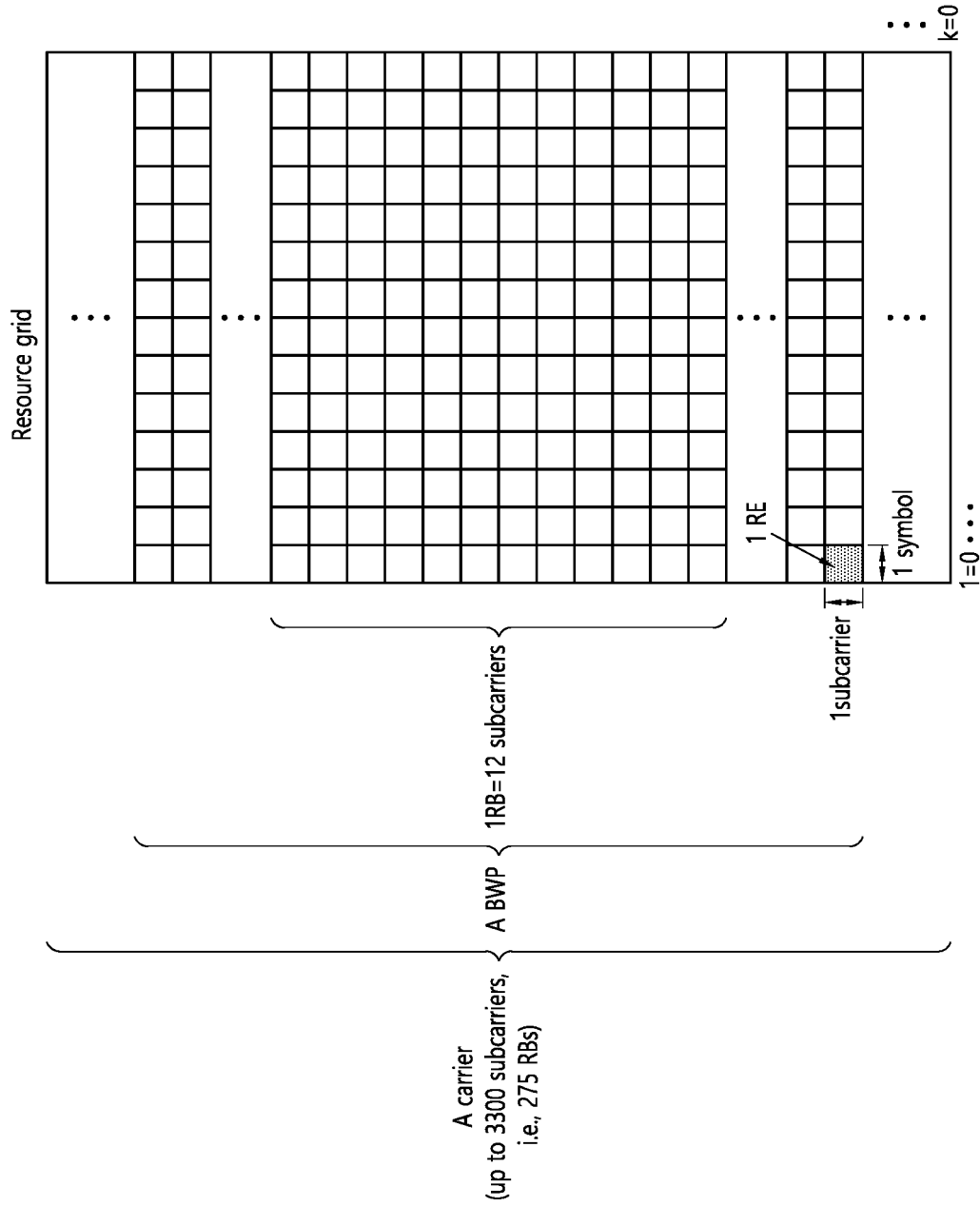
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Figure 8:
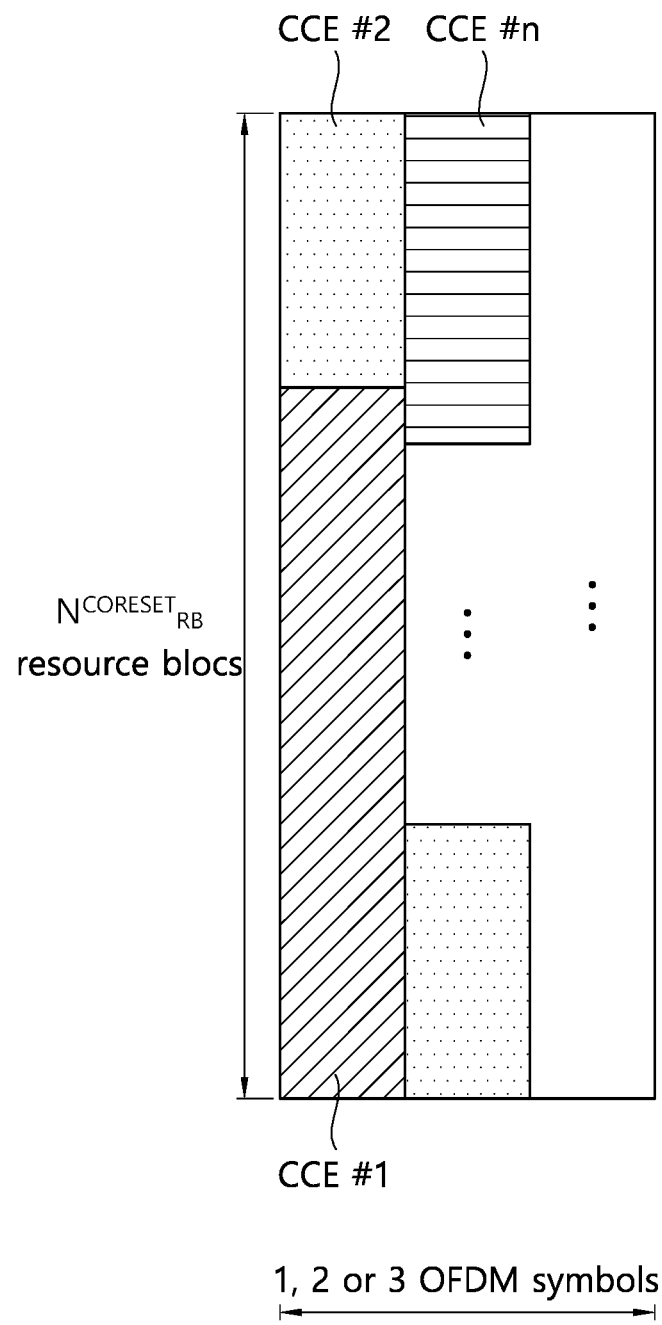
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 9:
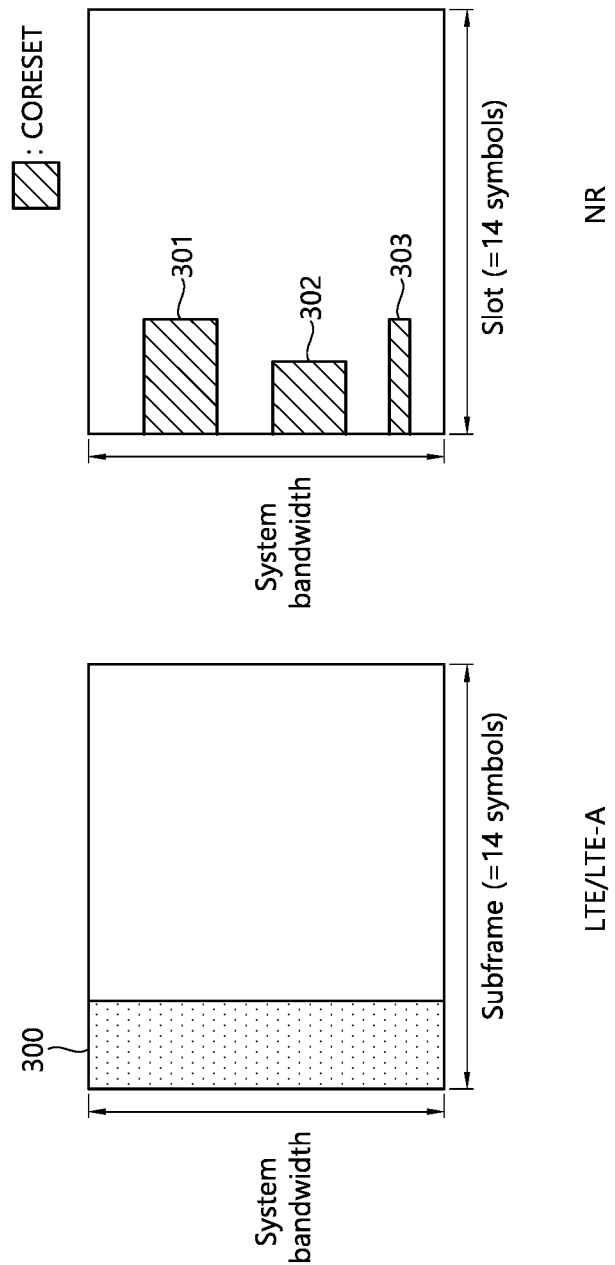
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
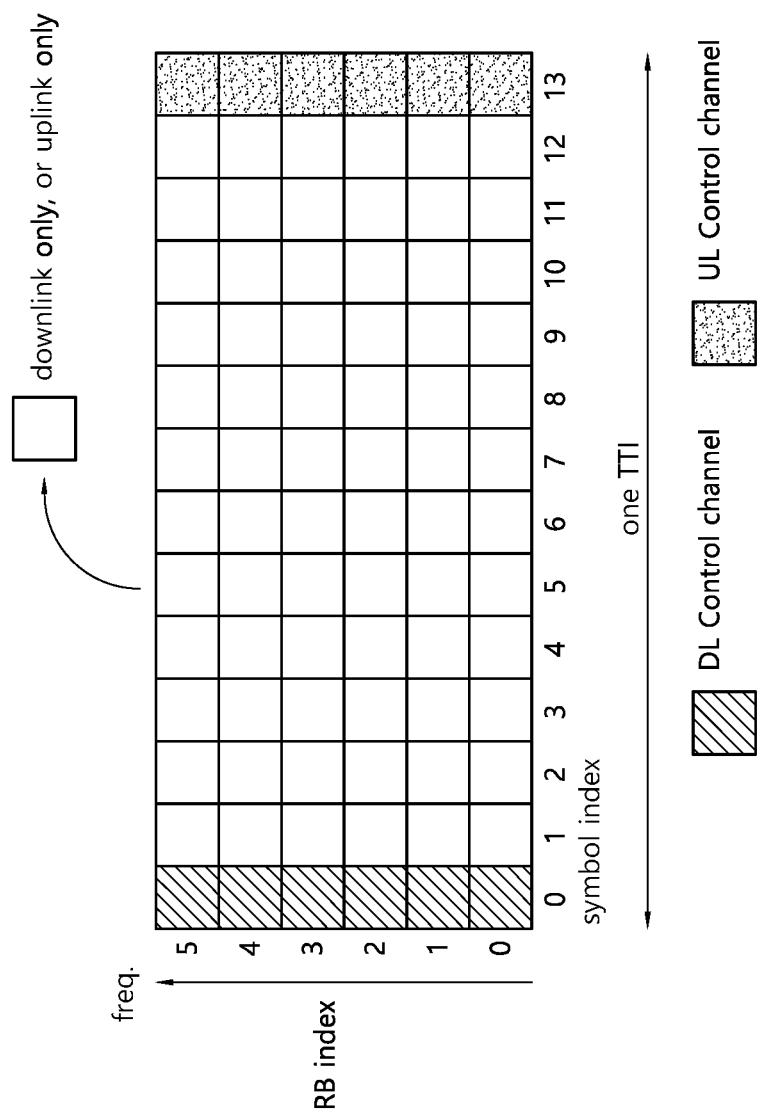
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

Figure 11:
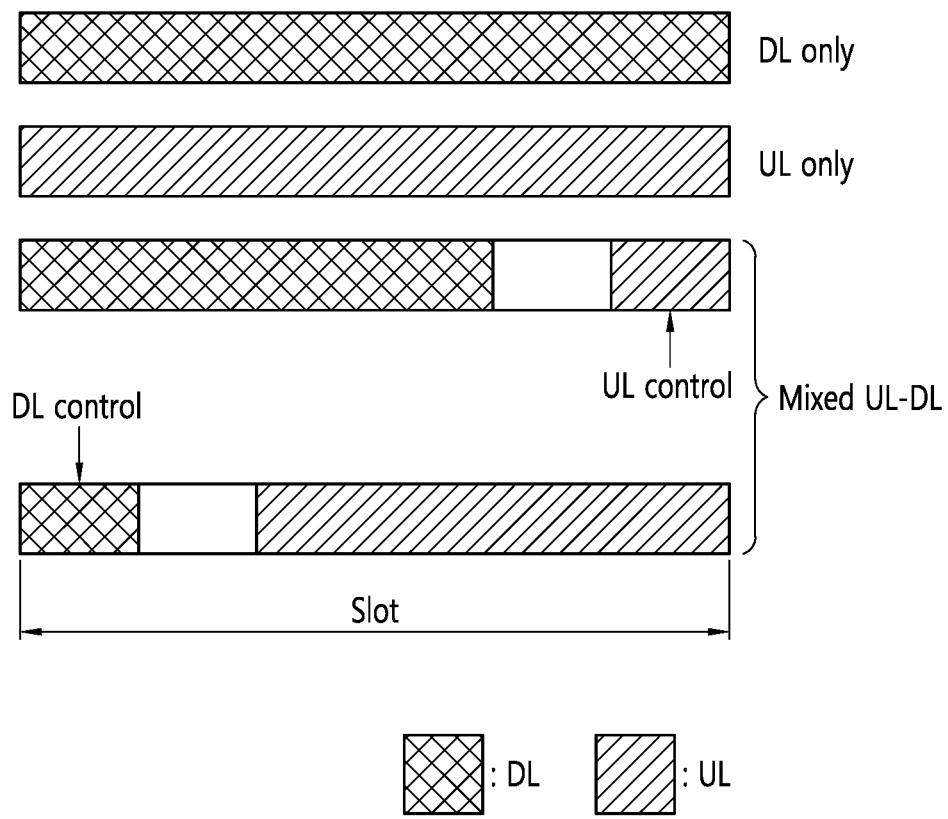
FIG. 11 illustrates a structure of a self-contained slot.

FIG. 11 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration
   DL region+Guard period (GP)+UL control region
   DL control region+GP+UL region Here, DL region may be (i) DL data region, (ii) DL control region+DL data region. UL region may be (i) UL data region, (ii) UL data region+UL control region.

A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
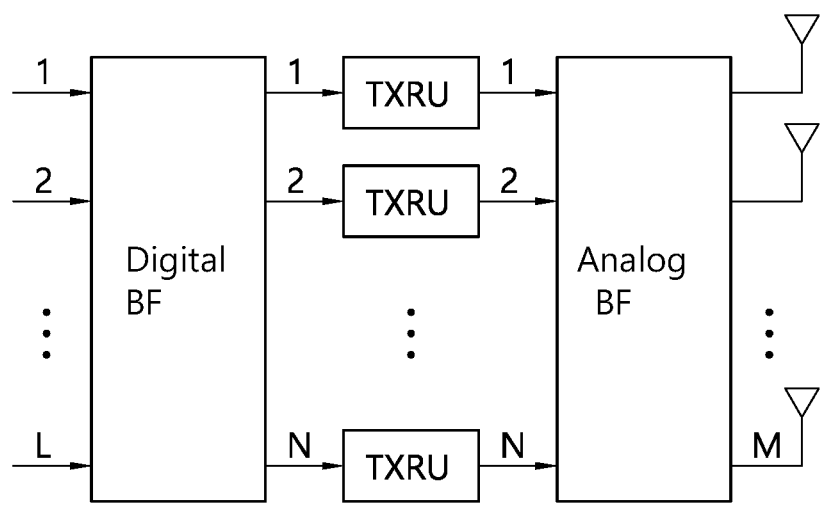
FIG. 12 is an abstract schematic diagram illustrating hybrid beamforming from the viewpoint of TXRUs and physical antennas.

FIG. 12 is an abstract schematic diagram illustrating hybrid beamforming from the viewpoint of TXRUs and physical antennas.

In FIG. 12, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 12, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 13:
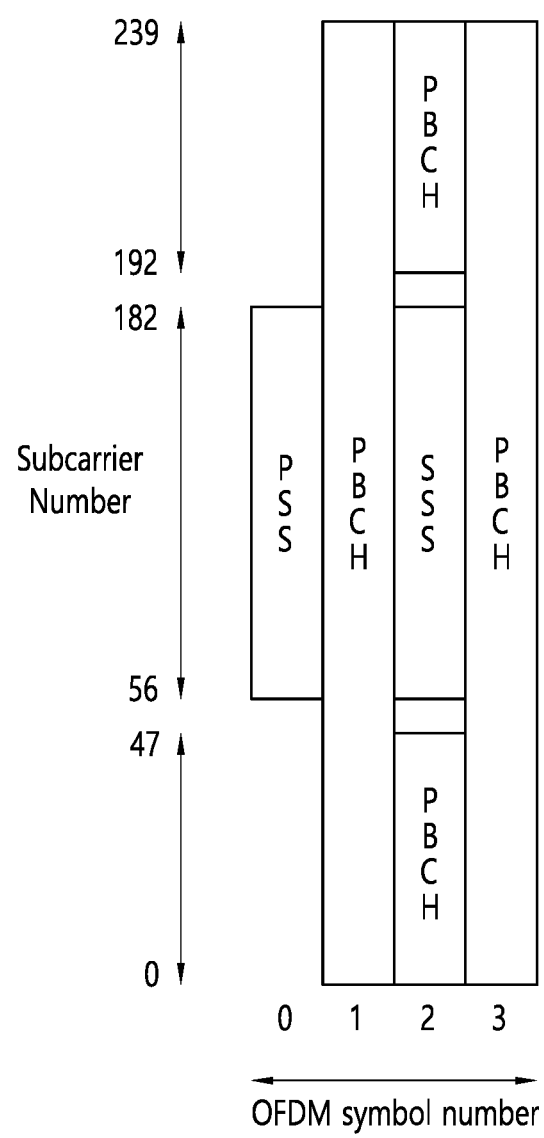
FIG. 13 schematically illustrates a synchronization signal/PBCH (SS/PBCH) block.

FIG. 13 schematically illustrates a synchronization signal/PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by $\{2, 8\}+14*n$ where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by $\{4, 8, 16, 20\}+28*n$ where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by $\{2, 8\}+14*n$ where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by $\{4, 8, 16, 20\}+28*n$ where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by $\{8, 12, 16, 20, 32, 36, 40, 44\}+56*n$ where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 14:
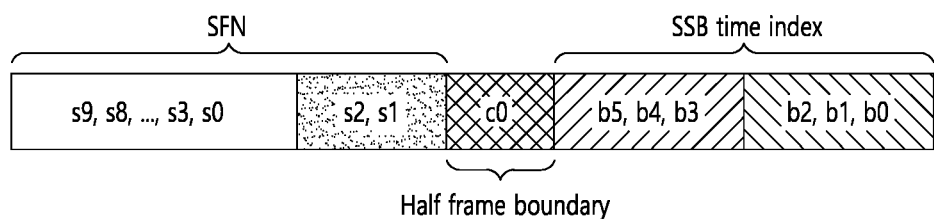
FIG. 14 illustrates a method for a UE to obtain timing information.

FIG. 14 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBS) where:

the MIB is transmitted always on a BCH according to a period of 80 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
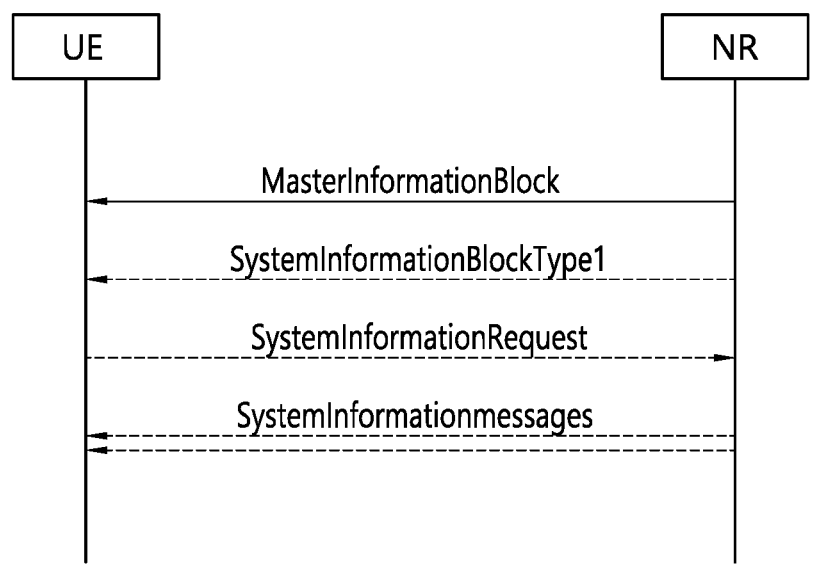
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 5.

TABLE 5

| | Type of signal | Operation/obtained information |
|---|---|---|
| Step 1 | Uplink PRACH preamble | To obtain initial beam Random election of RA-preamble ID |
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 16:
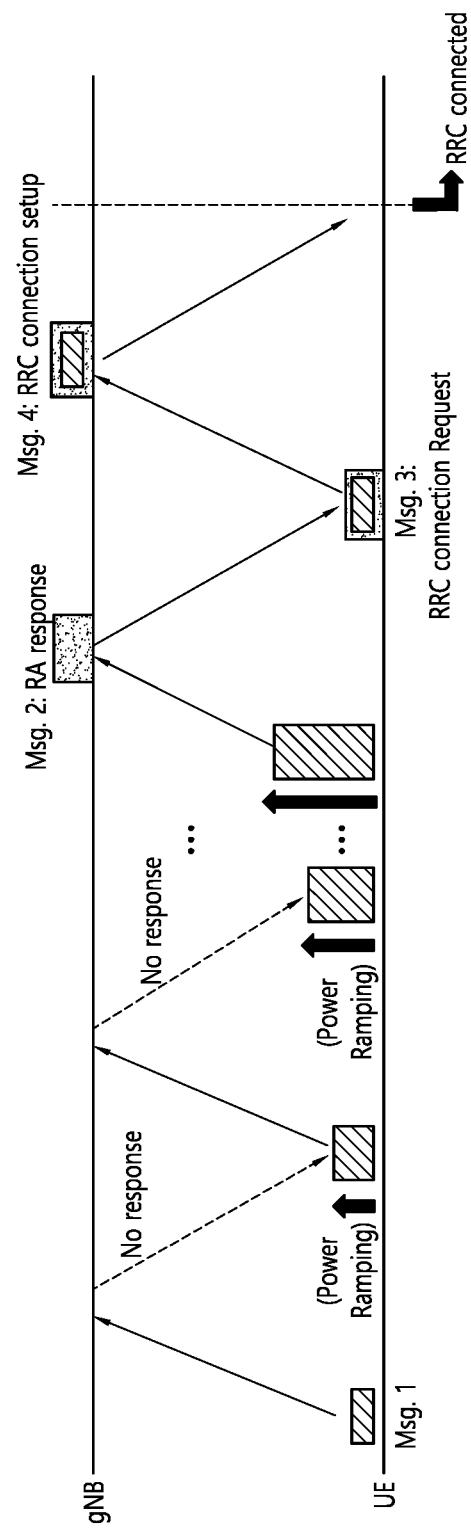
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
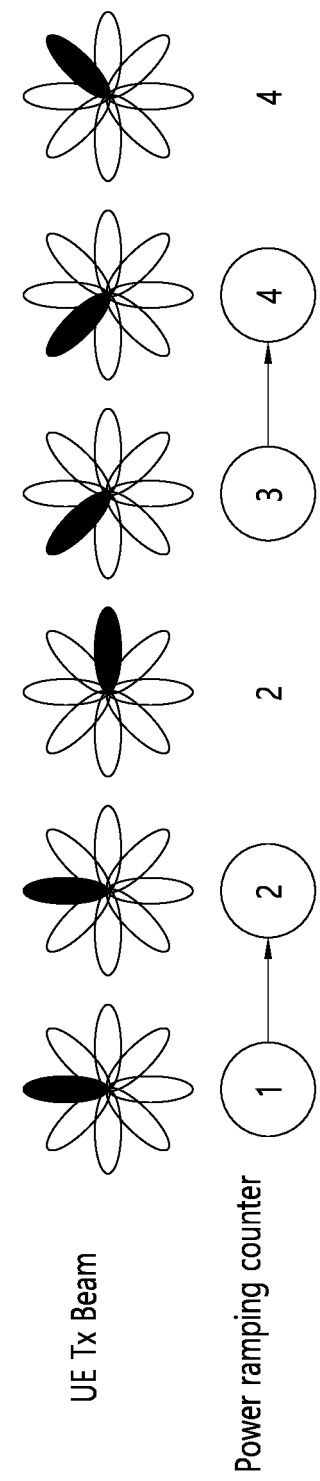
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
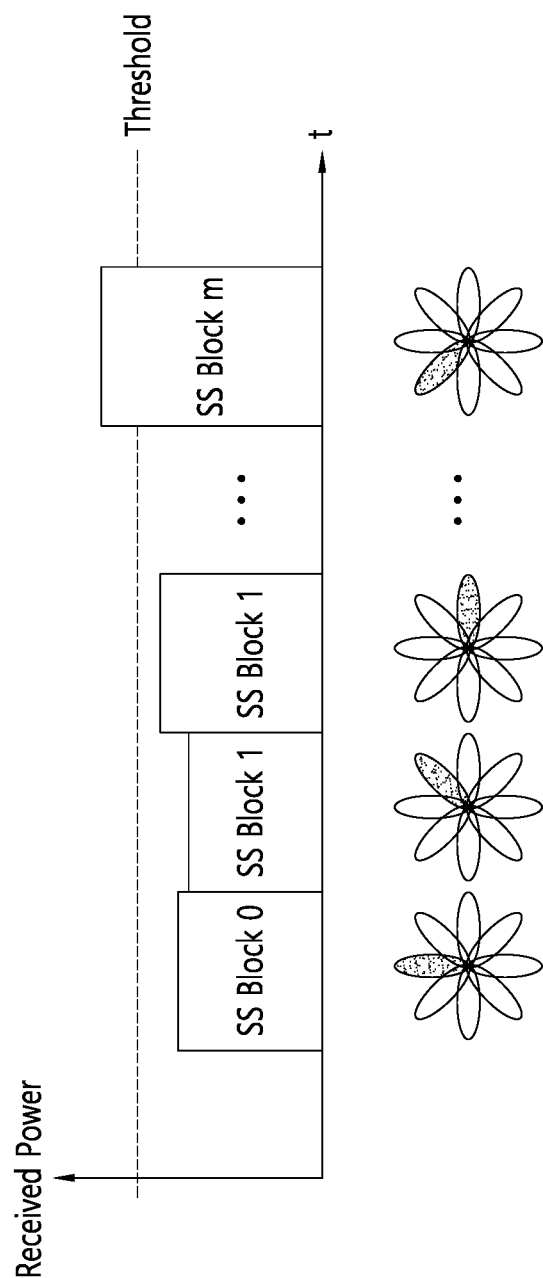
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE.
RRC_INACTIVE state: State in which a wireless connection (RRC connection) is established between a base station and a UE but is deactivated.
RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 19:
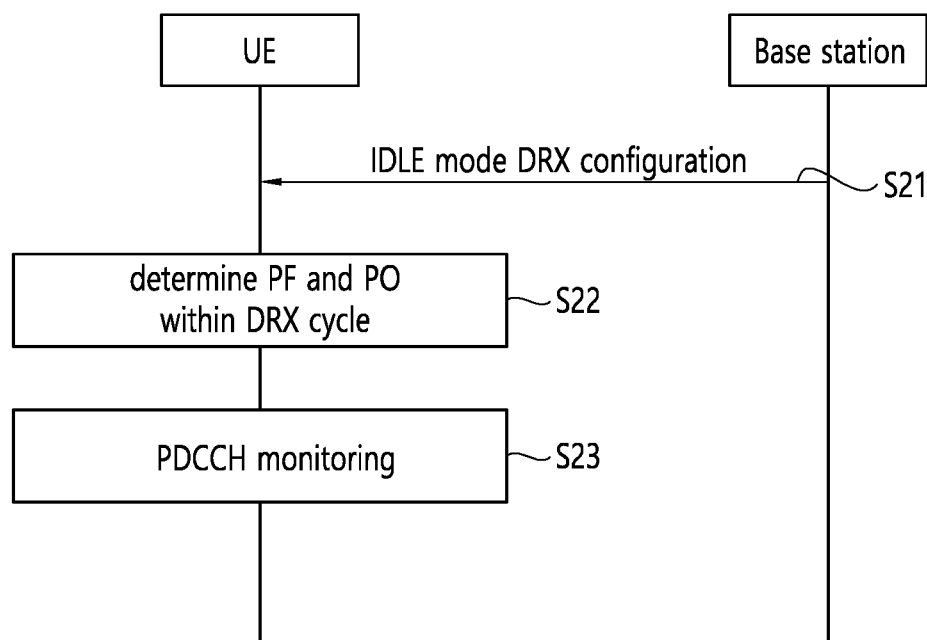
FIG. 19 is a flowchart illustrating an example of performing an idle-mode DRX operation.

FIG. 19 is a flowchart illustrating an example of performing an idle-mode DRX operation.

Referring to FIG. 19, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 20:
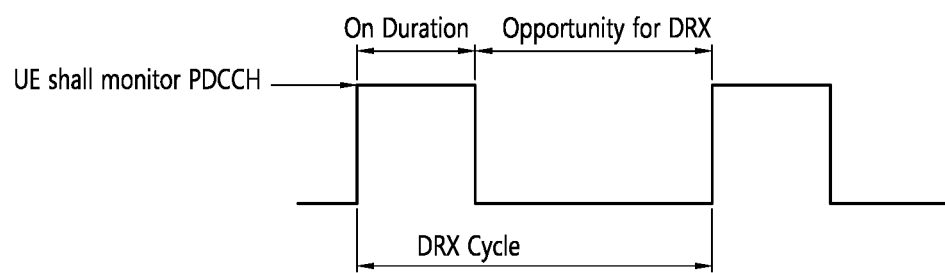
FIG. 20 illustrates a DRX cycle.

FIG. 20 illustrates a DRX cycle.

Referring to FIG. 20, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends. Therefore, when the DRX is configured, in the performing of the procedure and/or methods described/proposed above, PDCCH monitoring/reception may be performed discontinuously in a time domain. For example, when the DRX is configured, in the present disclosure, a PDCCH reception occasion (e.g., a slot having a PDCCH search space) may be configured discontinuously according to the DRX configuration. Otherwise, if the DRX is not configured, in the performing of the procedure and/or methods described/proposed above, PDCCH monitoring/reception may be performed continuously in the time domain. For example, when the DRX is not configured, in the present disclosure, a PDCCH reception occasion (e.g., a slot having a PDCCH search space) may be configured continuously. Meanwhile, regardless of whether the DRX is configured, PDCCH monitoring may be restricted in a duration configured as a measurement gap.

Table 6 shows a UE procedure related to DRX (RRC_CONNECTED state).

Referring to Table 6, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 6

| | Type of signals | UE procedure |
| --- | --- | --- |
| $1^{st}$ step | RRC signalling (MAC-CellGroupConfig) | Receive DRX configuration information |
| $2^{nd}$ step | MAC CE ((Long) DRX command MAC CE) | Receive DRX command |
| $3^{rd}$ step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a starting duration of a DRX cycle. It may be a timer related to a DRX-on duration.

Value of drx-InactivityTimer: This defines a length of a time duration in which the UE is in an awake state, after a PDCCH occasion in which a PDCCH indicating initial UL or DL data is detected.

Value of drx-HARQ-RTT-TimerDL: This defines a length of a maximum time duration until DL retransmission is received, after DL initial transmission is received.

Value of drx-HARQ-RTT-TimerDL: This defines a length of a maximum time duration until a grant for UL retransmission is received, after a grant for UL initial transmission is received.

drx-LongCycleStartOffset: This defines a time length and a starting point of a DRX cycle drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awake state.

Hereinafter, an integrated access and backhaul (IAB) link is described. For convenience of description, proposed methods are described with reference to a new RAT (NR) system. However, the proposed methods may also be applied to other systems including 3GPP LTE/LTE-A systems in addition to the NR system.

One potential technology intended to enable future cellular network deployment scenarios and applications is supporting wireless backhaul and relay links, which enables a flexible and highly dense deployment of NR cells without needing to proportionally densify a transport network. It allows for flexible and very dense deployment.

With massive MIMO or a native deployment of multi-beam system, a greater bandwidth (e.g., mmWave spectrum) is expected to be available in NR than in LTE, and thus occasions for the development and deployment of integrated access and backhaul links arise. This allows an easy deployment of a dense network of self-backhauled NR cells in an integrated manner by establishing a plurality of control and data channels/procedures defined to provide connection or access to UEs. This system is referred to as an integrated access and backhaul (IAB) link.

The following definitions are provided in the disclosure.
AC(x): Access link between node(x) and UE(s)
BH(xy): Backhaul link between node(x) and node(y)

Here, a node may refer to a donor gNB (DgNB) or a relay node (RN), where a DgNB or a donor node may be a gNB that provides a function of supporting a backhaul for IAB nodes.

In the disclosure, for convenience of description, when there are relay node 1 and relay node 2 and relay node 1 is connected to relay node 2 through a backhaul link to relay data transmitted to and received from relay node 2, relay node 1 is referred to as a parent node of relay node 2 and relay node 2 is referred to as a child node of relay node 1.

The following drawings are provided to explain specific examples of the present specification. Terms for specific devices illustrated in the drawings or terms for specific signals/messages/fields illustrated in the drawings are provided for illustration, and thus technical features of the present specification are not limited by the specific terms used in the following drawings.

Figure 21:
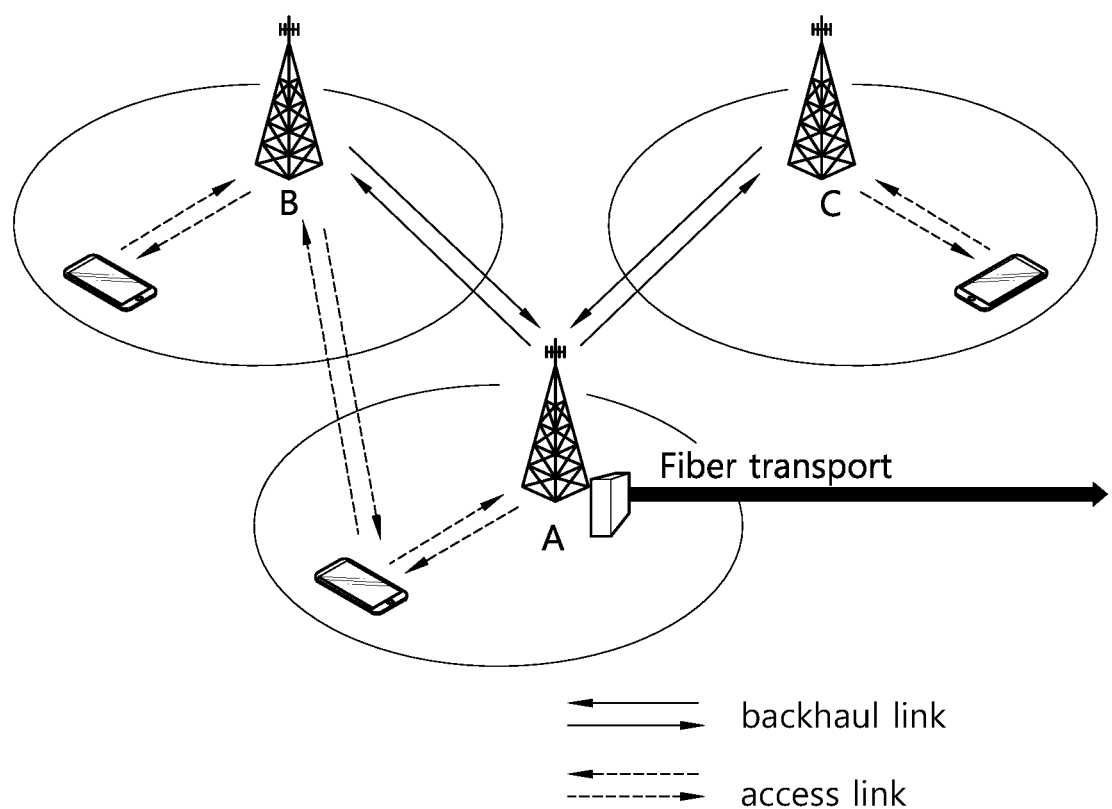
FIG. 21 schematically illustrates an example of a network having an integrated access and backhaul (IAB) link.

FIG. 21 schematically illustrates an example of a network having an integrated access and backhaul (IAB) link.

Referring to FIG. 21, relay nodes (rTRPs) may multiplex access and backhaul links in a time, frequency, or space domain (i.e., a beam-based operation).

Different links may operate on the same frequency or on different frequencies (which may be referred to as an in-band relay and an out-band relay, respectively). It is important to efficiently support out-band relays for some NR deployment scenarios, while it is crucial to understand requirements for an in-band operation involving close interworking with an access link operating on the same frequency to accommodate duplex constraints and to avoid/mitigate interference.

Furthermore, operating an NR system in a millimeter wave spectrum has unique challenges, including experiencing severe short-term blocking which may not be easily mitigated by a current RRC-based handover mechanism due to a greater scale of time required to complete the procedure than that for short-term blocking. To overcome short-term blocking in a millimeter wave system, a fast RAN-based mechanism for switching between rTRPs that does not necessarily require inclusion of a core network may be required. A demand for mitigation of short-term blocking for an NR operation in a millimeter wave spectrum, along with a demand for easier deployment of self-backhauled NR cells, raises a need for development of an integrated framework that allows fast switching of access and backhaul links. Over-the-air coordination between rTRPs may also be considered to mitigate interference and to support end-to-end path selection and optimization.

The following requirements and aspects need to be achieved by an IAB for NR.

Efficient and flexible operation for in-band and out-band relaying in indoor and outdoor scenarios Multi-hop and redundant connection End-to-end path selection and optimization Support of backhaul links with high spectral efficiency Support of legacy NR terminals;

Legacy NR is designed to support half-duplex devices. Thus, half duplex may be supported and useful in an IAB scenario. Furthermore, IAB devices with full duplex may also be considered.

In an IAB scenario, when each relay node (RN) does not have scheduling capability, a donor gNB (DgNB) needs to schedule all links between the DgNB, related relay nodes, and UEs. That is, the DgNB needs to determine scheduling of all the links by collecting traffic information from all the related relay nodes and needs to report scheduling information to each node.

On the other hand, distributed scheduling may be performed when each relay node has scheduling capability. Distributed scheduling enables immediate scheduling in response to an uplink scheduling request from a UE and allows a backhaul/access link to be flexibly used by reflecting surrounding traffic conditions.

Figure 22:
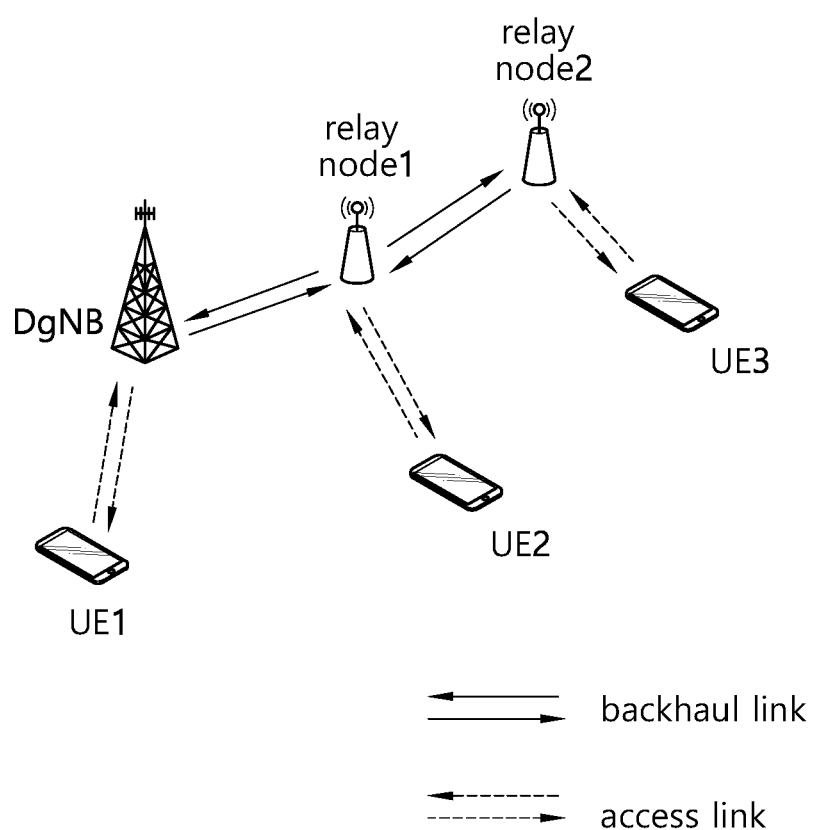
FIG. 22 schematically illustrates an example of the configuration of access and backhaul links.

FIG. 22 schematically illustrates an example of the configuration of access and backhaul links.

FIG. 22 shows an example in which a backhaul link and an access link are configured when there are a DgNB and IAB relay nodes (RNs). DgNB and RN1 are connected via a backhaul link, RN2 is connected to RN1 via a backhaul link, DgNB and UE1 are connected via an access link, RN1 and UE2 are connected via an access link, and RN2 and UE3 are connected via an access link.

Referring to FIG. 22, the DgNB receives not only a scheduling request from UE1 but also scheduling requests from UE2 and UE3. The DgNB determines scheduling of two back links and three access links and reports scheduling results. This centralized scheduling involves a scheduling delay and incurs latency.

On the other hand, distributed scheduling may be performed when each relay node has scheduling capability. Accordingly, it is possible to perform immediate scheduling in response to an uplink scheduling request from a UE terminal and to flexibly use backhaul/access links by reflecting surrounding traffic conditions.

Figure 23:
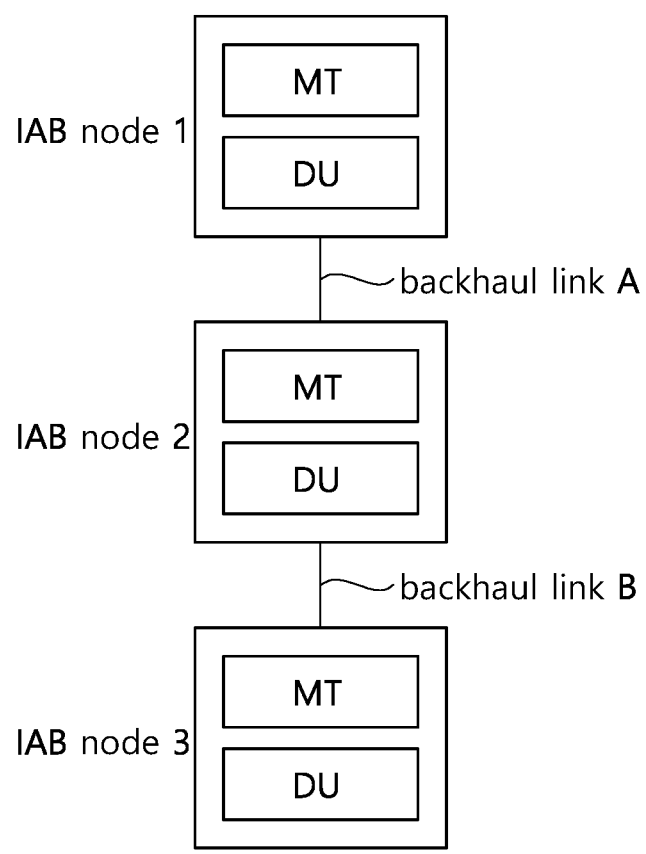
FIG. 23 illustrates a link and relationship between IAB nodes.

FIG. 23 illustrates a link and relationship between IAB nodes.

Referring to FIG. 23, IAB node 1 is connected with IAB node 2 through backhaul link A. With respect to backhaul link A, IAB node 1 is a parent node of IAB node 2, and IAB node 2 is a child node of IAB node 1. IAB node 2 is connected with IAB node 3 via backhaul link B. With respect to backhaul link B, IAB node 2 is a parent node of IAB node 3, and IAB node 3 is a child node of IAB node 2.

Here, each IAB node may perform two functions. One is a mobile termination (MT), which maintains a wireless backhaul connection to a higher IAB node or a donor node as, and the other is a distributed unit (DU), which provides an access connection with UEs or a connection with an MT of a lower IAB node.

For example, for IAB node 2, a DU of IAB node 2 functionally establishes backhaul link B with an MT of IAB node 3, and an MT of IAB node 2 functionally establishes backhaul link A with a DU of IAB node 1. Here, a child link of the DU of IAB node 2 may refer to backhaul link B between IAB node 2 and IAB node 3. A parent link of the MT of IAB node 2 may refer to backhaul link A between IAB node 2 and IAB node 1.

Hereinafter, initial access of an IAB node is described.

An IAB node may follow the same initial access procedure as used for a UE including cell search, system information acquisition, and random access in order to initially establish a connection to a parent node or a donor node. SSB/CSI-RS-based RRM measurement is the start point of IAB node discovery and measurement.

A method for avoiding a collision in SSB configuration between IAB nodes and an inter-IAB discovery procedure applying the feasibility of discovering an IAB node on the basis of a CSI-RS, half-duplex constraints, and multi-hop topology need to be taken into consideration. In view of a cell ID used by a given IAB node, the following two cases may be considered.

Case 1: Donor node and IAB node share the same cell ID.

Case 2: Donor node and IAB node retain separate cell IDs.

Further, a mechanism for multiplexing RACH transmissions from UEs and RACH transmissions from IAB nodes also needs to be considered.

Hereinafter, backhaul link measurement is described.

It is necessary to consider measuring a plurality of backhaul links for link management and path selection. To support half-duplex constraints from the perspective of a given IAB node, IAB supports detecting and measuring candidate backhaul links (after initial access) using resources orthogonal to resources used an access UEs for cell detection and measurement. Here, the following aspects may be further considered.

TDM of a plurality of SSBs (e.g., according to hop order, cell ID, or the like)

SSB muting across IAB nodes

Multiplexing of SSBs for access UEs and IAB nodes in a half frame or across half frames IAB node discovery signal (e.g., CSI-RS) that is TDMed with SSB transmission Use of off-raster SSB Transmission period for backhaul link detection and measurement, which is different from a period used by access UEs.

It is necessary to further consider a coordination mechanism for different solutions including a coordination mechanism for measurement time and reference signal (RS) transmission for IAB nodes.

It may be considered to enhance an SMTC and a CSI-RS configuration in order to support RRM measurement for IAB nodes.

Hereinafter, backhaul link management is described.

An IAB node supports a mechanism for detecting/recovering a backhaul link failure. It may be further considered to improve a radio link monitoring reference signal (RLM RS) and related procedures for IAB.

Hereinafter, a mechanism for path switching or transmission/reception in a plurality of backhaul links is described.

It is necessary to consider a mechanism for simultaneous and efficient path switching or transmission/reception in a plurality of backhaul links (e.g., a multi-Tx/Rx (TRP) operation and intra-frequency dual connectivity).

Hereinafter, scheduling of backhaul and access links is described.

Downlink transmission of an IAB node (i.e., transmission from the IAB node to a child IAB node served by the IAB node via a backhaul link and transmission from the IAB node to UEs served by the IAB node via an access link) may be scheduled by the IAB node itself. Uplink transmission of the IAB node (i.e., transmission from the IAB node to a parent IAB node thereof or a donor node via a backhaul link) may be scheduled by the parent IAB node or the donor node.

Hereinafter, multiplexing of backhaul and access links is described.

In IAB, an IAB node supports time-division multiplexing (TDM), frequency-division multiplexing (FDM), and spatial-division multiplexing (SDM) between access and backhaul links according to half-duplex constraints. It is necessary to consider an efficient TDM/FDM/SDM mechanism for access/backhaul traffic over a multi-hop considering the half-duplex constraints of the IAB node. For various multiplexing options, the following aspects may be further considered.
- Mechanism for orthogonally partitioning time slots or frequency resources between access and backhaul links over one or a plurality of hops
- Use of different DL/UL slot configurations for access and backhaul links
- DL and UL power control enhancement and timing requirements to allow intra-panel FDM and SDM in backhaul and access links
- Interference management including cross-link interference.

Hereinafter, resource coordination is described.

It is necessary to consider a mechanism for scheduling coordination, resource allocation, and path selection across an IAB node/donor node and a plurality of backhaul hops. It is necessary to support semi-static coordination of resources (frequency, time in terms of slot/slot format, or the like) for IAB nodes (in timescale of RRC signaling). The following aspects may be further considered.
- Distributed or centralized coordination mechanism
- Resource granularity (e.g., TDD configuration pattern) of a necessary signal
- Exchange of layer-1 (L1) and/or layer-3 (L3) measurements between IAB nodes
- Exchange of information about topology affecting the design of a physical layer of a backhaul link (e.g., hop order)
- Coordination of resources (frequency, time in terms of slot/slot format, or the like) faster than semi-static coordination Hereinafter, IAB node synchronization and timing alignment are described.

It is necessary to consider the feasibility of over-the-air (OTA) synchronization and the effect of timing misalignment on IAB performance (e.g., the number of supportable hops). It is necessary to consider a mechanism for timing alignment over multi-hop NR-IAB networks. IAB supports timing advance (TA)-based synchronization between IAB nodes including a plurality of backhaul hops. It is necessary to further consider improving an existing timing alignment mechanism.

The following cases of transmission timing alignment between IAB nodes and donor nodes need to be further taken into consideration.
- Case 1: DL transmission timing alignment over IAB nodes and donor nodes
- Case 2: DL and UL transmission timing alignment within an IAB Node
- Case 3: DL and UL reception timing alignment within an IAB Node
- Case 4: Transmission in Case 2 during reception in Case 3 within an IAB node
- Case 5: Case 1 for access link timing and Case 4 for backhaul link timing in different time slots The following levels of alignments need to be considered between an IAB node/donor node or within an IAB node:
- Slot-level alignment
- Symbol-level alignment
- No alignment.

TDM/FDM/SDM of access and backhaul links, the impact of cross-link interference in different cases, and the impact of access UEs may be further considered.

Hereinafter, cross-link interference measurement and management is described.

The impact of cross-link interference (CLI) on access and backhaul links (including a plurality of hops) may be considered. Further, methods for interference measurement and management need to be considered.

Hereinafter, a CLI mitigation technique is described.

A CLI mitigation technique including advanced receiver and transmitter coordination needs to be considered, and priorities need to be determined in terms of complexity and performance. The CLI mitigation technique needs to be able to manage the following inter-IAB interference scenarios.
- Case 1: A victim IAB node performs DL reception via an MT thereof, and an interfering IAB node performs UL transmission via an MT thereof
- Case 2: A victim IAB node performs DL reception via an MT thereof, and an interfering IAB node performs DL transmission via a DU thereof
- Case 3: A victim IAB node performs UL reception via a DU thereof, and an interfering IAB node performs UL transmission via an MT thereof
- Case 4: A victim IAB node performs UL reception via a DU thereof, and an interfering IAB node performs DL transmission via a DU thereof When a given IAB node performs FDM/SDM reception between access and backhaul links, interference experienced by the IAB node needs to be further taken into consideration.

Hereinafter, spectral efficiency enhancement is described.

It is necessary to consider supporting 1024 quadrature amplitude modulation (QAM) for a backhaul link.

Figure 24:
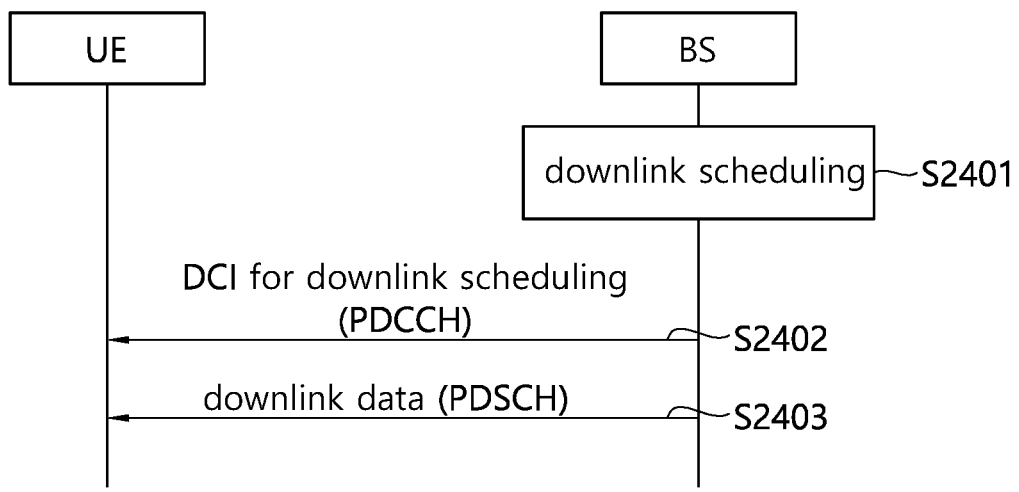
FIG. 24 is a diagram illustrating an example of a downlink transmission/reception operation.

FIG. 24 is a diagram illustrating an example of a downlink transmission/reception operation.

Referring to FIG. 24, the base station schedules downlink transmission such as frequency/time resources, transport layer, downlink precoder, MCS, and the like (S2401). In particular, the base station may determine a beam for PDSCH transmission to the terminal through the beam management operations described above. Then, the terminal receives downlink control information (DCI) for downlink scheduling (that is, including scheduling information of the PDSCH) on the PDCCH from the base station (S2402). DCI format 1_0 or 1_1 may be used for downlink scheduling, and in particular, DCI format 1_1 includes the following information: Identifier for DCI formats, Bandwidth part indicator, Frequency domain resource assignment, Time domain resource assignment, PRB bundling size indicator, Rate matching indicator, ZP CSI-RS trigger, Antenna port(s), transmission configuration indication (TCI), SRS request, DMRS (Demodulation Reference Signal) sequence initialization.

In particular, according to each state indicated in the antenna port(s) field, the number of DMRS ports may be scheduled, and single-user (SU)/multi-user (MU) transmission scheduling is possible. In addition, the TCI field consists of 3 bits, and the QCL for the DMRS is dynamically indicated by indicating a maximum of 8 TCI states according to the TCI field value. Then, the terminal receives downlink data from the base station on the PDSCH (S2403). When the UE detects a PDCCH including DCI format 1_0 or 1_1, it decodes the PDSCH according to an indication by the corresponding DCI.

Here, when the terminal receives a PDSCH scheduled by DCI format 1, the terminal may be configured for a DMRS configuration type by a higher layer parameter 'dmrs-Type', and the DMRS type is used to receive the PDSCH. In addition, the terminal may be configured for the maximum number of front-loaded DMRS symbols for the PDSCH by the upper layer parameter 'maxLength'.

For DMRS configuration type 1, when a single codeword is scheduled for the terminal and an antenna port mapped with an index of {2, 9, 10, 11 or 30} is specified, or if the terminal is scheduled with two codewords, the terminal assumes that all remaining orthogonal antenna ports are not associated with PDSCH transmission to another terminal. Or, in the case of DMRS configuration type 2, when a single codeword is scheduled for the terminal and an antenna port mapped with an index of {2, 10 or 23} is specified, or if the terminal is scheduled with two codewords, the terminal assumes that all remaining orthogonal antenna ports are not associated with PDSCH transmission to another terminal.

When the terminal receives the PDSCH, it may be assumed that the precoding granularity P' is consecutive resource blocks in the frequency domain. Here, P' may correspond to one of {2, 4, broadband}. If P' is determined to be a broadband (wideband), the terminal does not expect to be scheduled with non-contiguous PRBs, and the terminal may assume that the same precoding is applied to the allocated resource. On the other hand, when P' is determined to be any one of {2, 4}, a precoding resource block group (PRG) is divided into P' consecutive PRBs. The actual number of consecutive PRBs in each PRG may be one or more. The terminal may assume that the same precoding is applied to consecutive downlink PRBs in the PRG.

In order for the terminal to determine a modulation order, a target code rate, and a transport block size in the PDSCH, the terminal first reads the 5-bit MCD field in the DCI, and determines the modulation order and the target code rate. Then, the terminal reads the redundancy version field in the DCI and the redundancy version is determined. Then, the terminal determines a transport block size by using the number of layers before rate matching and the total number of allocated PRBs.

Figure 25:
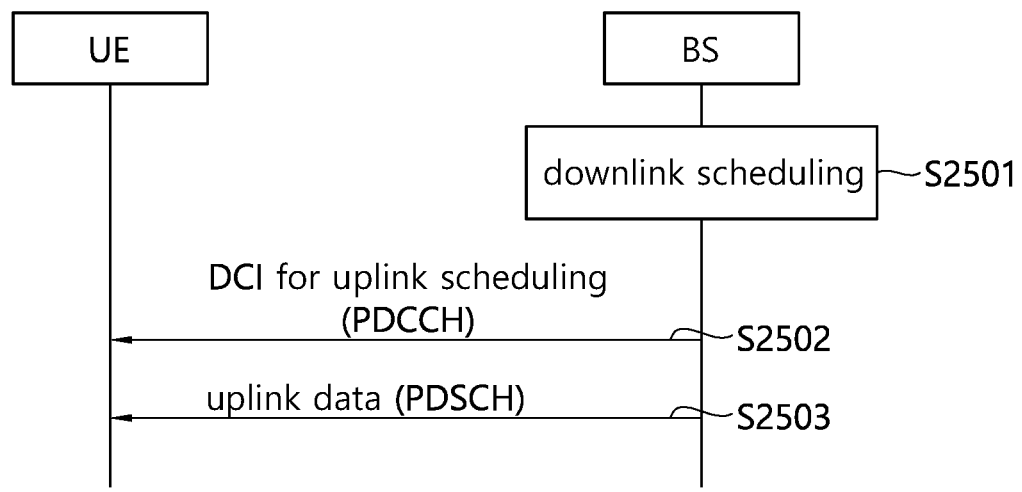
FIG. 25 is a diagram illustrating an example of an uplink transmission/reception operation.

FIG. 25 is a diagram illustrating an example of an uplink transmission/reception operation.

Referring to FIG. 25, the base station schedules uplink transmission such as frequency/time resources, a transport layer, an uplink precoder, an MCS, and the like (S2501).

In particular, the base station can determine the beam for the terminal for PUSCH transmission through the beam management operations described above. Then, the terminal receives the DCI for uplink scheduling (that is, including the scheduling information of the PUSCH) on the PDCCH from the base station (S2502). DCI format 0_0 or 0_1 may be used for uplink scheduling. In particular, DCI format 0_1 includes the following information: Identifier for DCI formats, UL/SUL indicator, Bandwidth part indicator, Frequency domain resource assignment, Time domain resource assignment, Frequency hopping flag, MCS: Modulation and coding scheme, SRI: SRS resource indicator, Precoding information and number of layers, Antenna port(s), SRS request, DMRS sequence initialization, UL-SCH indicator.

In particular, SRS resources configured in the SRS resource set associated with the higher layer parameter 'usage' may be indicated by the SRS resource indicator field. In addition, 'spatialRelationInfo' may be configured for each SRS resource, and the value may be one of {CRI, SSB, SRI}.

Then, the terminal transmits uplink data to the base station on the PUSCH (S2503). When the terminal detects a PDCCH including DCI format 0_0 or 0_1, the terminal transmits a corresponding PUSCH according to an indication by the corresponding DCI. For PUSCH transmission, two transmission schemes are supported: codebook-based transmission and non-codebook-based transmission.

In the case of codebook-based transmission, when the upper layer parameter 'txConfig' is set to 'codebook', the terminal is set to codebook-based transmission. On the other hand, when the upper layer parameter 'txConfig' is set to 'nonCodebook', the terminal is set to non-codebook-based transmission. If the upper layer parameter 'txConfig' is not set, the terminal does not expect to be scheduled by DCI format 0_1. When PUSCH is scheduled by DCI format 0_0, PUSCH transmission is based on a single antenna port. In the case of codebook-based transmission, the PUSCH may be scheduled in DCI format 0_0, DCI format 0_1, or semi-statically. If this PUSCH is scheduled by DCI format 0_1, as given by the SRS resource indicator field and the precoding information and number of layers field, a PUSCH transmission precoder is determined based on a SRI, a transmit precoding matrix indicator (TPMI), and a transmission rank from DCI. The TPMI is used to indicate a precoder to be applied across an antenna port, and corresponds to the SRS resource selected by the SRI when multiple SRS resource are configured. Alternatively, when a single SRS resource is configured, the TPMI is used to indicate a precoder to be applied across an antenna port, and corresponds to the single SRS resource. A transmission precoder is selected from the uplink codebook having the same number of antenna ports as the upper layer parameter 'nrofSRS-Ports'. When the upper layer in which the terminal is set to 'codebook' is set to the parameter 'txConfig', at least one SRS resource is configured in the terminal. The SRI indicated in slot n is associated with the most recent transmission of the SRS resource identified by the SRI, where the SRS resource precedes the PDCCH carrying the SRI (i.e., slot n).

In the case of non-codebook-based transmission, the PUSCH may be scheduled in DCI format 0_0, DCI format 0_1, or semi-statically. When multiple SRS resources are configured, the UE may determine a PUSCH precoder and a transmission rank based on wideband SRI, where the SRI is given by an SRS resource indicator in DCI or a higher layer parameter 'srs-ResourceIndicator'. The UE uses one or multiple SRS resources for SRS transmission, where the number of SRS resources may be configured for simultaneous transmission within the same RB based on UE capabilities. Only one SRS port is configured for each SRS resource. Only one SRS resource may be set as the upper layer parameter 'usage' set to 'nonCodebook'. The maximum number of SRS resources that can be configured for non-codebook-based uplink transmission is 4. The SRI indicated in slot n is associated with the most recent transmission of the SRS resource identified by the SRI, where the SRS transmission precedes the PDCCH carrying the SRI (i.e., slot n).

Hereinafter, an uplink grant will be described.

In NR, an uplink grant can be divided into (1) a dynamic grant, or with grant and (2) a configured grant, or grant free or without grant.

Figure 26:
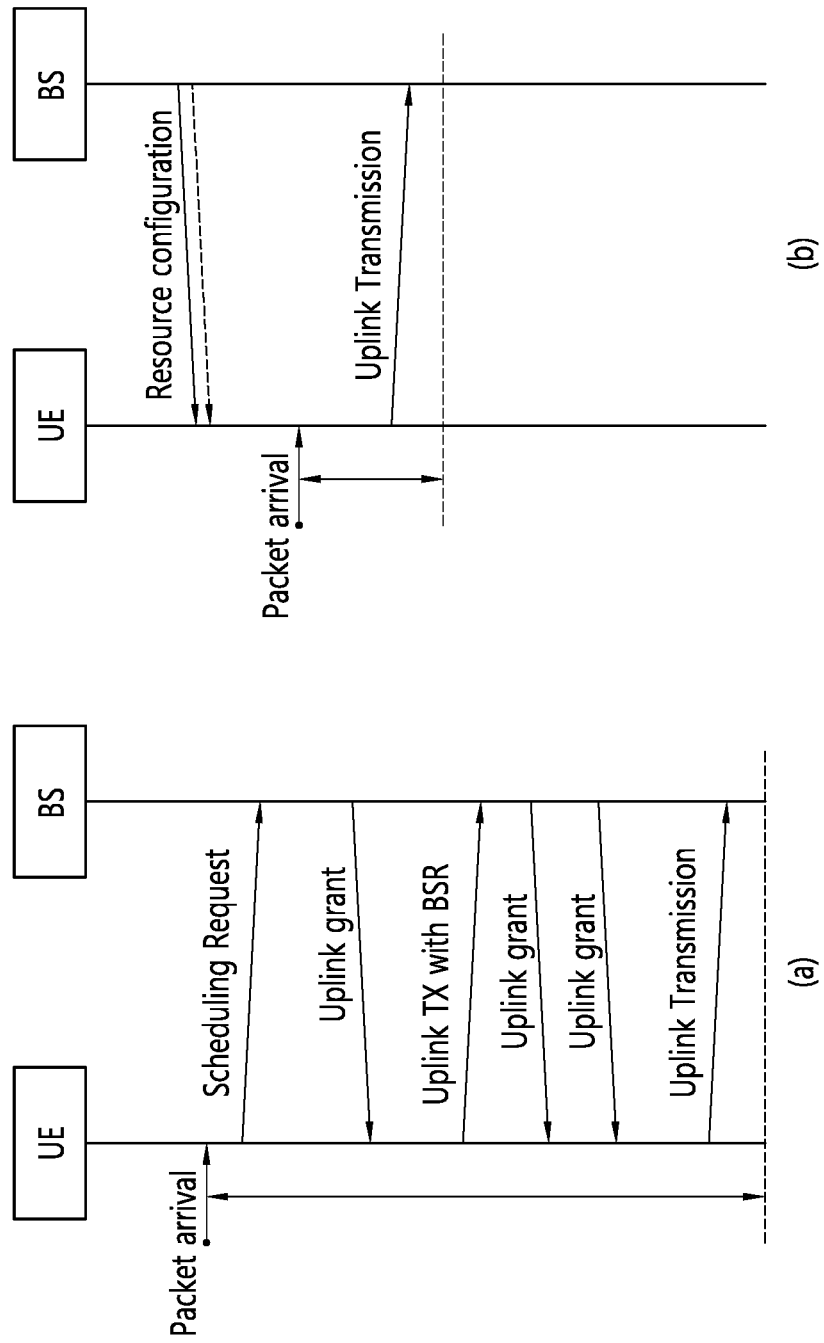
FIG. 26 shows an example of an uplink grant.

FIG. 26 shows an example of an uplink grant. FIG. 26 (a) shows an example of a dynamic grant, and FIG. 26 (b) shows an example of a configured grant.

A dynamic grant refers to a scheduling-based data transmission/reception method of a base station in order to maximize resource utilization. This means that, when there is data to be transmitted, the terminal may preferentially request uplink resource allocation to the base station and transmit data using only uplink resources allocated from the base station. For efficient use of uplink radio resources, the base station needs to know what type of data to transmit and how much data to transmit in the uplink for each terminal. Accordingly, the terminal directly transmits information about uplink data it wants to transmit to the base station, and the base station can allocate uplink resources to the corresponding terminal based on the information. In this case, the information on the uplink data transmitted from the terminal to the base station is the amount of uplink data stored in its buffer, and is referred to as a buffer status report (BSR). The BSR is transmitted using a MAC control element when a resource on the PUSCH in the current TTI is allocated to the UE and a reporting event is triggered.

Referring to FIG. 26 (a), an uplink resource allocation procedure for actual data is exemplified when the terminal does not allocate uplink radio resources for buffer status report (BSR) to the terminal. That is, in the case of a terminal switching the state of the active mode from the DRX mode, since there is no pre-allocated data resource, it is necessary to request a resource for uplink data starting with SR transmission through the PUCCH, and in this case, the uplink resource allocation procedure of 5 steps is used.

Referring to FIG. 26 (a), when the PUSCH resource for transmitting the BSR is not allocated to the UE, the UE first transmits a scheduling request (SR) to the base station in order to allocate the PUSCH resource. When a reporting event has occurred, but a radio resource is not scheduled to the UE on the PUSCH in the current TTI, the scheduling request is used for the UE to request the base station to allocate PUSCH resources for uplink transmission. That is, the UE transmits the SR on the PUCCH when the regular BSR is triggered but the UE does not have uplink radio resources for transmitting the BSR to the base station. The UE transmits the SR through the PUCCH or initiates a random access procedure depending on whether the PUCCH resource for the SR is configured. Specifically, the PUCCH resource through which the SR can be transmitted is UE-specifically configured by a higher layer (e.g., RRC layer), and the SR configuration includes an SR periodicity and an SR subframe offset information. Upon receiving an uplink grant for a PUSCH resource for BSR transmission from the base station, the terminal transmits the triggered BSR through the PUSCH resource allocated by the uplink grant to the base station. The base station checks the amount of data that the terminal actually transmits in uplink through the BSR, and transmits an uplink grant for PUSCH resources for actual data transmission to the terminal. The UE receiving an uplink grant for actual data transmission transmits actual uplink data to the base station through the allocated PUSCH resource.

The configured grant method will be described by referring FIG. 26 (b).

The terminal receives a resource configuration for transmission of uplink data without a grant from the base station. The resource configuration may be performed only with RRC signaling (type 1), or may be performed with L1 (layer-1) signaling and RRC signaling (type 2). Then, the terminal performs initial transmission to the base station based on the resource configuration received without the grant. In this case, the initial transmission may be repeated, and repetition of the initial transmission for the same transport block may be performed K times (K≥1).

Resources for initial transmission by a configured grant may or may not be shared between one or more terminals.

When the initial transmission by the configured grant fails, the base station may transmit a grant for retransmission of a TB related to the initial transmission to the terminal. At this time, the base station needs to identify the terminal even if a collision occurs. A terminal performing uplink transmission without an uplink grant may be identified based on time/frequency resources and reference signal (RS) parameters.

The base station may allocate different DMRS resources to different terminals sharing the same PUSCH resource. And, when the terminal performs retransmission, the transmission is switched to a grant-based transmission, the UE receives a grant from the base station, and the UE performs retransmission based on the grant. That is, the terminal performs initial transmission without a grant, but performs retransmission based on a grant.

Figure 27:
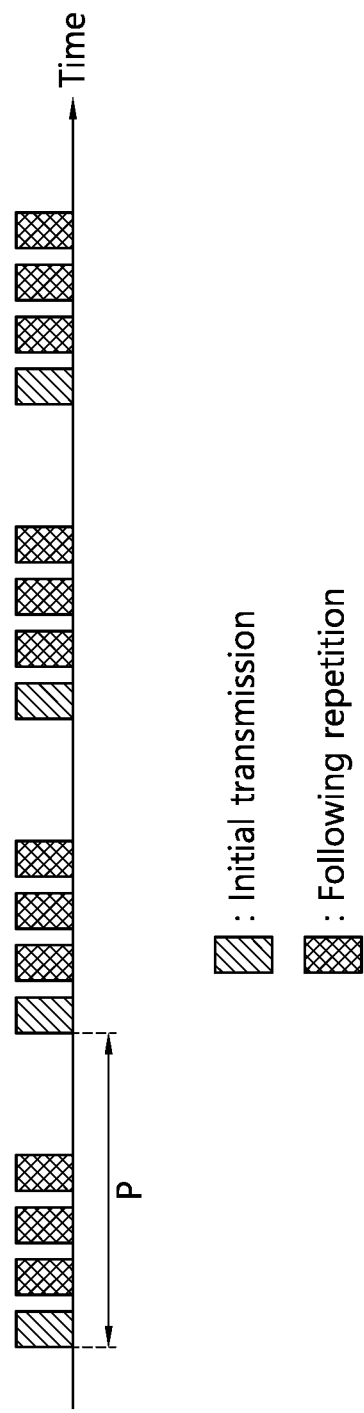
FIG. 27 is a diagram illustrating an example of a grant-free initial transmission.

FIG. 27 is a diagram illustrating an example of a grant-free initial transmission.

Hereinafter, PUCCH will be described.

Figure 28:
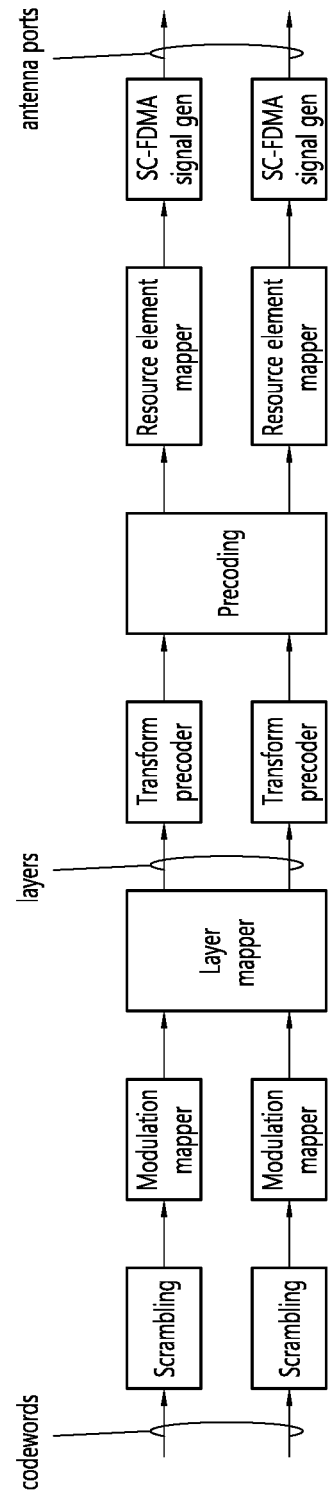
FIG. 28 shows an example of a conceptual diagram of uplink physical channel processing.

FIG. 28 shows an example of a conceptual diagram of uplink physical channel processing.

Each of the blocks shown in FIG. 28 may be performed in each module in the physical layer block of the transmission device. More specifically, the uplink signal processing in FIG. 28 may be performed by the processor of the terminal/base station described in this specification. Referring to FIG. 28, uplink physical channel processing may be performed through the processes of scrambling, modulation mapping, layer mapping, transform precoding, precoding, resource element mapping, SC-FDMA signal generation. Each of the above processes may be performed separately or together in each module of the transmission device.

More specifically, for each of the above processes, for one codeword, the transmission device may scramble coded bits in the codeword by a scrambling module and then transmit it through a physical channel. The scrambled bits are modulated into complex modulation symbols by a modulation mapping module. The modulation mapping module may modulate the scrambled bit according to the predetermined modulation scheme and arrange it as a complex modulation symbol representing a position on a signal constellation. There is no restriction on the modulation scheme, and pi/2-BPSK, m-PSK, or m-QAM or the like may be used for modulation of the encoded data. The complex modulation symbol may be mapped to one or more transport layers by a layer mapping module. The complex modulation symbols on each layer may be precoded by a precoding module for transmission on the antenna port. Here, the precoding module may perform after performing transform precoding on the complex modulation symbol as shown in FIG. 28. The precoding module processes the complex modulation symbol in a MIMO method according to multiple transmit antennas to output antenna-specific symbols, and may distribute the antenna-specific symbols to a corresponding resource element mapping module. The output z of the precoding module can be obtained by multiplying the output y of the layer mapping module by the precoding matrix W of N by M. Here, N s the number of antenna ports, and M is the number of layers. The resource element mapping module maps to the appropriate resource element in the virtual resource block allocated for transmitting the complex demodulation symbol for each antenna port. The resource element mapping module may allocate complex modulation symbols to appropriate subcarriers and multiplex them according to users. The SC-FDMA signal generation module may generate a complex-valued time domain OFDM symbol signal by modulating a complex modulation symbol using a specific modulation method, for example, an OFDM method. The signal generation module may perform IFFT on an antenna-specific symbol, and a cyclic prefix (CP) may be inserted into a time domain symbol on which the IFFT is performed. The OFDM symbol undergoes digital-to-analog conversion, frequency upconversion, and the like, and is transmitted to a receiver through each transmit antenna. The signal generation module may include an IFFT module and a CP inserter, a DAC converter, a frequency uplink converter, and the like.

The signal processing process of the receiving device may be configured as a reverse of the signal processing process of the transmitting device. For details, refer to the above and FIG. 28.

Next, PUCCH will be described.

PUCCH supports a number of formats, and the PUCCH formats may be classified by a symbol duration, a payload size, and multiplexing. Table 7 below is a table showing an example of the PUCCH format.

TABLE 7

| Format | PUCCH length in OFDM symbols | Number of bits | Usage | Etc. |
|---|---|---|---|---|
| 0 | 1-2 | ≤2 | 1 | sequence selection |
| 1 | 4-14 | ≤2 | 2 | sequence modulation |
| 2 | 1-2 | >2 | 4 | CP-OFDM |
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats of Table 7 can be largely divided into (1) short PUCCH and (2) long PUCCH. PUCCH format 0 and 2 may be included in a short PUCCH, and PUCCH formats 1, 3, and 4 may be included in a long PUCCH.

Figure 29:
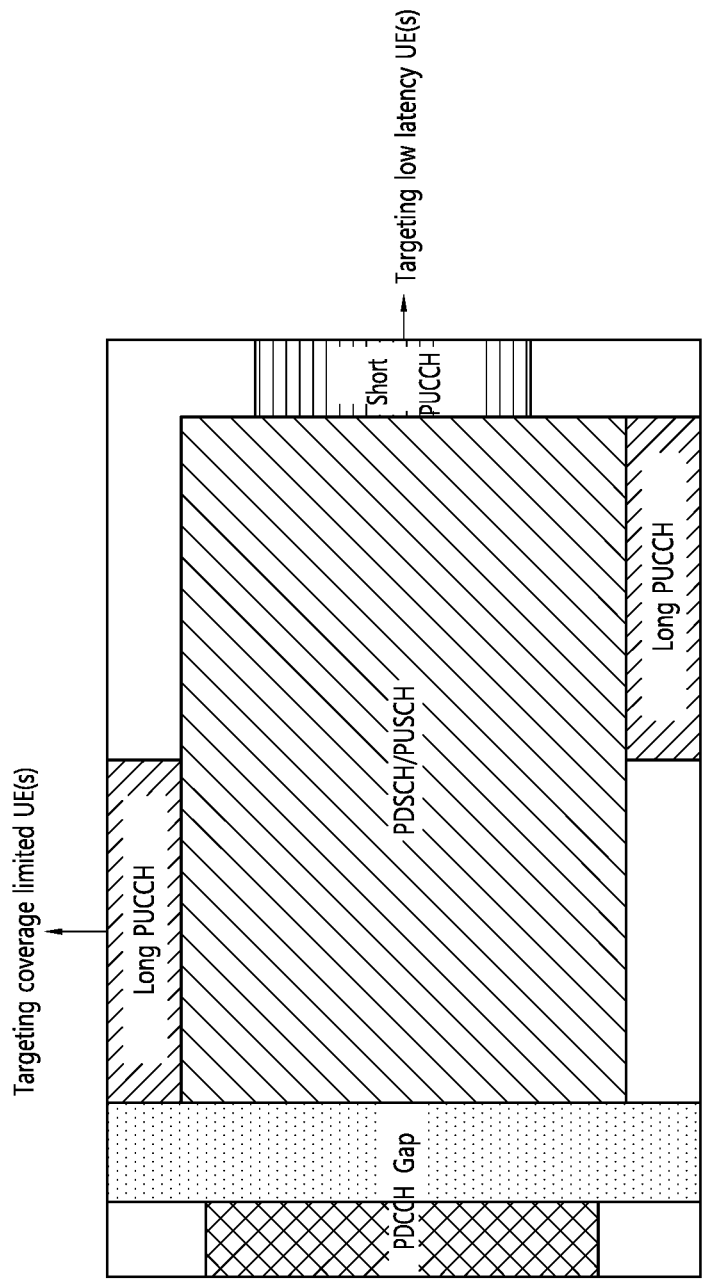
FIG. 29 shows an example of an NR slot in which a PUCCH is transmitted.

FIG. 29 shows an example of an NR slot in which a PUCCH is transmitted.

The UE transmits one or two PUCCHs through a serving cell in different symbols within one slot. When two PUCCHs are transmitted in one slot, at least one of the two PUCCHs has a short PUCCH structure. That is, in one slot, (1) transmission of short PUCH and short PUCCH is possible, (2) transmission of long PUCCH and short PUCCH is possible, but (3) transmission of long PUCCH and long PUCCH is impossible.

A HARQ-ACK operation will be described in relation to a terminal operation for reporting control information. HARQ in NR has the following characteristics.

1. HARQ-ACK feedback of 1 bit per TB (transport block) is supported. Here, the operation of one DL HARQ process is supported for some terminals, whereas the operation of one or more DL HARQ processes is supported for a given terminal.
2. The terminal supports a set of minimum HARQ processing time. Here, the minimum HARQ processing time means the minimum time required for the terminal from receiving downlink data from the base station to the corresponding HARQ-ACK transmission timing. In this regard, two types of terminal processing times N1 and K1 may be defined according to (1) symbol granularity and (2) slot granularity. First, from the UE point of view, N1 represents the number of OFDM symbols required for UE processing from the end of PDSCH reception to the earliest possible start of the corresponding HARQ-ACK transmission. The N1 may be defined as shown in Tables 8 and 9 below according to OFDM numerology (i.e., subcarrier spacing (SCS)) and a DMRS pattern.

TABLE 8

| HARQ configuration | Timing Parameter | Units | 15 KHz SCS | 30 KHz SCS | 60 KHz SCS | 120 KHz SCS |
|---|---|---|---|---|---|---|
| Front-loaded DMRS only | N1 | Symbols | 8 | 10 | 17 | 20 |
| Front-loaded DMRS only + additional DMRS | N1 | Symbols | 13 | 13 | 20 | 24 |

TABLE 9

| HARQ configuration | Timing Parameter | Units | 15 KHz SCS | 30 KHz SCS | 60 KHz SCS |
|---|---|---|---|---|---|
| Front-loaded DMRS only | N1 | Symbols | 3 | 4.5 | 9(FR1) |
| Front-loaded DMRS only + additional DMRS | N1 | Symbols | [13] | [13] | [20] |

And, K1 represents the number of slots from the slot of the PDSCH to the slot of the corresponding HARQ-ACK transmission.

Figure 30:
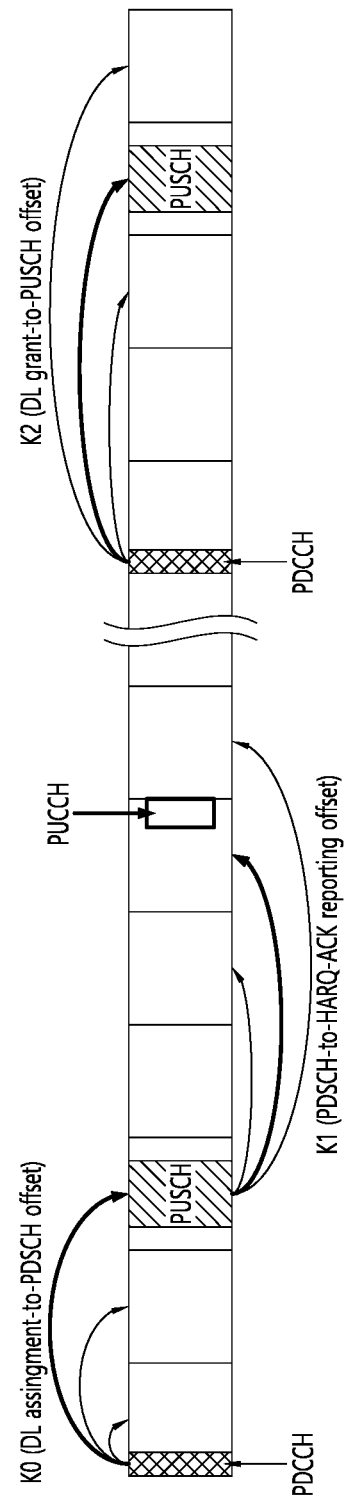
FIG. 30 is a diagram illustrating an example of the HARQ-ACK timing (K1).

FIG. 30 is a diagram illustrating an example of the HARQ-ACK timing (K1).

In FIG. 30, K0 represents the number of slots from a slot having a downlink grant PDCCH to a slot having a corresponding PDSCH transmission, and K2 represents the number of slots from a slot having an uplink grant PDCCH to a slot having a corresponding PUSCH transmission. That is, K0, K1, and K2 can be briefly summarized as shown in Table 10 below.

TABLE 10

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The slot timing between A and B is indicated by a field in DCI from the set of values. In addition, NR supports different minimum HARQ processing times between terminals.

The HARQ processing time includes a delay between a downlink data reception timing and a corresponding HARQ-ACK transmission timing and a delay between an uplink grant reception timing and the corresponding uplink data transmission timing. The terminal transmits the capability of its minimum HARQ processing time to the base station. Asynchronous and adaptive downlink HARQ are supported at least in enhanced mobile broadband (eMBB) and ultra-reliable low latency communication (URLLC). More specific details about eMBB and URLLC will be described later.

From a UE perspective, HARQ ACK/NACK feedback for a plurality of downlink transmissions in the time domain may be transmitted in one uplink data/control domain. The timing between downlink data reception and a corresponding acknowledgment is indicated by a field in DCI from a set of values, the set of values being set by a higher layer. The timing is defined at least for a case where the timing is not known to the UE.

3. Codebook block group (CBG)-based transmission with single/multi-bit HARQ-ACK feedback is supported, and specifically has the following characteristics.
    (1) CBG-based (re)transmission is allowed only for the same TB of the HARQ process.
    (2) A CBG may include all CBs of a TB regardless of the size of the TB. In this case, the UE reports a single HARQ ACK bit for the TB.
    (3) A CBG may contain one CB.
    (4) CBG granularity may be configured by a higher layer.

If the UE receives the PDSCH without receiving the corresponding PDCCH, or the UE receives the PDCCH indicating the release of the SPS PDSCH, the UE generates one corresponding HARQ-ACK information bit. When the UE is not provided with the higher layer parameter PDSCH-CodeBlockGroupTransmission, the UE generates one HARQ-ACK information bit per transport block. The UE does not expect to be instructed to transmit HARQ-ACK information for more than two SPS PDSCH receptions on the same PUCCH.

When the UE receives the upper layer parameter PDSCH-CodeBlockGroupTransmission for the serving cell, The UE receives a PDSCH including code block groups (CBGs) of transport blocks, The UE is provided with a higher layer parameter maxCodeBlockGroupsPerTransportBlock indicating the maximum number of CBGs (NCBG/TB, max-HARQ_ACK) for generating each HARQ-ACK information bits for receiving a transport block for a serving cell. In addition, the determination of the HARQ-ACK codebook may be divided into determination of a type-1 HARQ-ACK codebook and determination of a type-2 HARQ-ACK codebook. Parameters related to CBG group-based HARQ-ACK transmission may be as follows, and corresponding parameters may be configured through higher layer signaling (e.g., RRC, DCI).

codeBlockGroupTransmission: a parameter indicating whether it is CBG-based transmission
    maxCodeBlockGroupsPerTransportBlock: A parameter indicating the maximum number of CBGs per TB. The value of the parameter may have 2, 4, 6, or 8.
    harq-ACK-Codebook: a parameter indicating whether the HARQ-ACK codebook is semi-static or dynamic.
    C: a parameter indicating the number of CBs in the TB
    harq-ACK-Spatial-Bundling: a parameter indicating whether spatial bundling of HARQ ACKs is enabled
    CBG transmission information (CBGTI): a parameter indicating information through which CBG is transmitted, included in DCI format 1_1.
    CBG flushing out information (CBGFI): a parameter indicating whether CBG is processed differently for soft-buffer/HARQ combining, included in DCI format 1_1.

In addition to this, a parameter indicating the number of CBGs in the TB may be included or defined in higher layer signaling (e.g., RRC, DCI).

As described above, the IAB node may have an aspect that operates like a terminal in relation to a base station (or a parent node). In addition, the IAB node may have an aspect that operates like a base station in relation to a terminal (or child node) connected to it. In consideration of this point, in the present specification, the UE/terminal may be an IAB node. For example, in the description/drawing related to the downlink transmission/reception operation between the base station and the terminal, the terminal may be an IAB node. Alternatively, the base station may be an IAB node. Similarly, in the description/drawing related to the uplink transmission/reception operation, the terminal/UE may be an IAB node, or the base station may be an IAB node.

Hereinafter, a proposal of the present disclosure will be described in more detail.

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

The disclosure is described assuming an in-band environment but may also be applied in an out-band environment. Further, the disclosure is described in consideration of an environment in which a donor-gNB (DgNB), a relay node (RN), and/or a UE perform a half-duplex operation but may also be applied in an environment a DgNB, an RN, and/or a UE perform a full-duplex operation.

A discovery signal mentioned in the disclosure refers to a signal transmitted by an IAB so that another IAB node or a UE can discover the IAB.

The discovery signal may be in the form of a synchronization signal/physical broadcast channel (PBCH) block or a synchronization signal block (SSB) of NR, in the form of a channel status information-reference signal (CSI-RS), or in the form of a different signal of NR. Alternatively, the discovery signal may be a newly designed signal.

The disclosure mainly illustrates an IAB node discovering other IAB nodes but may also be applied to a case where a UE discovers IAB nodes.

From an MT perspective of an IAB node, the following time-domain resources may be indicated for a parent link.
    downlink (DL) time resource
    uplink (UL) time resource
    flexible (F) time resource In an IAB node DU aspect, a child link may have the following time resource types.
    downlink (DL) time resource
    uplink (UL) time resource
    flexible (F) time resource
    not-available (NA) time resource (resource not used for a communication in a DU child link)

Meanwhile, each of a DL time resource, a UL time resource, and a flexible time resource of a DU child link may belong to one of the following two categories.

hard resource: a time resource always available for a DU child link soft resource: a time resource for which an availability of a time resource for a DU child link is controlled by a parent node explicitly or implicitly In an IAB node DU aspect, for a child link, four types of time resources including a DL, a UL, an F, and an NA are present. The NA time resource means a resource which is not used for a communication on a DU child link.

Each of the DL, UL, and F time resources in a DU child link may be a hard resource or a soft resource. The hard resource may mean a resource always available for a communication on a DU child link. However, the soft resource may be a resource of which availability for a communication on a DU child link is controlled explicitly and/or implicitly by a parent node.

In the present disclosure, a configuration for a link direction and a link availability of a time resource for a DU child link may be called a DU configuration. The DU configuration may be used for effective multiplexing and interference handling between IAB nodes. For example, the DU configuration may be used to indicate whether a certain link is a valid link for a time resource between a parent link and a child link. In addition, only a subset of child nodes are configured to use a time resource for a DU operation, and the DU configuration may be used for interference handling. Considering such an aspect, the DU configuration may be more efficient when the DU configuration is configured semi-statically.

Meanwhile, similar to a slot format indication (SFI) configuration for an access link, an IAB node MT may have three types of time resources including a DL, a UL, and an F for its own parent link.

Figure 31:
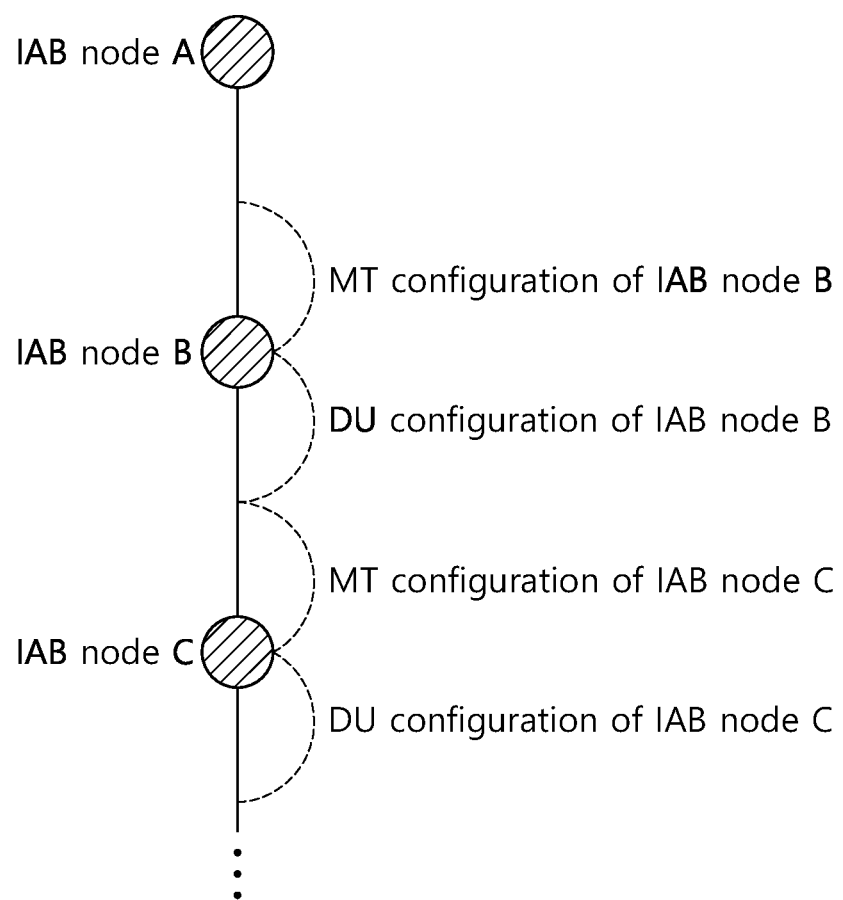
FIG. 31 illustrates an MT configuration and a DU configuration.

FIG. 31 illustrates an MT configuration and a DU configuration.

Referring to FIG. 31, there are IAB node A, IAB node B, and IAB node C, a parent node of IAB node B is IAB node A, and a child node of IAB node B is IAB node C.

Referring to FIG. 31, an IAB node may receive an MT configuration indicating link direction information about a parent link between a parent node thereof and the IAB node for communication with the parent node. In addition, the IAB node may receive a DU configuration indicating link direction and availability information that can be used for communication with a child node thereof.

For example, an MT configuration of IAB node B may include link direction information about a link between IAB node A and IAB node B from the perspective of IAB node B, and a DU configuration of IAB node B may include link direction and availability information about a link between IAB node B and IAB node C from the perspective of IAB node B. Further, an MT configuration of IAB node C may include the link direction of a link between IAB node B and IAB node C from the perspective of IAB node C, and a DU configuration of IAB node C may include link direction and availability information about a link between a child node of IAB node C or a UE connected to IAB node C and IAB node C from the perspective of IAB node C.

Here, for example, an operation performed by IAB node B with respect to a child node thereof, which is IAB node C, may be referred to as a DU operation of IAB node B. Further, an operation performed by IAB node B with respect to a parent node thereof, which is IAB node A, may be referred to as an MT operation of IAB node B.

Referring to FIG. 31, a DU resource of IAB node B may refer to a resource of IAB node B for the link between IAB node B and IAB node C. The link direction and the availability of the DU resource of IAB Node B may be determined on the basis of the DU configuration received by IAB Node B. Further, an MT resource of IAB node B may refer to a resource of IAB node B for the link between IAB node B and IAB node A. The link direction of the MT resource of IAB Node B may be determined on the basis of the MT configuration received by IAB Node B.

The above classification is only for illustration. Alternatively, from a DU perspective of an IAB node, resource types may be classified into UL, DL, F, and availability settings may be classified into NA, a hard resource, and a soft resource. In detail, the IAB node may receive resource configuration information, and the resource configuration information may include link direction information and availability information. Here, the link direction information may indicate whether the type of a specific resource is UL, DL, or F, and the availability information may indicate whether the specific resource is a hard resource or a soft resource. Alternatively, the link direction information may indicate whether the type of a specific resource is UL, DL, F or NA, and the availability information may indicate whether the specific resource is a hard resource or a soft resource.

Considering the property of sharing a resource in a TDM scheme between an MT and a DU in an IAB node, the present disclosure proposes a property to be owned by a slot format configuration of an IAB node.

An MT of an IAB node may be informed with a link direction configuration of a cell-specific and/or MT-specific MT. In addition, a DU may be informed with a link direction configuration of a DU-specific and/or child link-specific DU. Here, the link direction configuration is a configuration that informs whether each of resources allocated to an IAB node is a downlink (D), an uplink (U), or a flexible (F) and may also be expressed by a resource direction configuration or a slot format configuration.

In an IAB environment, particularly, considering SDM/FDM between an MT and a DU in an IAB node, a link direction configuration different from the existing link direction configuration is required to be introduced such as a UL resource or a flexible resource is positioned at a front part of a slot format on a time domain, and a DL resource or a flexible resource is positioned at a rear part of a slot format. For example, in the case that an MT performs a DL reception from a parent node at a front part of a slot, and simultaneously, a DU of the same node performs a UL reception from a child node or a UE on the resource, in the MT aspect, the resource may be configured as a DL resource, but in the DU aspect, the resource may be configured as a UL resource.

Accordingly, the present disclosure proposes a link direction configuration method in which positions of a DL resource, a UL resource, and a flexible resource may be relatively freely configured. The contents of the present disclosure may be applied to a link direction configuration of an MT and/or a link direction configuration of a DU. In addition, the contents of the present disclosure may be applied to a link direction configuration of a cell-specific configuration and/or an MT-specific MT and may also be applied to a link direction configuration of a DU-specific and/or child link-specific DU of a DU.

Furthermore, the present disclosure proposes a link availability configuration method for a configuration of a non-available resource.

Meanwhile, in the present disclosure, a link may be interpreted as a resource. In addition, a slot format configuration may mean a link direction configuration or a link availability configuration and may also mean a configuration for both the link direction and the link availability.

First, a link direction configuration proposed in the present disclosure is described.

In one example, information of a resource matched to each link direction may be informed to an IAB node.

Figure 32:
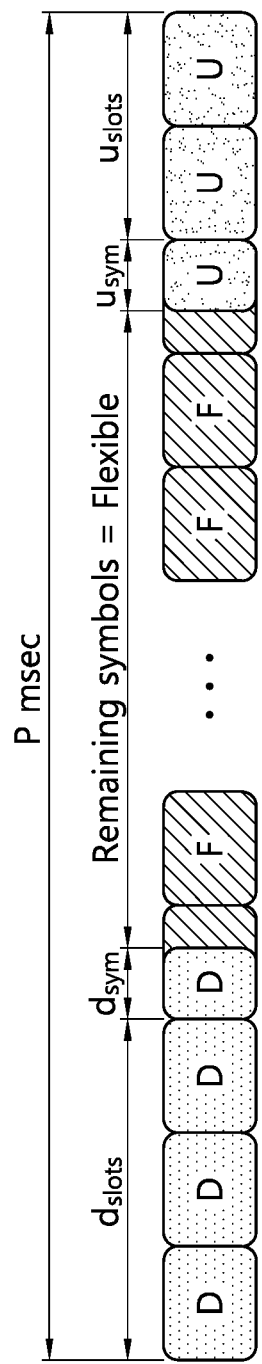
FIG. 32 illustrates an example of a resource direction configuration method.

FIG. 32 illustrates an example of a resource direction configuration method.

A link direction configuration may be performed based on a configuration method of TDD-UL-DL-ConfigCommon. In a configuration of TDD-UL-DL-ConfigCommon, as shown in FIG. 32, when d_slot, d_sym, u_sym, and u_slots are configured, the d_slot number of slots and the s_sym number of symbols from the beginning are defined as DL resources, and the u_slot number of slots and the u_sym number of symbols from the end are defined as UL resources. The remaining center regions are defined as flexible resources. Accordingly, the DL resources are always positioned from the beginning of the slot format, and the UL resources are positioned from the end of the slot format.

In the present disclosure, the method is modified, and a link direction configuration method is proposed, in which a position of a flexible resource may be relatively freely configured. In the present disclosure, a slot format pattern may be interpreted as a link direction pattern and/or a link availability pattern.

(Option 1) First, it is possible to define candidates in the order in which the link direction is located within the slot format pattern. Such candidates may include, for example, D-F-U, U-D-F, F-U-D, U-F-D, and the like. The link direction order may be informed by configuring which link direction order among these candidates is applied.

Additionally, it is possible to configure the amount of time resources possessed by the first link direction and the amount of time resources possessed by the last link direction among the three link directions. Characteristically, the amount of time resources may be defined as the number of slots, or may be defined as the sum of the number of slots and the number of symbols, similar to the configuration in TDD-UL-DL-ConfigCommon. Here, the remaining unconfigured resources are configured as time resources possessed by a link direction located in the middle.

Figure 33:
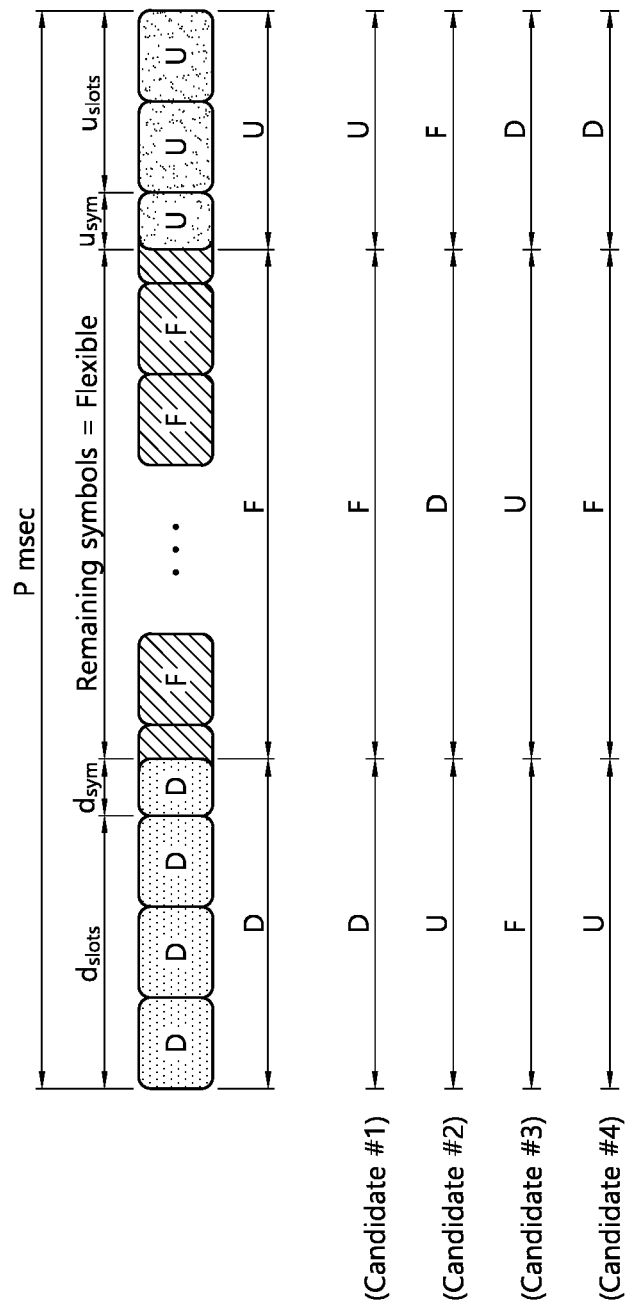
FIG. 33 illustrates an example of a resource direction configuration method based on option 1.

FIG. 33 illustrates an example of a resource direction configuration method based on option 1.

Referring to FIG. 33, it is defined a first candidate D-F-U, a second candidate U-D-F, a third candidate F-U-D, and a fourth candidate U-F-D. Here, one of the candidates may be configured for a time duration configured for an IAB node. That is, after the time duration is divided into three sub-durations, a resource direction of each of the sub-durations may be configured by using one of the candidates.

Figure 34:
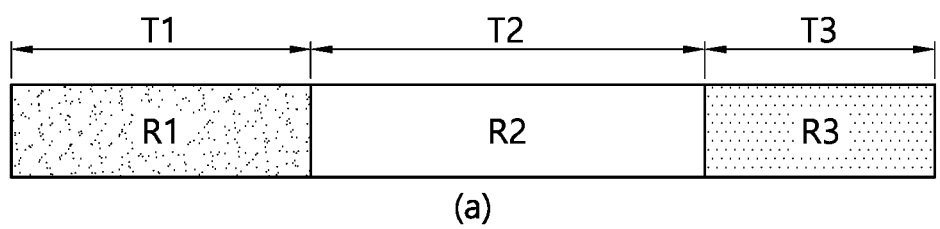
FIG. 34 is a diagram illustrating a resource direction configuration method proposed in the present disclosure.
Figure 34:
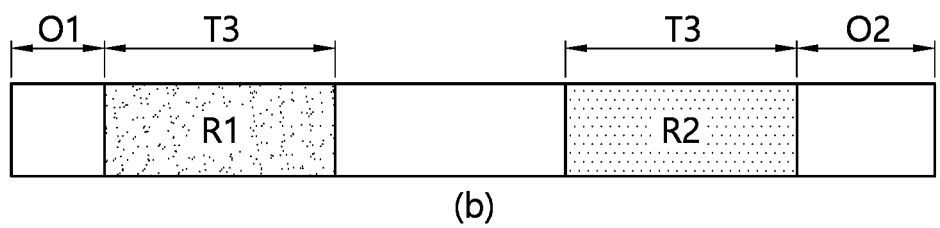

FIG. 34 is a diagram illustrating a resource direction configuration method proposed in the present disclosure. Particularly, (a) of FIG. 34 is a diagram in which a resource on a time domain configured for an IAB node is divided into three sub-durations, and (b) of FIG. 34 is a diagram in which a resource on a time domain configured for an IAB node is divided into five sub-durations. Here, referring to (a) of FIG. 34, the three sub-durations R1, R2, and R3 have lengths of T1, T2, and T3, respectively. In addition, here, referring to (b) of FIG. 34, the most precedent duration on a time domain among the five sub-durations has a length of O1, the second precedent duration R1 on a time domain among the five sub-durations has a length of T1, the fourth duration R2 on a time domain among the five sub-durations has a length of T2, and the last duration on a time domain among the five sub-durations has a length of O2.

Regarding Option 1, referring to FIG. 34 (a), when the slot format pattern is divided into R1, R2, and R3 regions, the link direction of each resource region may be informed by configuring the link direction pattern of the R1, R2, and R3 regions. Additionally, the positions of the R1, R2, and R3 regions may be configured by configuring T1 which is the time duration of R1 and T3 which is the time duration of R3.

(Option 2) The resource in the slot format pattern may be divided into three time domain regions, the length and link direction information of the first time domain region may be informed, and the length and link direction information of the last time domain region may be informed. Here, the length of the time domain region may be defined as the sum of the number of slots and the number of symbols, similar to the configuration in TDD-UL-DL-ConfigCommon. Here, the link direction information may indicate one of a downlink resource, an uplink resource, and a flexible resource. Here, in the last time domain region, one of the link directions may be configured except for the link direction configured in the first time domain region. In this case, the link direction of the second time domain region may have a link direction that is not used in the other two regions.

Regarding Option 2, referring FIG. 34 (a), when the slot format pattern is divided into R1, R2, and R3 regions, the link direction of R1 and T1, which is the time duration of R1, may be configured. In addition, the link direction of R3 and T3, which is the time duration of R3 may be configured. Here, if the link direction of R1 is uplink, the link direction that R3 may have may be downlink or flexible. In this case, the remaining link direction not configured for R1 and R2 may be the link direction of R2.

(Option 3) A slot format pattern may be configured as shown in FIG. 34 (b). In this case, the slot format pattern is divided into R1, R2, and the remaining regions. The R1 region and the R2 region may be downlink resources or uplink resources, and the R1 region and the R2 region may have different link directions. The remaining regions other than the R1 region and the R2 region may be configured as flexible resources.

Here, R1 resource location may be configured by configuring O1, which is the starting point of the R1 region (i.e., the offset length of the starting point of the R1 region from the starting point of the slot format pattern), and T1, which is the length of the R1 region. Also, R2 resource location may be configured by configuring O2, which is the end point of the R2 region (i.e., the offset length of the point where the R2 region ends from the end point of the slot format pattern), and T2, which is the length of the R2 region.

Additionally, to configure the link direction of R1 and R2, it may be indicated whether R1 and R2 are 1) R1 is a downlink resource and R2 is an uplink resource, or 2) R1 is an uplink resource and R2 is a downlink resource, respectively.

In another example, a link direction pattern may be information in a unit of slot.

In the case of TDD-UL-DL-ConfigDedicated configuration, for slots including flexible resources, a specific slot may be indicated and a slot pattern of the corresponding slot may be configured. Here, the slot patterns that may be configured are as follows.

allDownlink: all symbols in the slot are defined as downlink resources.

allUplink: all symbols in the slot are defined as uplink resources.

explicit: the symbols in the slot are configured in the order of a downlink resource, a flexible resource, and an uplink resource. The first N_D symbols are configured as downlink resources, the last N_U symbols are configured as uplink resources, and the remaining symbols are configured as flexible resources.

By modifying the TDD-UL-DL-ConfigDedicated configuration, link direction configuration for IAB node may be performed. Such a configuration may be performed for a region configured as a cell-specific flexible resource such as TDD-UL-DL-ConfigDedicated configuration. Alternatively, such a configuration may be used to configure the link direction for the entire resource region.

Here, considering that the configuration can be used to configure the link direction for the entire resource region in general, rather than being performed for the cell-specifically configured region as flexible resource, the present disclosure proposes that 'allFlexible' slot pattern is included in the configurable slot patterns. This 'allFlexible' slot pattern means that all symbols in the slot are defined as flexible resources.

Also, the present disclosure proposes to perform more flexible link direction configuration by changing the definition of the 'explicit' slot pattern or defining new slot pattern(s). This slot pattern may be defined as follows.

(Pattern 1) Referring to FIG. 34 (a), when one slot is divided into R1, R2, and R3 regions, the link direction possessed by R1 and T1, which is the number of symbols in R1, are configured. Also, the link direction possessed by R3 and T3, which is the number of symbols in R3, are configured. The link direction that can be configured may be downlink, uplink, or flexible. Here, if the link direction of R1 is uplink, the link direction that R3 may have is downlink or flexible. Here, the remaining link direction which is not configured for R1 and R3 may become the link direction of R2.

(Pattern 2) Referring to FIG. 34 (b), a plurality of regions may exist in one slot. In this case, the regions within the slot is divided into R1, R2, and the remaining regions. The R1 and R2 may be downlink resources or uplink resources, and the R1 and R2 may have different link directions. The remaining regions other than R1 and R2 may be configured as flexible resources.

Here, R1 resource location may be configured by configuring O1, which is the start symbol position of the R1, and T1, which is the number of symbols in the R1. Also, R2 resource location may be configured by configuring O2, which is the end symbol position of the R2, and T2, which is the number of symbols in the R2.

(Pattern 3) A plurality of 'explicit' slot patterns may be newly defined, and the link direction may be located in a different order for each 'explicit' slot pattern. For example, resources may be located in the link direction order of D-F-U in the 'explicit 1' slot pattern, and resources may be located in the link direction order of F-U-D in the 'explicit 2' slot pattern. Here, for example, the number of symbols in the link direction located at the beginning and the number of symbols in the link direction located at the end for each 'explicit' slot pattern may be informed. The content of the present specification may include a case in which resources having the same link direction are located in non-consecutive symbols in the 'explicit' slot pattern.

In still another example, one of slot format patterns determined in a unit of slot may be selected.

Specifically, when there are a plurality of patterns in which link directions are defined for each symbol or each symbol group position in the slot, the link direction to be applied to each slot may be informed by configuring the index of the link direction pattern to be applied in the corresponding slot. Here, when configuring the index of the link direction pattern for each slot for the P slots, a corresponding configured pattern in units of P slots may be periodically and repeatedly applied.

In still another example, it may be considered a method of informing a link direction in a 2-stage scheme.

Specifically, since it is common that the amounts of the downlink resource, the uplink resource, and the flexible resource are not uniformly located, the following method may be applied.

When the three link direction types are type 1, type 2, and type 3, respectively, whether the link direction of a specific resource is type 1, type 2, or type 3 may be indicated by 1-bit information.

That is, for example, if bit information indicates 0, the link direction of the corresponding resource may be type 1, and if bit information indicates 1, the link direction of the corresponding resource may be type 2 or type 3. Thereafter, for resources indicated as type 2 or type 3, additional 1-bit information may indicate whether the link direction of the resource is type 2 or type 3. That is, for example, for a resource previously indicated as type 2 or type 3, if the additionally transmitted bit information indicates 0, the link direction of the corresponding resource may be type 2, and if the additionally transmitted bit information indicates 1, the link direction of the corresponding resource may be type 3.

In other words, when each of two types of 1-bit information that informs a link direction of a resource is defined as first information and second information, respectively, the first information may inform whether the link direction of the resource is type 1 or not. In the case that the link direction of the resource is determined as not type 1, the resource may be determined as type 2 or type 3 according to the second information.

Figure 35:
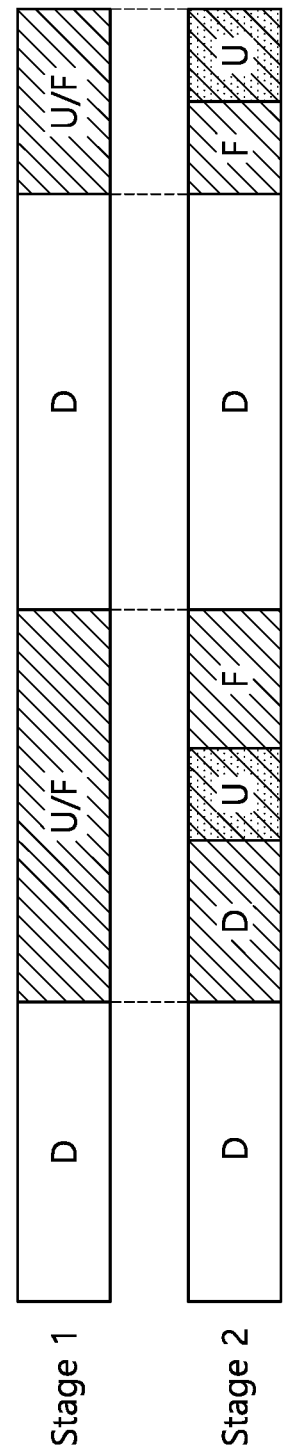
FIG. 35 is a diagram illustrating an example of a method for informing a link direction in a 2-stage scheme.

FIG. 35 is a diagram illustrating an example of a method for informing a link direction in a 2-stage scheme.

For example, when type 1, type 2 and type 3 mean a downlink, an uplink, and a flexible resource, respectively, in the first stage 1, it is possible to indicate whether a corresponding resource is a downlink, an uplink, or a flexible resource for a specific resource region, as shown in FIG. 35. More specifically, it is possible to indicate whether a corresponding resource is a downlink, an uplink, or a flexible resource for each symbol or for each symbol group. Thereafter, in stage 2, for the resource region indicated as an uplink resource or a flexible resource in the stage 1, it is possible to indicate whether a corresponding resource is either the uplink resource or the flexible resource. Specifically, this indication may also indicate whether a corresponding resource is the uplink resource or the flexible resource for each symbol or for each symbol group.

Compared to the indication of whether the resource is a downlink resource, an uplink resource, or a flexible resource for each resource, this configuration method may be effective in reducing configuration overhead when one link direction type has a higher resource ration than other link direction types.

Here, the link direction indicated by the type 1 may be as follows. When the link direction indicated by the type 1 is determined, the link direction indicated by the type 2 and the type 3 may be automatically determined among the remaining link directions.

Particularly, the method for informing a link direction in a 2-stage scheme may be configured to satisfy at least one of the following conditions.

(Condition 1) The link direction indicated by type 1 may be fixed to the downlink.

(Condition 2) In the case of the link direction configuration of the MT, the link direction indicated by the type 1 may be configured cell-specifically or MT-specifically. In the case of the link direction configuration of the DU, the link direction indicated by the type 1 may be configured DU-specifically or child link-specifically.

(Condition 3) when configuring the link direction, information on the link direction indicated by the type 1 may be configured together.

In another example, an application of U-F-D and F-U-F-D-F resource patterns may be considered.

To support SDM/FDM between MT and DU, new resource direction pattern(s) in addition to the legacy D-F-U pattern may be necessary.

Figure 36:
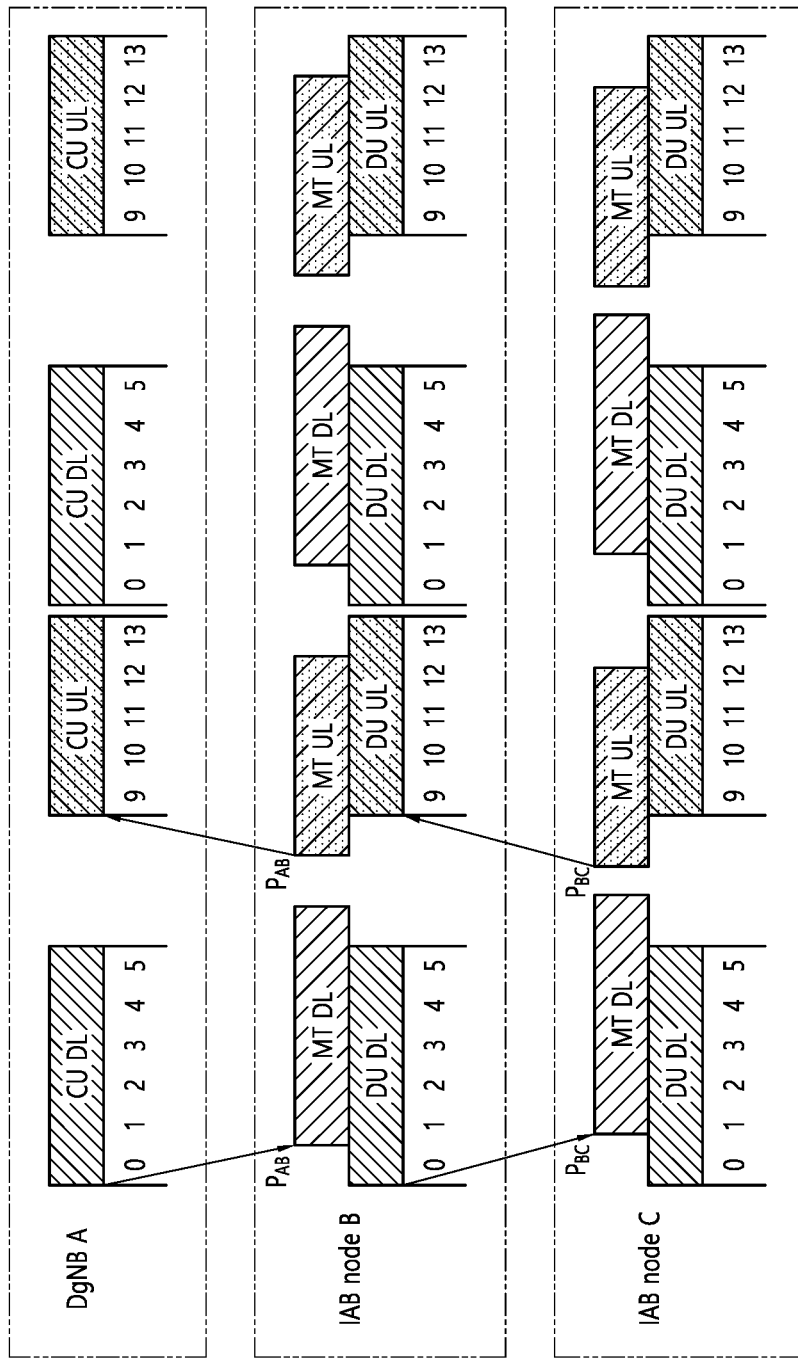
FIG. 36 illustrates a TDM based slot pattern between an MT and a DU.
Figure 37:
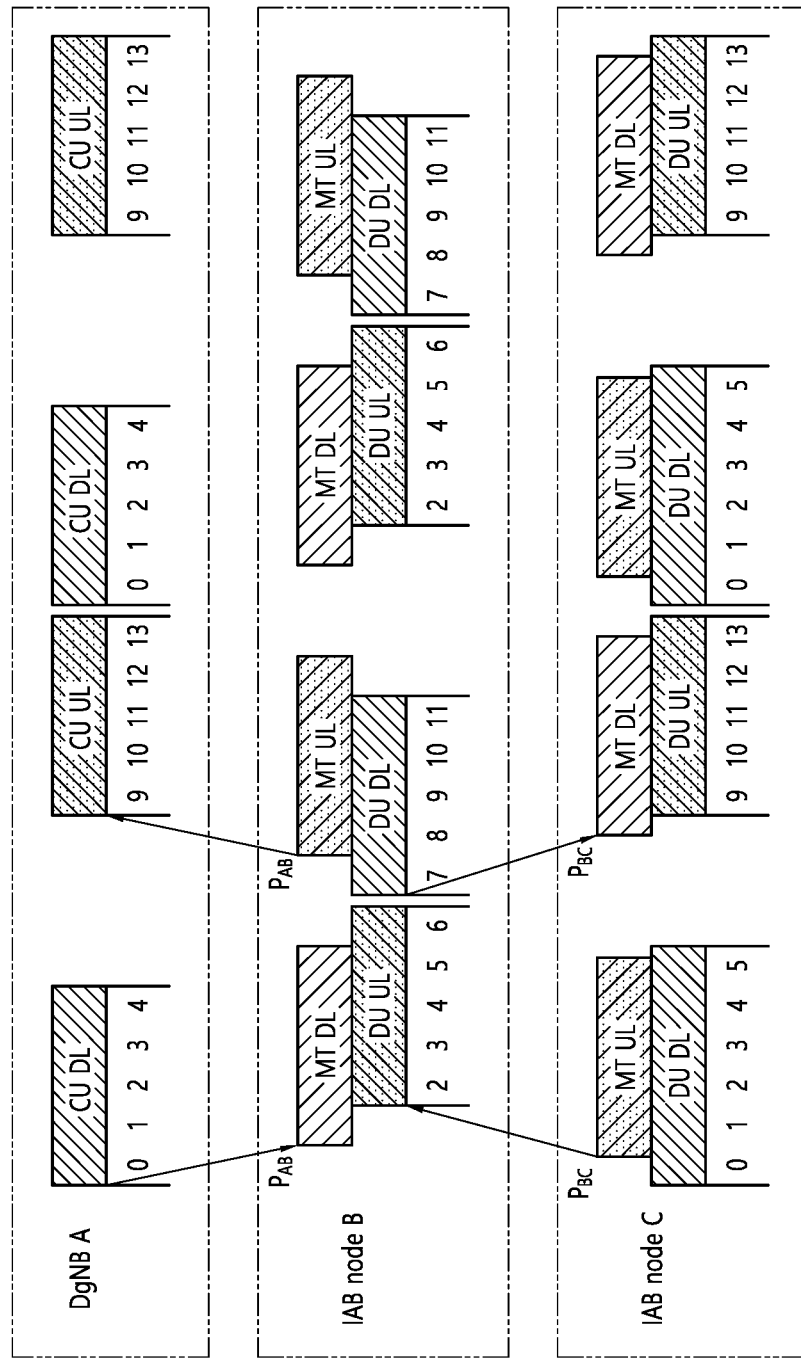
FIG. 37 illustrates an SDM/FDM situation between an MT and a DU.
Figure 38:
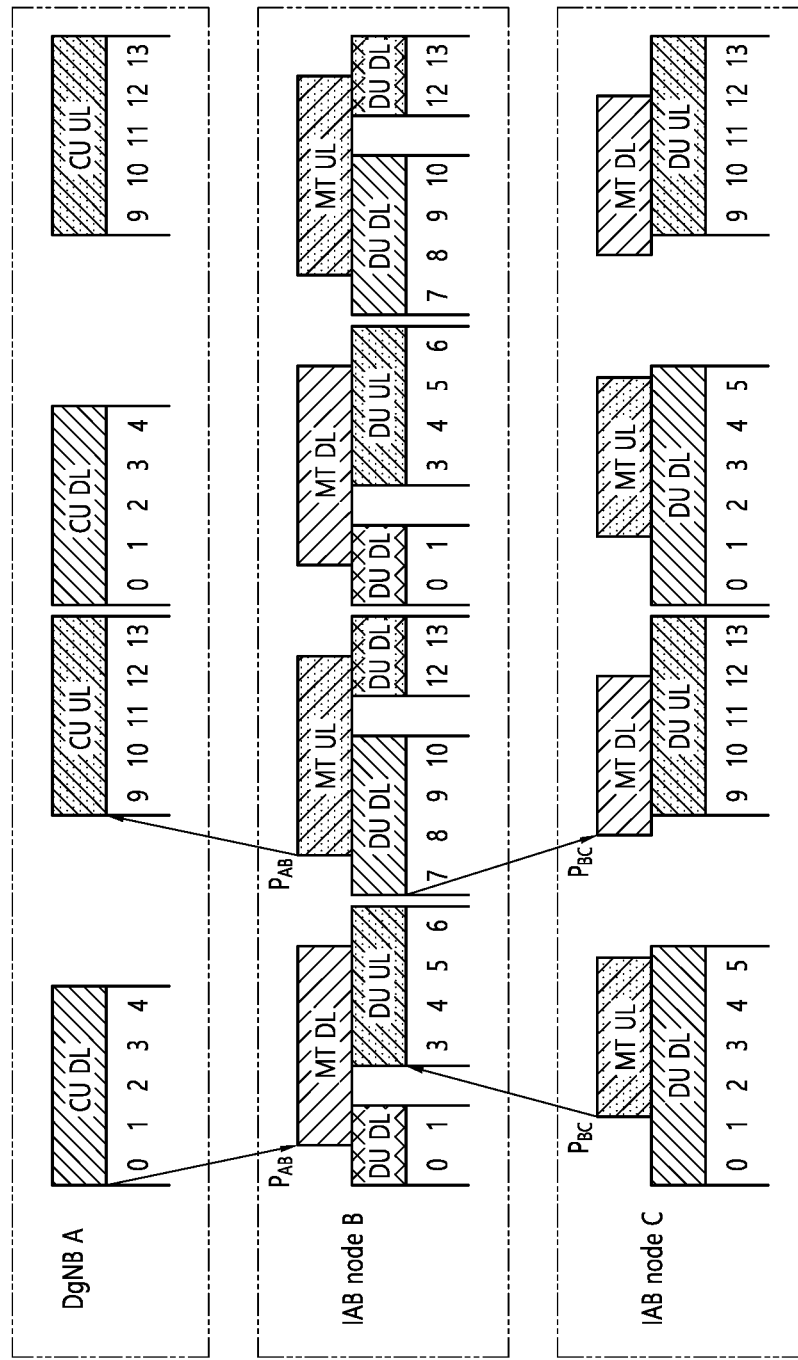
FIG. 38 illustrates an SDM/FDM situation between an MT and a DU considering an access UE.

As shown in FIG. 31, a situation may be assumed, in which IAB node B has parent node A and child node C. Here, parent node A may be a DgNB. FIGS. 36 to 38 illustrate a resource direction pattern and timing for nodes A, B, and C. Particularly, FIG. 36 illustrates a TDM based slot pattern between an MT and a DU. FIG. 37 illustrates an SDM/FDM situation between an MT and a DU. FIG. 38 illustrates an SDM/FDM situation between an MT and a DU considering an access UE. Here, $P_{XY}$ means propagation delay between node X and node Y. Referring to FIG. 36, when only the legacy resource direction patterns are supported for IAB nodes, a resource direction pattern and timing for each node is shown. Here, in a node aspect, the MT and the DU have the same resource direction on the same time, and accordingly, the MT and DU operation are in TDM, and SDM/FDM may not be supported.

On the other hand, to support SDM/FDM in as many resources as possible, MT and DU should have the opposite resource direction at the same time as depicted in FIG. 37. In this figure, node A has D-F-U resource pattern, so MT resource of IAB node B also has D-F-U resource pattern. For SDM/FDM between MT and DU for IAB node B, DU and MT needs to have the opposite resource direction. So, the front part of DU resource should be uplink and the latter part of DU resource should be downlink. However, because MT downlink reception and MT uplink transmission have different slot boundary, there should be some guard time between downlink resource and uplink resource. Therefore, the front part and/or the latter part of resource pattern boundary should be used to guard resource. To reflect this guard resource in the new resource pattern, following configuration schemes can be considered.

Scheme 1: New resource direction pattern F-U-F-D-F is supported. In this scheme, the front and/or the latter flexible resource can be used for guard resource for downlink to uplink switching.

Scheme 2: New resource direction pattern U-F-D is supported. Guard resource for downlink to uplink switching is configured to NA resource.

Another point to consider for SDM/FDM between MT and DU is the support of access UEs. Since access UEs only support the legacy resource patterns, the DU resource direction pattern like U-F-D or F-U-F-D-F may be not suit to support access UEs. In order to sharing the resource with access UEs while supporting SDM/FDM between parent and child backhaul links, DU operation for access UEs and child MTs needs to be TDMed. For this operation, following options may be considered.

Option A: New resource pattern which can support TDM between access and backhaul link within the pattern is introduced. For example, the new resource pattern can have D-F-U-F-D-F-U as shown in FIG. 38. In the figure, IAB node B can support child MTs in DU resources corresponding to OFDM symbol #3~#10 while support access UEs in DU resource corresponding to OFDM symbol #0 and #1. In this case, parent backhaul link and access link are TDMed and parent backhaul link and child backhaul link can be SDM/FDMed.

Option B: Two resource patterns are applied alternately where one pattern is the legacy resource pattern and another one is the new resource pattern. Then, DU can support access UEs in slot resource with legacy slot format. For example, a resource pattern 1 with D-F-U and a resource pattern 2 with U-F-D can be configured, and the resource pattern 1 and the resource pattern 2 can be applied alternately.

Option C: To make resource pattern and configuration scheme simple, different resource direction patterns can be applied to access UE and child MT. It means that a DU can be configured with DU resource configuration independently for access link and backhaul link. For example, DU configuration for access link can have D-F-U pattern whereas DU configuration for backhaul link can have U-F-D or F-U-F-D-F pattern. This option is similar to Option A, but have simple resource pattern.

In order to support U-F-D resource pattern, the resource in the slot format pattern may be divided into three time domain regions, the length information of the first time domain region may be informed, and the length information of the last time domain region may be informed. Here, the length of the time domain region may be defined as the sum of the number of slots and the number of symbols, similar to the configuration in the existing TDD-UL-DL-Config-Common. In this case, whether the resource directions of the first, second, and third time domain regions in the corresponding resource pattern have D, F, and U directions, respectively, or U, F, and D directions may be additionally indicated. Alternatively, whether the resource pattern has a D-F-U pattern or a U-F-D pattern may be indicated.

In order to support the resource pattern of F-U-F-D-F, by configuring O1, which is the offset length of the starting point of the uplink resource region from the start position of the uplink resource region, that is, the starting point of the resource pattern, and T1, which is the length of the uplink resource region, the uplink resource region location may be configured. Also, by configuring O2, which is the offset length of the end position of the downlink resource region, that is, the end point of the downlink resource region from the end point of the resource pattern and T2, which is the length of the downlink resource region, the downlink resource region location may be configured. Here, whether the resource pattern has the pattern of D-F-U or the pattern of F-U-F-D-F may be additionally indicated.

Meanwhile, a slot format having a sequence order of U-F-D may be supported for an IAB. For a dynamic indication of an additional slot formation for an MT, a predefined entry or a reserved entry may be used. Then, the latter factor is to determine a slot format to be included in the reserved entry.

Figure 39:
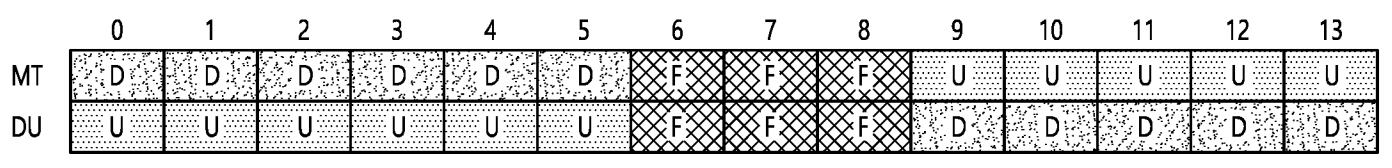

FIG. 39 illustrates an example of slot formats of an MT and a DU for SDM/FDM.

Support of additional slot formats with UL-Flexible-DL sequence order is for SDM/FDM among MT and DU. Assuming the optimized SDM/FDM operation, MT and DU should have the opposite resource directions as shown in FIG. 39. So, it may be natural to include slot formats which changed DL into UL and UL into DL in the existing slot formats. A suggested table for dynamic slot format indication for MT are given in Table 11. Additional slot formats are included in 56-108 entries and each entry corresponds to 3-55 entries respectively.

TABLE 11

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | U | U |
| 44 | D | D | D | D | D | F | F | F | F | F | F | U | U | U |
| 45 | D | D | D | D | D | F | F | U | U | U | U | U | U | U |
| 46 | D | D | D | D | D | D | D | D | D | D | F | F | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | U | D | D | D | F | F | U | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |

TABLE 11-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | U | U | U | U | U | U | U | U | U | U | U | U | U | F |
| 57 | U | U | U | U | U | U | U | U | U | U | U | U | F | F |
| 58 | U | U | U | U | U | U | U | U | U | U | U | F | F | F |
| 59 | U | U | U | U | U | U | U | U | U | U | F | F | F | F |
| 60 | U | U | U | U | U | U | U | U | U | F | F | F | F | F |
| 61 | F | F | F | F | F | F | F | F | F | F | F | F | F | D |
| 62 | F | F | F | F | F | F | F | F | F | F | F | F | D | D |
| 63 | F | F | D | D | D | D | D | D | D | D | D | D | D | D |
| 64 | F | F | D | D | D | D | D | D | D | D | D | D | D | D |
| 65 | F | F | F | D | D | D | D | D | D | D | D | D | D | D |
| 66 | F | F | F | F | D | D | D | D | D | D | D | D | D | D |
| 67 | F | F | F | F | F | D | D | D | D | D | D | D | D | D |
| 68 | F | F | F | F | F | F | D | D | D | D | D | D | D | D |
| 69 | U | F | F | F | F | F | F | F | F | F | F | F | F | F |
| 70 | U | U | F | F | F | F | F | F | F | F | F | F | F | F |
| 71 | U | U | U | F | F | F | F | F | F | F | F | F | F | F |
| 72 | U | F | F | F | F | F | F | F | F | F | F | F | F | D |
| 73 | U | U | F | F | F | F | F | F | F | F | F | F | F | D |
| 74 | U | U | U | F | F | F | F | F | F | F | F | F | F | D |
| 75 | U | F | F | F | F | F | F | F | F | F | F | F | D | D |
| 76 | U | U | F | F | F | F | F | F | F | F | F | F | D | D |
| 77 | U | U | U | F | F | F | F | F | F | F | F | F | D | D |
| 78 | U | F | F | F | F | F | F | F | F | F | F | D | D | D |
| 79 | U | U | F | F | F | F | F | F | F | F | F | D | D | D |
| 80 | U | U | U | F | F | F | F | F | F | F | F | D | D | D |
| 81 | U | U | U | U | U | U | U | U | U | U | U | U | F | D |
| 82 | U | U | U | U | U | U | U | U | U | U | U | F | F | D |
| 83 | U | U | U | U | U | U | U | U | U | U | F | F | F | D |
| 84 | U | U | U | U | U | U | U | U | U | U | U | F | D | D |
| 85 | U | U | U | U | U | U | U | U | U | U | F | F | D | D |
| 86 | U | U | U | U | U | U | U | U | U | F | F | F | D | D |
| 87 | U | F | D | D | D | D | D | D | D | D | D | D | D | D |
| 88 | U | U | F | D | D | D | D | D | D | D | D | D | D | D |
| 89 | U | U | U | F | D | D | D | D | D | D | D | D | D | D |
| 90 | U | F | F | D | D | D | D | D | D | D | D | D | D | D |
| 91 | U | U | F | F | D | D | D | D | D | D | D | D | D | D |
| 92 | U | U | U | F | F | D | D | D | D | D | D | D | D | D |
| 93 | U | F | F | F | D | D | D | D | D | D | D | D | D | D |
| 94 | U | U | F | F | F | D | D | D | D | D | D | D | D | D |
| 95 | U | U | U | F | F | F | D | D | D | D | D | D | D | D |
| 96 | U | U | U | U | U | U | U | F | F | F | F | F | F | D |
| 97 | U | U | U | U | U | F | F | F | F | F | F | F | F | D |
| 98 | U | U | U | U | U | F | D | D | D | D | D | D | D | D |
| 99 | U | U | U | U | F | D | U | U | U | U | U | U | F | D |
| 100 | U | U | F | D | D | D | U | U | F | D | D | D | D | D |
| 101 | U | F | D | D | D | D | U | F | D | D | D | D | D | D |
| 102 | U | U | U | U | F | F | U | U | U | U | U | F | F | D |
| 103 | U | U | F | F | D | D | U | U | F | F | D | D | D | D |
| 104 | U | F | F | D | D | D | U | F | F | D | D | D | D | D |
| 105 | U | F | F | F | F | F | D | U | F | F | F | F | F | D |
| 106 | U | U | F | F | F | F | D | U | U | F | F | F | F | D |
| 107 | F | F | F | F | F | F | U | U | U | U | U | U | U | U |
| 108 | U | U | F | F | F | D | D | D | U | U | U | U | U | U |
| 109-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

Even in the case that a slot format having an order of U-F-D is proposed, it may be problematic whether the slot format is enough to support SDM/FDM between an MT and a DU.

In an IAB system based on a TDM operation of an MT and a DU, it is assumed that a DL transmission timing is arranged throughout IAB nodes and an IAB donor. For SDM/FDM between an MT and a DU a symbol-level timing alignment in an IAB node may be required, but an application of a new timing alignment may be required for the symbol-level timing alignment.

Figure 40:
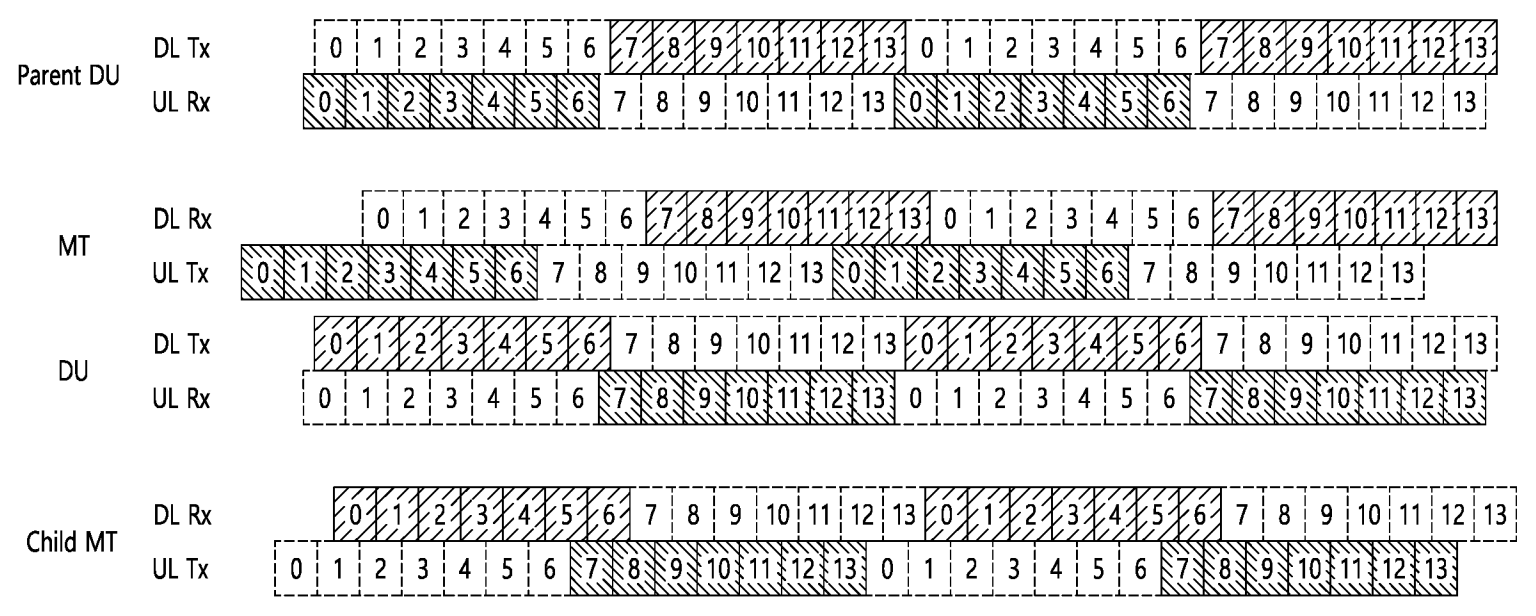
Figure 41:
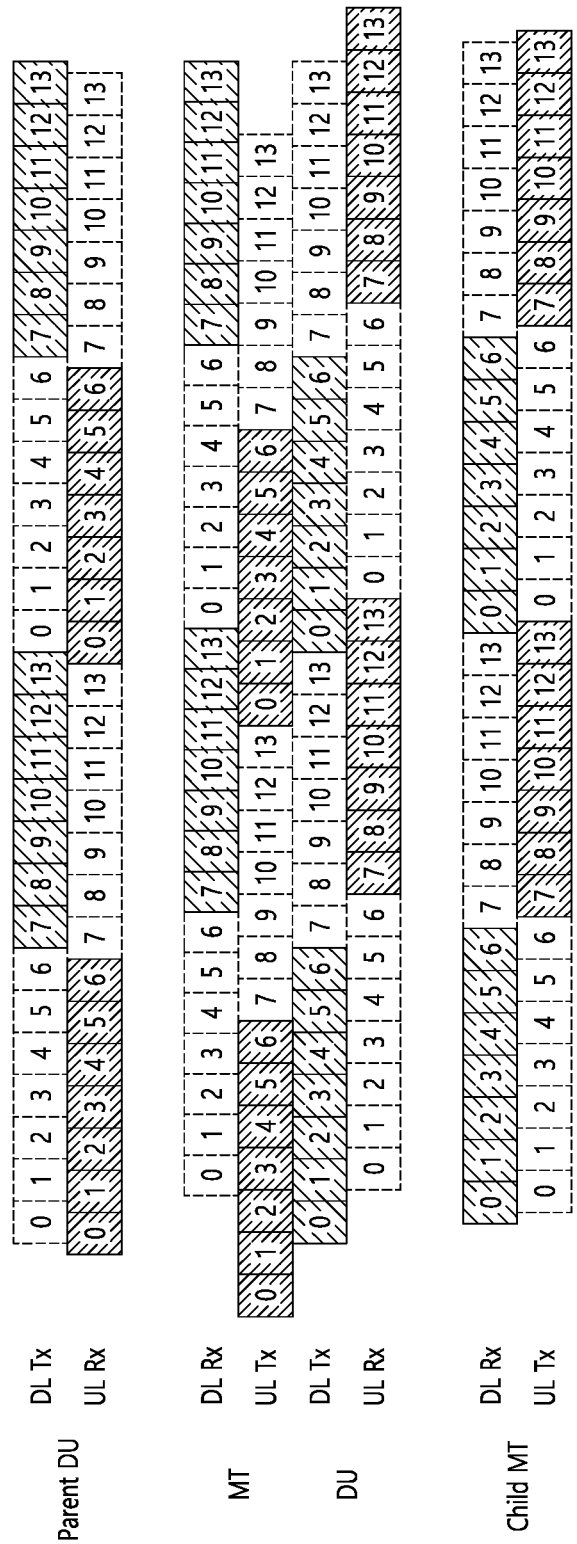
FIG. 41 illustrates another example of a transmission and reception timing between IAB nodes.

FIG. 40 illustrates an example of a transmission and reception timing between IAB nodes. FIG. 41 illustrates another example of a transmission and reception timing between IAB nodes. Referring to FIG. 40 and FIG. 41, a parent DU and MT may be allocated to UL and DL, respectively, for symbol 0 to symbol 6 and symbol 7 to symbol 13.

In the case of the legacy slot format having a sequence order of D-F-U, because of propagation delay between a DU and an MT and transmission/reception switching time of a parent DU, a flexible resource needs to be allocated between DL and UL symbols. However, referring to symbol 6 and symbol 7 shown in FIG. 40 and FIG. 41, in the case of the slot format having an order of U-F-D, UL and DL symbols may be allocated to consecutive symbols. Accordingly, the slot format having a UL-DL sequence order and no flexible resource may be used for an MT.

Referring to FIG. 40 and FIG. 41, a UL transmission timing for an MT precedes a DL reception timing. Accordingly, in the case that OFDM symbols 7 to 13 are allocated to DL and symbols 0 to 6 are allocated to UL, for example, like DL symbols 11 to 13 and UL symbols 0 to 2, some DL symbols and UL symbols are overlapped, and an MT may be unable to determine its own operation in the overlapped symbols. To solve the problem, a flexible symbol is required as a role of a guard period between a UL symbol and a DL symbol, and for the purpose, a flexible symbol may be allocated before a UL symbol and/or after a DL symbol. Accordingly, a U-(F)-D slot format in which an additional flexible symbol is positioned at the beginning and/or the end of the slot may be required.

Different from the existing transmission/reception timing, when the timing as shown in FIG. 41 is applied, a DL reception timing may precede a UL transmission timing. A child MT shown in FIG. 41 has the timing relation. In this case, like symbol 6 and symbol 7 for a child MT, a DL symbol and a UL symbol may be allocated to consecutive symbols. Accordingly, a D-U slot format in which a flexible symbol is not present may be used for an MT. Additionally, in the case of a D-(F)-U slot format, like UL symbol 13 and DL symbol 0 of a child MT, when switching from UL to DL, an overlapping symbol may occur. Accordingly, to prevent the overlapping, a flexible symbol is required before a DL symbol and/or after a UL symbol.

As described above, for SDM/FDM between a DU and an MT, in addition to a U-F-D slot format, a slot format having a different sequence order needs to be considered. The required slot format may be changed depending on a transmission/reception timing alignment of IAB nodes, and further, an additional timing arrangement may also be considered. In the case that all slot formats necessary for SDM/FDM is supported without a determination of a timing alignment, slot formats of F-U-F-D-F and F-D-F-U-F need to be supported.

In the sequence order described above, the flexible resource part may be configured with zero. For example, the sequence order of F-U-D-F or F-U-F-D may be included.

Subsequently, a link availability configuration proposed in the present disclosure is described.

Through MT configuration and/or DU configuration, availability information on whether a resource can be used by MT and/or DU may be configured together with link direction information or separately.

When the link availability information is configured to DU, the link availability information may include some or all of the following types.

hard (H): the corresponding time resource is always available for DU child link.

soft (S): the availability of the corresponding time resource for the DU child link is explicitly and/or implicitly controlled by the parent node.

not available (NA): resource not used for communication on the DU child link.

When the link availability information is configured for the MT, each link availability type may be as follows.

hard (H): the corresponding time resource is always available for MT parent link.

soft (S): the availability of the corresponding time resource for the MT parent link is explicitly and/or implicitly controlled by the parent node.

not available (NA): resource not used for communication on the MT parent link.

In one example, it may be configured that there is the same link availability type in a slot format pattern or a link direction configuration.

When the period of link direction configuration for MT and/or DU is P, the same link availability type may be provided in units of P or units larger than P.

(1-1) The same link availability type may be configured in units of a specific period K (e.g., 20 ms). In this case, the corresponding period may be the same as the slot format period or a value greater than the slot format period. For example, N link availability types may be configured, and N link availability types may be sequentially applied in units of a specific K ms. This configuration may be repeated with a period of K*N ms.

(1-2) The same link availability type may be configured in units of the slot format period P. Here, when two or a plurality of slot format patterns are combined to form a slot format having one P period, the same link availability type may be provided in P units, which is the period of the combined slot format. For example, N link availability types may be configured, and N link availability types may be sequentially applied in units of the slot format period P. This configuration may be repeated with a period of P*N ms.

(1-3) The same link availability type may be configured in units of slot format patterns. When two or a plurality of slot format patterns are combined to form a slot format having one P period, each slot format pattern unit may have the same link availability type. As a specific configuration method, the type of link availability of the slot format pattern may be configured together with the slot format pattern.

In another example, it may be configured that there are different link availability types in a slot format pattern or a link direction configuration.

In the slot format pattern, each resource may have a different link availability type. In this case, a method of configuring link availability may be as follows.

(2-1) One link availability type may be determined for each link direction type within the slot format pattern. For example, in the slot format pattern, a downlink resource may be configured as a hard resource, an uplink resource as a soft resource, and a flexible resource as a not-available resource. Here, different link direction types may have the same link availability type.

(2-2) a resource region for each link availability type may be configured in the period P constituting the slot format pattern. For example, when the period constituting the slot format pattern is 1 ms, a resource region constituting each link availability type may be configured within the corresponding 1 ms. A method of configuring the resource region may be specifically as follows.

A resource region constituting the slot format pattern may be divided into three time domain regions, and each region may have one link availability type among H, S, and NA. Here, each of the three time domain regions may have a different link availability type. Alternatively, it may be allowed for the three time domain regions to have the same link availability type. To this end, the type of resource that each time domain region can possess may be informed and the length of each region may be informed. In order to indicate the length of each region, the length of the first region and the third region may be indicated, and the remaining time domain region that is not configured may be the second region. Here, the indication of the time length may be defined as the sum of the number of slots and the number of symbols, similar to the configuration in TDD-UL-DL-ConfigCommon.

A hard resource region and a not-available resource region may be configured within the resource region constituting the slot format pattern. In this case, the remaining time domain region may be configured as a soft resource region. Here, the hard resource region and the not-available resource region may be contiguously configured.

When the hard resource region and the not-available resource region are contiguously configured, R1 resource position may be configured by configuring O1, which is the offset length of the starting point of the hard resource region from the start position of the hard resource region, that is, the starting point of the slot format pattern, and T1, which is the length of the hard resource region. Also, the not-available resource position may be configured by configuring O2, which is the offset length of the starting point of the not-available resource region from the start position of the not-available resource region, that is, the starting point of the slot format pattern, and T2, which is the length of the not-available resource region.

Alternatively, when the hard resource region and the not-available resource region are contiguously configured, the resource position of the first region may be configured by configuring O1, which is the offset length of the starting position of the first region, that is, the starting point of the first resource region from the starting point of the slot format pattern, and T1, which is the length of the hard resource region. Also, the resource position of the second region may be configured by configuring O2, which is the offset length of the starting position of the second resource region, that is, the starting point of the second resource region from the starting point of the slot format pattern, and T2, which is the length of the second resource region. Here, whether the first resource and the second resource are 1) a hard resource and a not-available resource, or 2) a not-available resource and a hard resource may be indicated, respectively.

The present disclosure proposes that a default region is configured as a soft resource, and a hard resource and a not-available resource are configured, but the above description may be applied even when the default region is a hard resource or a not-available resource.

A hard resource region and a not-available resource region may be configured in the resource region constituting the slot format pattern. Here, the remaining time domain region may be a soft resource region. Here, the hard resource region and the not-available resource region may be configured discontinuously.

As a specific method for this, a first continuous region in the resource region constituting the slot format pattern may be configured, and a link availability type (hard resource or not-available resource) of the corresponding region may be indicated. Then, a next continuous region may be configured, and a link availability type of the corresponding area may be indicated. In this way, it is possible to configure link availability types for a plurality of consecutive regions within the resource region constituting the slot format pattern.

Figure 42:
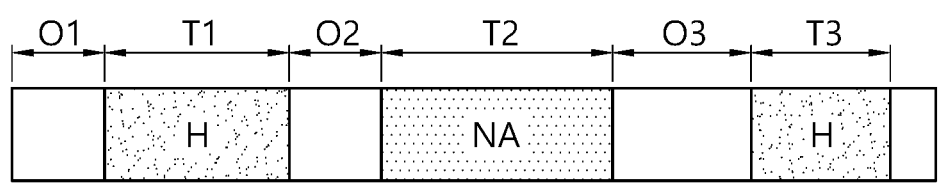
FIG. 42 illustrates an example of a method for configuring a link availability type.

FIG. 42 illustrates an example of a method for configuring a link availability type.

Referring to FIG. 42, an offset (i.e., O1) from a starting position of a resource duration for which a configuration for the first region configures a slot format pattern and a length (i.e., T1) of the first region may be configured, and a link availability type of the resource may be configured as a hard resource. An offset (i.e., O2) from an end position of the first region to a starting position of the second region and a length (i.e., T2) of the second region may be configured, and a link availability type of the resource may be configured as a non-available resource. Additionally, an offset (i.e., O3) from an end position of the second region to a starting position of the third region and a length (i.e., T3) of the third region may be configured, and a link availability type of the resource may be configured as a hard resource. In this case, the remaining unconfigured resource becomes a soft resource.

It is proposed that a default region is configured as a soft resource and that a hard resource and a not-available resource are configured in this proposal, but the above description may be applied even when the default region is configured as a hard resource or a not-available resource.

In another example, a method for informing a link availability pattern in units of slot may be considered.

Similar to TDD-UL-DL-ConfigDedicated configuration, link availability configuration may be performed in units of slots.

To this end, for example, one of several types of link availability patterns may be configured in units of slots, and such link availability patterns may include the following.

allHard: all symbols in the slot are defined as hard resources.

allSoft: all symbols in the slot are defined as soft resources.

allNotAvailable: all symbols in the slot are defined as not-available resources.

explicit: a hard resource, a soft resource, and/or a not-available resource exist together in the slot.

In this specification, one or a plurality of 'explicit' link availability patterns may exist. More specifically, the 'explicit' link availability pattern may be defined as follows.

As shown in FIG. 34 (a), when one slot is divided into R1, R2, and R3 regions, the number of symbols of the R1 region, T1, and the link availability type possessed by R1 may be configured. Then, the number of symbols of the R3 region, T3, and the link availability type of R3 may be configured. Link availability types that can be configured may be hard, soft, and/or not-available. Here, if the link availability type of R1 is hard, the link availability type that R3 can have may be soft or not-available. Here, the remaining link availability type not configured for R1 and R2 may become the link availability type of R2.

As shown in FIG. 34 (b), a plurality of regions may exist in one slot. Here, the region within the slot is divided into R1, R2, and the remaining regions. The R1 region and the R2 region may be configured as hard resources or not-available resources, and R1 and R2 may have different link availability types. The remaining region other than R1 and R2 may be configured as soft resources.

Here, R1 resource location may be configured by configuring O1, which is the starting symbol location of R1, and T1, which is the number of symbols in R1. In addition, R2 resource location may be configured by configuring O2, which is the end symbol location of R2, and T2, which is the number of symbols in R2.

Additionally, in order to configure the link availability type of R1 and R2, whether R1 and R2 are respectively configured as 1) a hard resource and a not-available resource, or 2) a not-available resource and a hard resource may be indicated.

A plurality of 'explicit' link availability patterns may be defined, and link availability types may be located in a different order for each 'explicit' link availability pattern. For example, resources may be located in the link availability order of H-S-NA in the 'explicit 1' link availability pattern, and resources may be located in the link availability order of S-H-NA in the 'explicit 2' link availability pattern. In this case, for example, for each 'explicit' link availability pattern, the number of symbols of the link availability type located at the beginning and the number of symbols of the type of link availability type located at the end may be informed. The content of the present disclosure may include a case in which resources having the same link availability type are located in non-consecutive symbols in the 'explicit' link availability pattern.

In still another example, a method for selecting one of link availability patterns determined in a unit of slot may be considered.

When there are a plurality of patterns in which link availability types are defined for each symbol or symbol group position in a slot, a link availability pattern to be applied for each slot may be informed by configuring the index of the link availability pattern to be applied in the corresponding slot. For example, when configuring the index of the link availability pattern for each slot for P slots, a correspondingly configured pattern in units of P slots may be periodically repeated and applied.

In still another example, a method for informing a link availability type in a 2-stage scheme may be considered.

Considering that the amounts of H, S, and NA resources are not evenly located in general, the following method can be applied.

Assuming that the three types of link availability are type 1, type 2, and type 3, respectively, whether the link availability type of a specific resource is type 1, type 2, or type 3 may be indicated by 1-bit information. That is, for example, if the bit information indicates 0, the link availability type of the corresponding resource may be type 1, and if the bit information indicates 1, the link availability type of the corresponding resource may be type 2 or type 3. Thereafter, for resources indicated as type 2 or type 3, additional 1-bit information may indicate whether the link availability type of the resource is type 2 or type 3. That is, for example, for a resource previously indicated as type 2 or type 3, if the additionally transmitted bit information indicates 0, the link availability type of the resource is type 2, and the additionally transmitted bit information indicates 1, the link availability type of the resource may be type 3.

In other words, when each of two types of 1-bit information that informs a link availability of a resource is defined as first information and second information, respectively, the first information may inform whether the link availability of the resource is type 1 or not. In the case that the link availability of the resource is determined as not type 1, the resource may be determined as type 2 or type 3 according to the second information.

For example, when type 1, type 2, and type 3 is S, H, and NA, respectively, in stage 1, for a specific resource region, whether the corresponding resource is either S, or H or NA may be indicated. More specifically, it is possible to indicate whether a corresponding resource is a soft resource, a hard resource, or a not-available resource for each symbol or for each symbol group. Thereafter, in stage 2, for the resource region indicated as a hard resource or a not-available resource in stage 1, whether the corresponding resource is a hard resource or a not-available resource may be indicated. Specifically, this indication may also indicate whether a corresponding resource is a hard resource or a not-available resource for each symbol or for each symbol group.

Compared to the indication of whether the resource is a hard resource, a soft resource or a not-available resource for each resource, this configuration method may be effective in reducing configuration overhead when one link availability type has a higher resource ratio than other link availability types.

Here, the link availability type indicated by the type 1 may be as follows. When the link availability indicated by the type 1 is determined, the link availability indicated by the type 2 and the type 3 may be automatically determined among the remaining link availability types.

Particularly, the method for informing a link availability type in a 2-stage scheme may be configured to satisfy at least one of the following conditions.

(Condition 1) The type of link availability indicated by Type 1 may be fixed as a soft resource.

(Condition 2) In the case of configuring the link availability of the MT, the type of link availability indicated by the type 1 may be configured cell-specifically or MT-specifically. In the case of configuring the link availability of the DU, the type of link availability indicated by type 1 may be configured DU-specifically or child link-specifically.

(Condition 3) When configuring link availability, information on the type of link availability indicated by type 1 may be configured together.

Subsequently, a method for configuring a relatively longer slot format period proposed in the present disclosure is described.

Compared to the existing cellular environment in which the link directions between terminals are relatively aligned, in the IAB environment, the link directions between IAB nodes are often different from each other. For example, when the IAB node 2 and the IAB node 3 are located adjacent to each other, the IAB node 2 may receive downlink data from the IAB node 1, and the IAB node 3 may transmit the downlink data to the terminal. In this case, the signal transmitted by the IAB node 3 may act as an interference to the data reception of the IAB node 2. Therefore, more flexible resource multiplexing is required between IAB nodes compared to the conventional method. For another reason, the duration for the DU configuration may be shorter than the period of the cell-specific signal/channel. In this case, it may be inefficient to configure all candidate resources as DU hard resources or soft resources for cell-specific signal/channel transmission. For example, the DU configuration may be repeated every 20 ms, but a cell-specific signal may be transmitted every 160 ms. Cell-specific signal transmission may be allocated to DU hard resources. Then, since the time duration for DU configuration is shorter than the cell-specific signal transmission period, resources usable for the cell-specific signal must be configured as hard resources. Then, in some time interval, even if the DU resource is not used for cell-specific signal transmission, the resource may also be a hard resource and cannot be used for MT operation. For this reason, the duration of the slot format pattern configured for the IAB node needs to support a length longer than the duration of the slot format pattern supported previously. This slot format may include link direction information and/or link availability information.

Accordingly, the present disclosure proposes a particular method for indicating a pattern in the case that a longer slot format pattern than the previous pattern is introduced.

In one example, in an NR system, when a slot format period is denoted as P, a value of P may be selected as one of values of $\{0.5, 0.625, 1, 1.25, 2, 2.5, 5, 10\}$ ms. In the case that two slot format pattern are combined and one slot format having one greater period is made, when periods of the two slot format pattern are denoted as P1 and P2, respectively, the slot format period P becomes a summation of P1 and P2 (P=P1+P2). In this case, such a P value needs to be divisible by 20 ms.

In this case, in order to increase a slot format period for an IAB node, the following method may be used.

(Method 1) It is possible to increase the maximum period value that the slot format can have. Specifically, a larger value may be included in the value of P, which is a period of a configurable slot format. That is, a larger value than before may be added to the period value (DL-UL-TransmissionPeriodicity) that can be set with TDD-UL-DL-Config-Common. As an example, if the value of the existing P is selected as one of $\{0.5, 0.625, 1, 1.25, 2, 2.5, 5, 10\}$ ms, values greater than 10 ms (e.g., 20 ms, 40 ms, etc.) may be added.

(Method 2) It is possible to increase the maximum period value that can be generated by combining the slot format patterns. Specifically, assuming that the periods of the two slot format patterns are P1 and P2, respectively, when two slot format patterns are combined to create a slot format with one large period P (P=P1+P2), values greater than 20 ms can be divisible by P. That is, when K>20 ms, the value of P can be limited so that K is divided by P. In this case, the K value may be a predefined value or configured by RRC, F1AP signaling, or the like.

(Method 3) More slot format patterns can be combined to create long-period patterns. Specifically, the number M of slot format patterns that can be combined to make a slot format having one large period P may be increased to more than two. In the case of creating a slot format having one large period P by combining M slot format patterns, P=P1+P2+ . . . +PM when the period of the i-th slot format pattern is Pi. In this case, when K is divided by the P value, the P value may be limited so that it is divided. Additionally, K>20 ms. In this case, the values of M and/or K may be predefined or configured by RRC, F1AP signaling, or the like. Alternatively, characteristically, the value of K may be defined as 10*M ms. In this case, the value of M may additionally be selected/determined from among 2n such as 1, 2, 4, 8, and the like.

(Method 4) A pattern with a long period can be generated by combining a plurality of slot format periods with a period of K ms. Specifically, when a slot format made to have a larger period by combining two existing slot format patterns for creating a slot format having a larger period than the existing one is called a combined slot format, a plurality of combined slot formats may be generated, and the combined slot format may be used in units of K ms (e.g., 20 ms). For example, slot format A+B may be generated by combining slot format patterns A and B, and slot format C+D may be generated by combining slot format patterns C and D. In this case, slot format A+B and slot format C+D may be sequentially used in units of 20 ms. In this case, the values of M and/or K may be predefined or configured by RRC, F1AP signaling, or the like. In this case, the value of M may additionally be selected/determined from among $2^n$ such as 1, 2, 4, 8, and the like.

Meanwhile, characteristically, when there are a plurality of methods for combining a plurality of slot format patterns, information on which of these methods is used to generate a slot format having a large period may be configured by RRC, F1AP signaling, or the like.

Characteristically, the slot format pattern having such a longer period may be not applied to link direction configuration, but may be applied only to link availability configuration. For flexible resource multiplexing between different IAB nodes or between MTs and DUs within the same IAB node, it may be necessary to increase flexibility of link availability rather than link direction. Therefore, in the case of link availability configuration, it is possible to use the above-described method to have a longer period than the link direction configuration.

Figure 43:
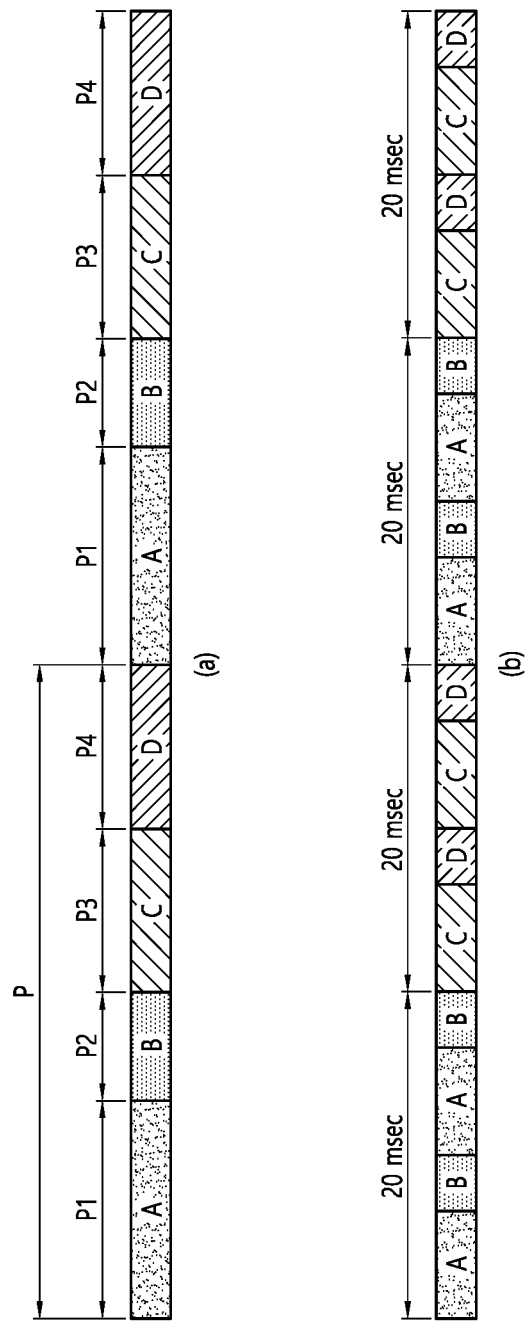
FIG. 43 illustrates an example to which a method for increasing a slot format period for an IAB node is applied.

FIG. 43 illustrates an example to which a method for increasing a slot format period for an IAB node is applied. Particularly, (a) of FIG. 43 illustrates an example to which method 3 is applied, and (b) of FIG. 43 illustrates an example to which method 4 is applied.

Referring to (a) of FIG. 43, four slot format patterns having periods of P1, P2, P3, and P4 are combined, and a slot format having a greater period P (P=P1+P2+P3+P4) may be made. Such a combined slot format may be repeated with period P.

Referring to (b) of FIG. 43, slot format pattern A and slot format pattern B may be combined, and applied for 20 ms, and in a subsequent 20 ms, slot format pattern C and slot format pattern D may be combined. In this case, there is an effect that a slot format of a period of 40 ms is used. In the example above, two slot formats having a period of 20 ms are combined and a slot format having a greater period is configured. However, this is just an example, and M slot formats having a period of K ms may be combined, and a slot format having a period of K*M ms may be configured.

Figure 44:
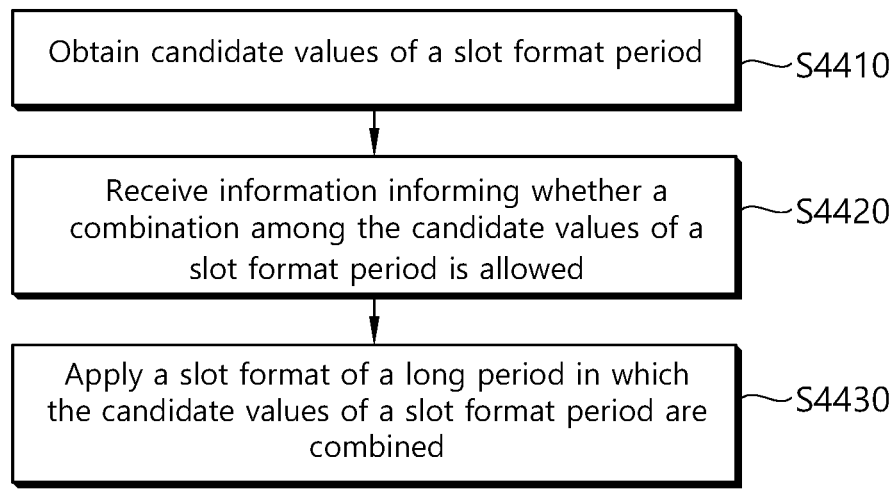
FIG. 44 is a flowchart for an example of a method for applying a longer slot format period according to an implementation of the present disclosure.

FIG. 44 is a flowchart for an example of a method for applying a longer slot format period according to an implementation of the present disclosure.

Referring to FIG. 44, an IAB node obtains candidate values of a slot format period (step S4410).

Thereafter, the IAB node receives information informing whether a combination among the candidate values of a slot format period is allowed (step S4420).

When the combination is allowed, the IAB node applies a slot format of a long period in which the candidate values of a slot format period are combined (step S4430). Here, the slot format of a long period may be determined based on one of the methods described above.

Figure 45:
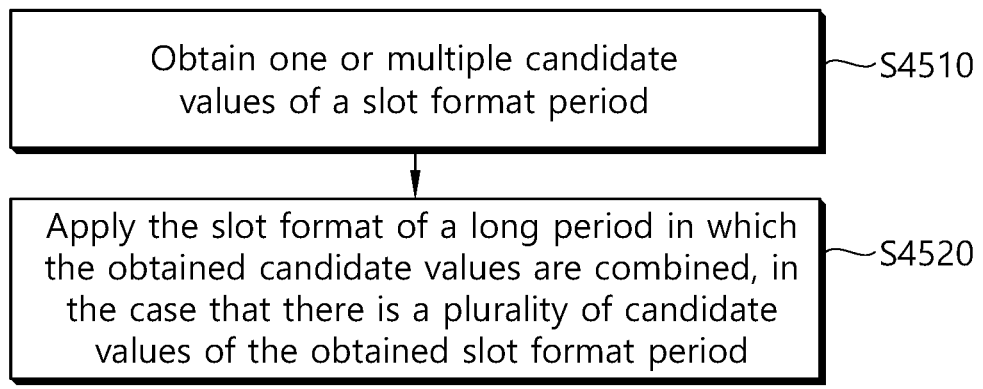
FIG. 45 is a flowchart of another example of a method for applying a longer slot format period according to an implementation of the present disclosure.

FIG. 45 is a flowchart of another example of a method for applying a longer slot format period according to an implementation of the present disclosure.

Referring to FIG. 45, an IAB node obtains one or multiple candidate values of a slot format period (step S4510).

In the case that there is a plurality of candidate values of the obtained slot format period, the IAB node applies the slot format of a long period in which the obtained candidate values are combined (step S4520). Here, the slot format of a long period may be determined based on one of the methods described above.

Hereinafter, a default slot format proposed in the present disclosure is described. The default slot format may include a default link direction configuration and a default link availability configuration.

First, the default link direction configuration is described.

For the link direction configuration of the MT, before the IAB node MT receives the configuration, it is necessary to define a default link direction configuration that is assumed to be its own link direction configuration. The default link direction configuration may be applied before first receiving the link direction configuration of the MT after initial access to the parent DU. Also, the default link direction configuration may be applied until a new MT link direction configuration is received from a changed parent DU when the parent DU is changed The default link direction configuration of an MT described above may be defined as below.
- (Definition 1-1) it can be assumed that all resources are flexible resources.
- (Definition 1-2) it can be assumed to be same as a default link direction configuration of the slot format configuration used in the access link of the parent node for the corresponding MT.
- (Definition 1-3) A cell-specific slot format configuration (e.g., TDD-UL-DL-ConfigCommon) used in the access link of the parent node for the corresponding MT may be assumed as the default link direction configuration.

In addition, before the IAB node DU receives the link direction configuration of the DU, a default link direction configuration that is assumed to be its own link direction configuration needs to exist. This default link direction configuration may be applied before receiving the initial link direction configuration after initial access to the parent DU. The default link direction configuration may be applied when the parent DU is changed until a new link direction configuration is received from the changed parent DU.

The default link direction configuration of a DU described above may be defined as below.
- (Definition 2-1) it can be assumed that all resources are flexible resources.
- (Definition 2-2) it can be assumed to be same as a default link direction configuration of the slot format configuration used in the access link of the parent node for the corresponding DU.
- (Definition 2-3) A cell-specific slot format configuration (e.g., TDD-UL-DL-ConfigCommon) used in the access link of the parent node for the corresponding DU may be assumed as the default link direction configuration.
- (Definition 2-4) The link direction information of MT configuration applied to the corresponding IAB node MT may be assumed as the default link direction configuration.
- (Definition 2-5) The default link direction configuration may be predefined.
- (Definition 2-6) The default link direction configuration may be configured through RRC, F1AP signaling, or the like. Hereinafter, the default link availability configuration is described.

Before the IAB node MT and/or DU receives its link availability configuration, a default link availability configuration that assumes its own link availability configuration needs to exist. This default link availability configuration may be applied before receiving the initial link availability configuration after initial access to the parent DU. When the parent DU is changed, the default link availability configuration may be applied until a new link availability configuration is received from the changed parent DU.

The default link availability configuration may be defined as follows.
- (Definition 3-1) it can be assumed that all resources are soft resources.
- (Definition 3-2) it can be assumed that all resources are not-available resources.
- (Definition 3-3) the default link availability configuration may be predefined.
- (Definition 3-4) the default link availability configuration may be configured through RRC, F1AP signaling, or the like.

Here, in the case of the link availability configuration of DU, it may be assumed that the resource through which the cell-specific signal/channel is transmitted is the DU hard resource.

Figure 46:
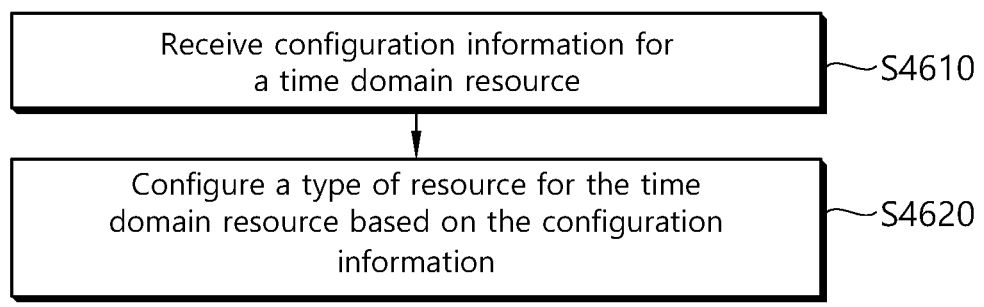
FIG. 46 is a flowchart of an example of a resource type configuration method of a node according to an implementation of the present disclosure.

FIG. 46 is a flowchart of an example of a resource type configuration method of a node according to an implementation of the present disclosure.

Referring to FIG. 46, a node receives configuration information for a time domain resource (step S4610). Here, the time domain resource may include a first region and a second region.

Later, the node configures a type of resource for the time domain resource based on the configuration information (step S4620). Here, the configuration information may inform a starting point of the first region, a first duration time of the first region, an end point of the second region, and a second duration time of the second region. In addition, here, the configuration information may inform whether the first region and the second region are a downlink resource and an uplink resource, or an uplink resource and a downlink resource, in a sequential order. Furthermore, here, the node may configure a resource, which is not the first region and the second region in the time domain resource, as a flexible resource.

Claims in the present disclosure may be combined in various ways. For instance, technical features in method claims of the present disclosure may be combined to be implemented or performed in an apparatus, and technical features in apparatus claims may be combined to be implemented or performed in a method. Further, technical features in a method claim and an apparatus claim may be combined to be implemented or performed in an apparatus. Further, technical features in a method claim and an apparatus claim may be combined to be implemented or performed in a method.

The methods proposed in the present disclosure may be workably connected to at least one computer readable medium including an instruction based on the execution by at least one processor, one or more processors, and one or more memories workably connected to the processor and storing instructions, except an IAB node. The one or more processors may also be executed by an apparatus configured to control an IAB node, which executes the instructions and performs the methods proposed in the present disclosure.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 47:
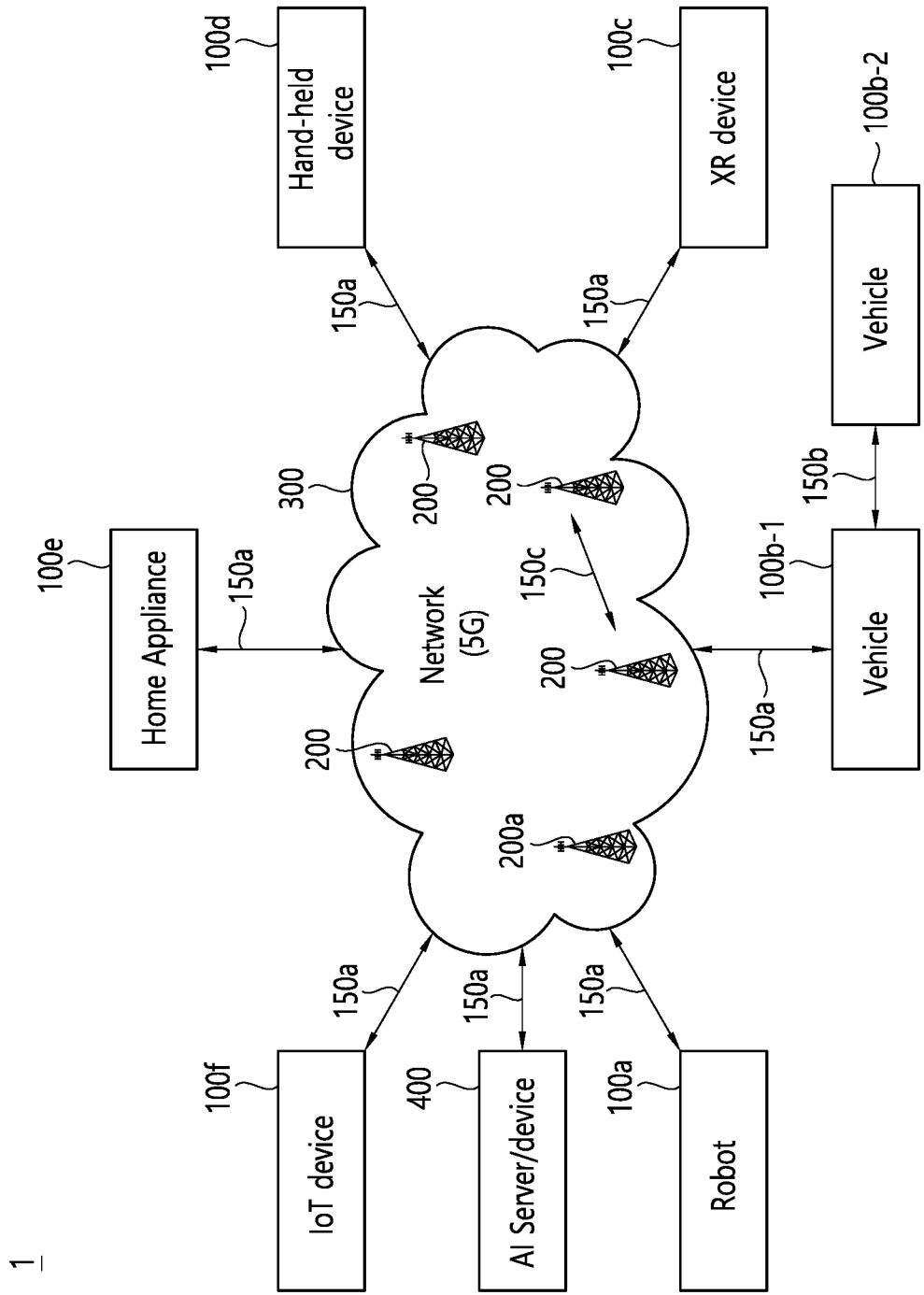
FIG. 47 illustrates a communication system 1 applied to the disclosure.

FIG. 47 illustrates a communication system 1 applied to the disclosure.

Referring to FIG. 47, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 48:
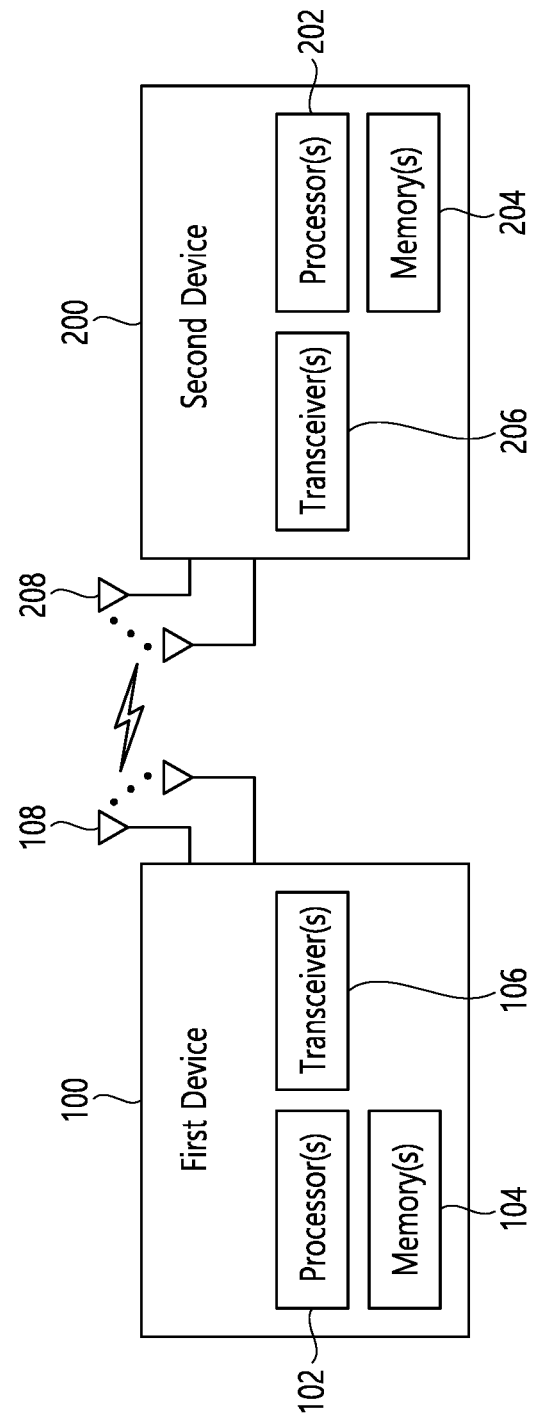
FIG. 48 illustrates a wireless device that is applicable to the disclosure.

FIG. 48 illustrates a wireless device that is applicable to the disclosure.

Referring to FIG. 48, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 47 and/or may respectively correspond to a wireless device 100x and a wireless device 100x of FIG. 47.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 49:
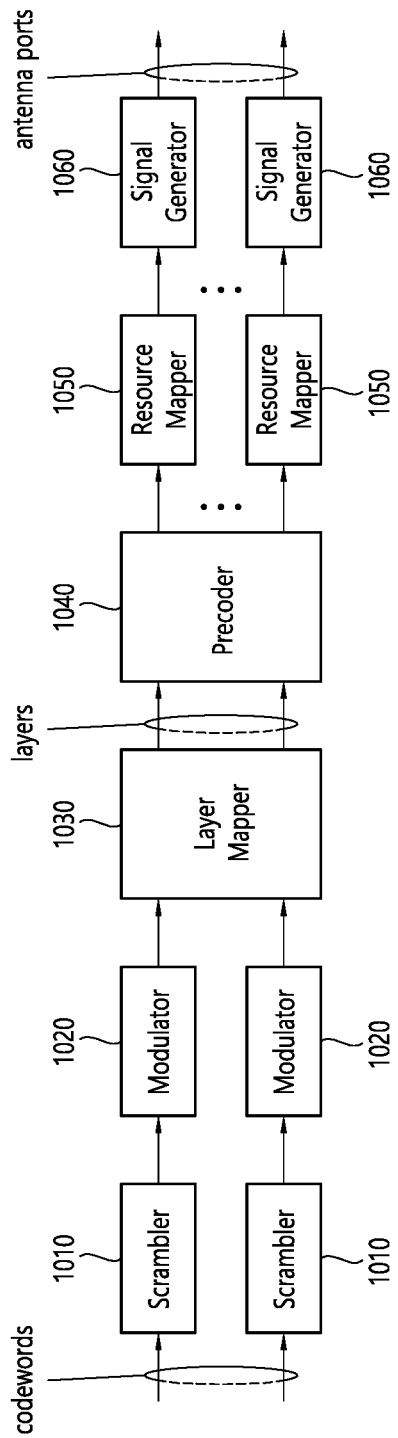
FIG. 49 illustrates a signal processing circuit for a transmission signal.

FIG. 49 illustrates a signal processing circuit for a transmission signal.

Referring to FIG. 49, the signal processing circuit 1000 may include a scrambler 1010, a modulator 1020, a layer mapper 1030, a precoder 1040, a resource mapper 1050, and a signal generator 1060. Operations/functions illustrated with reference to FIG. 49 may be performed, but not limited to, in the processor 102 and 202 and/or the transceiver 106 and 206 of FIG. 48. Hardware elements illustrated in FIG. 49 may be configured in the processor 102 and 202 and/or the transceiver 106 and 206 of FIG. 48. For example, blocks 1010 to 1060 may be configured in the processor 102 and 202 of FIG. 48. Alternatively, blocks 1010 to 1050 may be configured in the processor 102 and 202 of FIG. 48, and a block 1060 may be configured in the transceiver 106 and 206 of FIG. 48.

A codeword may be converted into a radio signal via the signal processing circuit 1000 of FIG. 49. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 49. For example, a wireless device (e.g., 100 and 200 of FIG. 48) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 50:
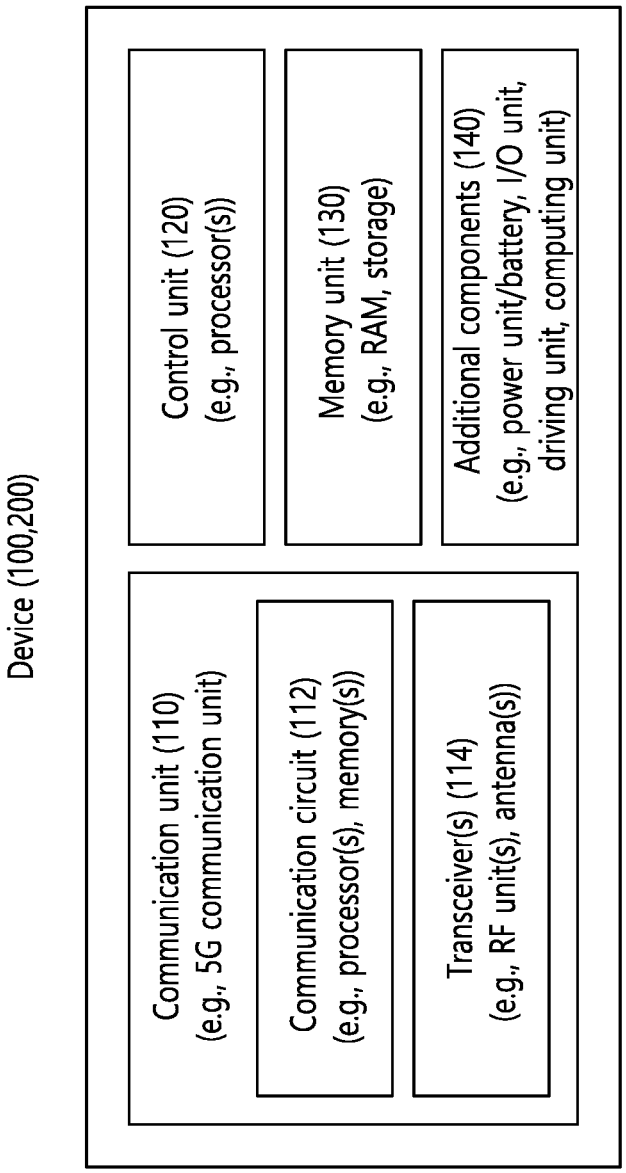
FIG. 50 illustrates another example of a wireless device applied to the disclosure.

FIG. 50 illustrates another example of a wireless device applied to the disclosure. The wireless device may be configured in various forms depending on usage/service.

Referring to FIG. 50, the wireless devices 100 and 200 may correspond to the wireless device 100 and 200 of FIG. 48 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 48. For example, the transceiver(s) 114 may include the at least one transceiver 106 and 206 and/or the at least one antenna 108 and 208 of FIG. 48. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100*a* in FIG. 47), a vehicle (100 *b*-1 or 100 *b*-2 in FIG. 47), an XR device (100 *c* in FIG. 47), a hand-held device (100 *d* in FIG. 47), a home appliance (100*e* in FIG. 47), an IoT device (100*f* in FIG. 47), a terminal for digital broadcasting, a hologram device, a public safety device, an MTC device, a medical device, a fintech device (or financial device), a security device, a climate/environmental device, an AI server/device (400 in FIG. 47), a base station (200 in FIG. 47), a network node, or the like. The wireless device may be mobile or may be used in a fixed place depending on usage/service.

In FIG. 50, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 50 is described in detail with reference to the accompanying drawing.

Figure 51:
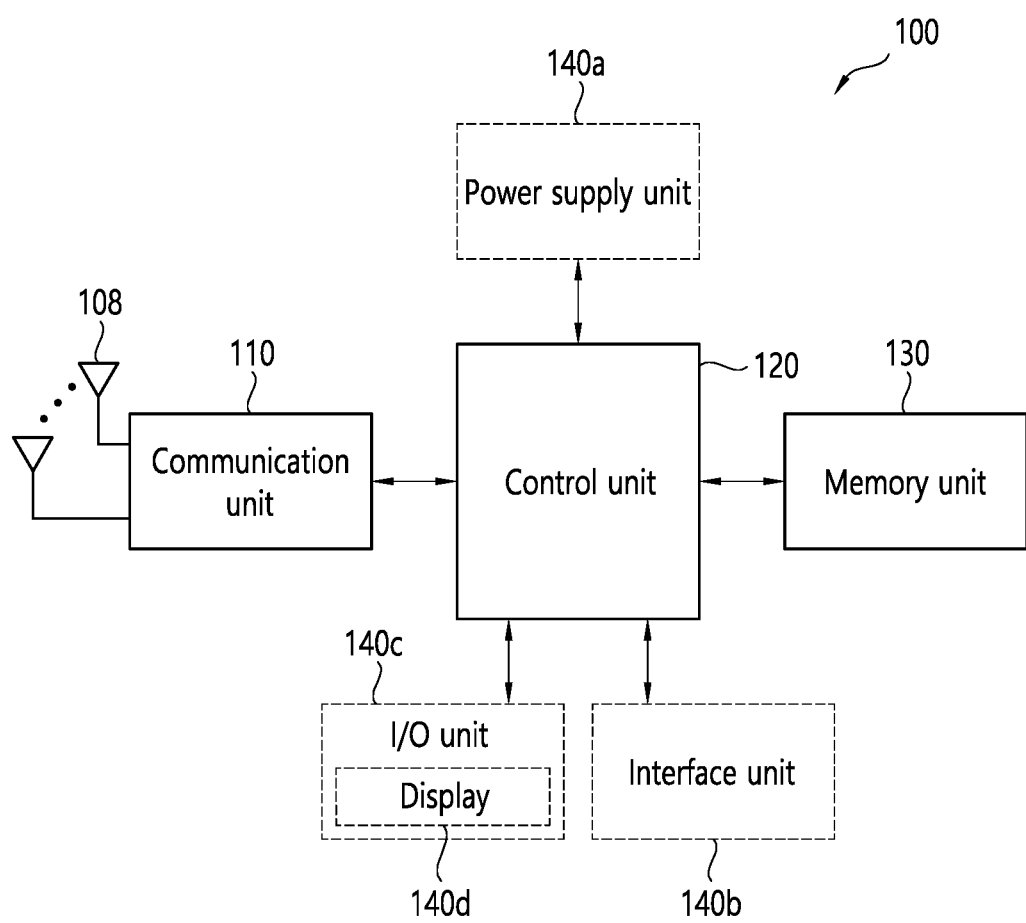
FIG. 51 illustrates a hand-held device applied to the disclosure.

FIG. 51 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 51, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 50, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 52:
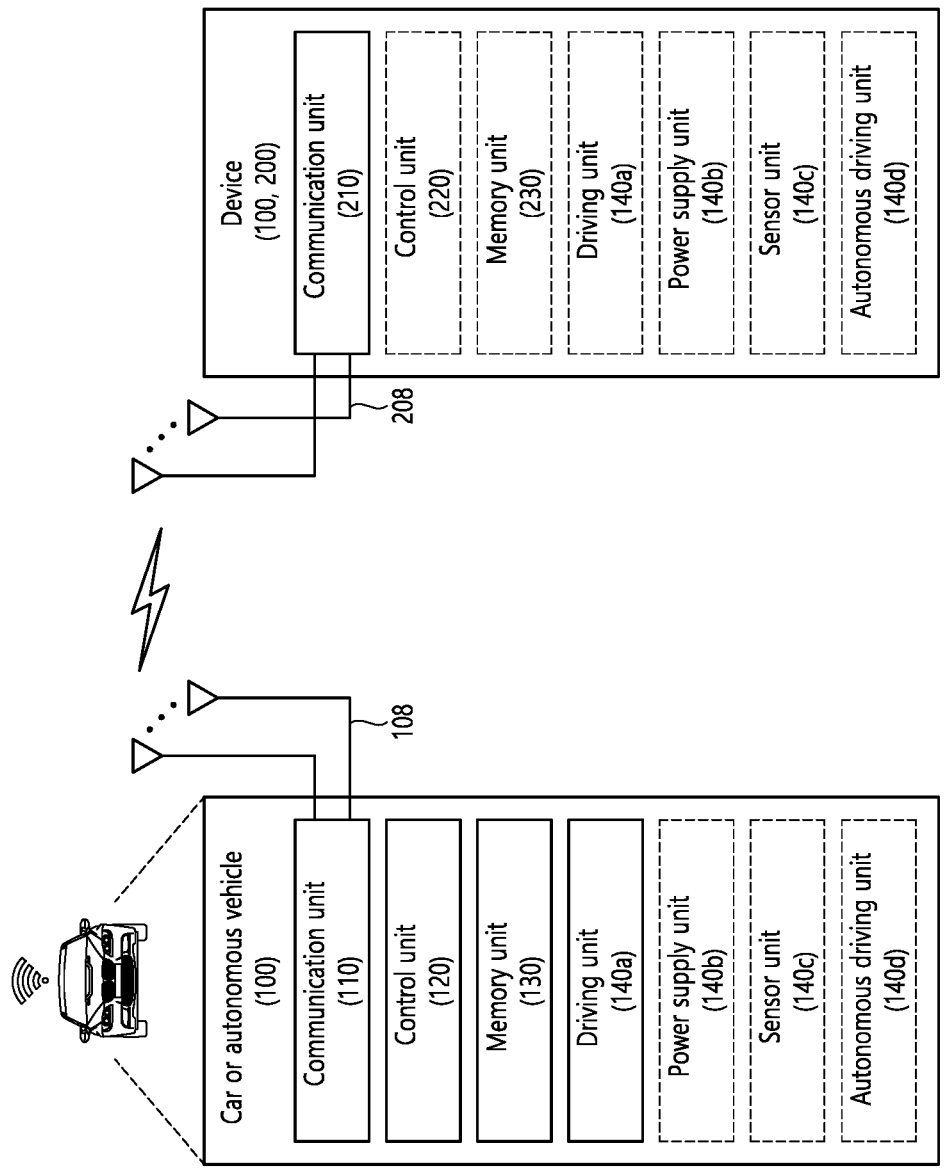
FIG. 52 illustrates a vehicle or an autonomous driving vehicle applied to the disclosure.

FIG. 52 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 52, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 50, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 53:
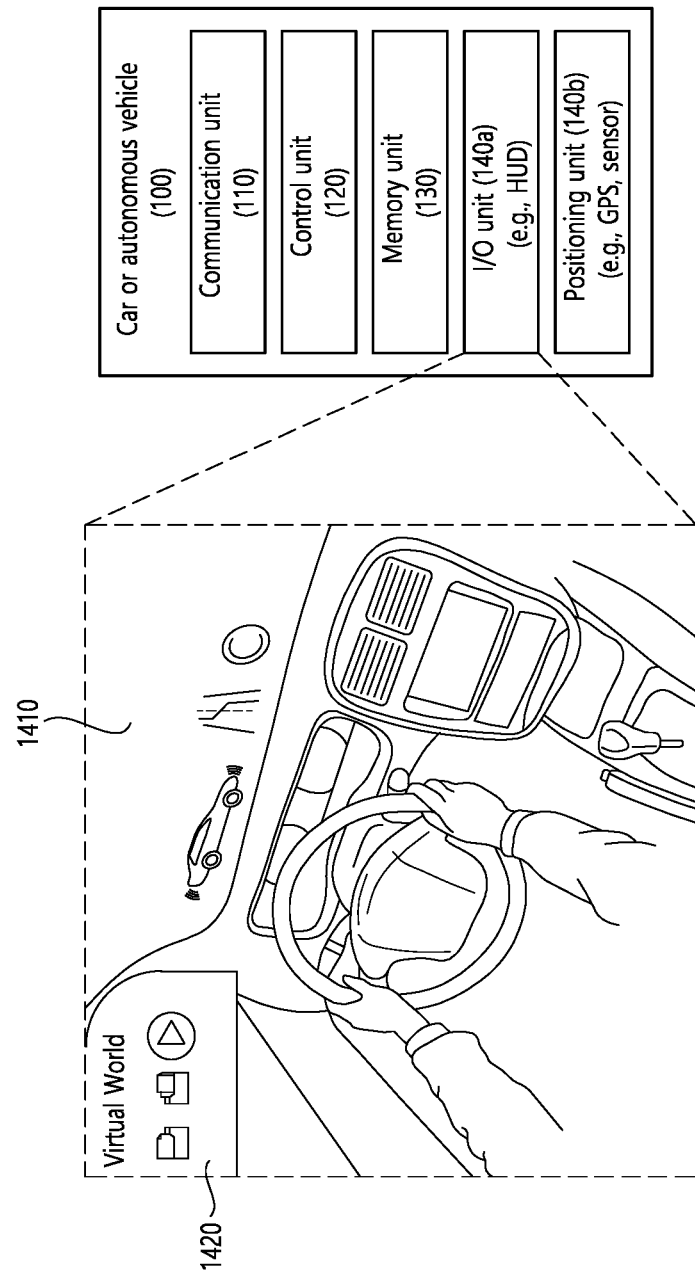
FIG. 53 illustrates a vehicle applied to the disclosure.

FIG. 53 illustrates a vehicle applied to the disclosure. The vehicle may be implemented as a means of transportation, a train, an air vehicle, a ship, and the like.

Referring to FIG. 53, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 50, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire position information of the vehicle 100. The location information may include absolute location information of the vehicle 100, location information within a driving line, acceleration information, location information with a neighboring vehicle, and the like. The positioning unit 140b may include a GPS and various sensors.

For example, the communication unit 110 of the vehicle 100 may receive map information, traffic information, and the like from an external server and store it in the memory unit 130. The positioning unit 140b may obtain vehicle position information through GPS and various sensors and store it in the memory unit 130. The control unit 120 may generate a virtual object based on map information, traffic information, vehicle location information, and the like, and the input/output unit 140a may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140a. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 54:
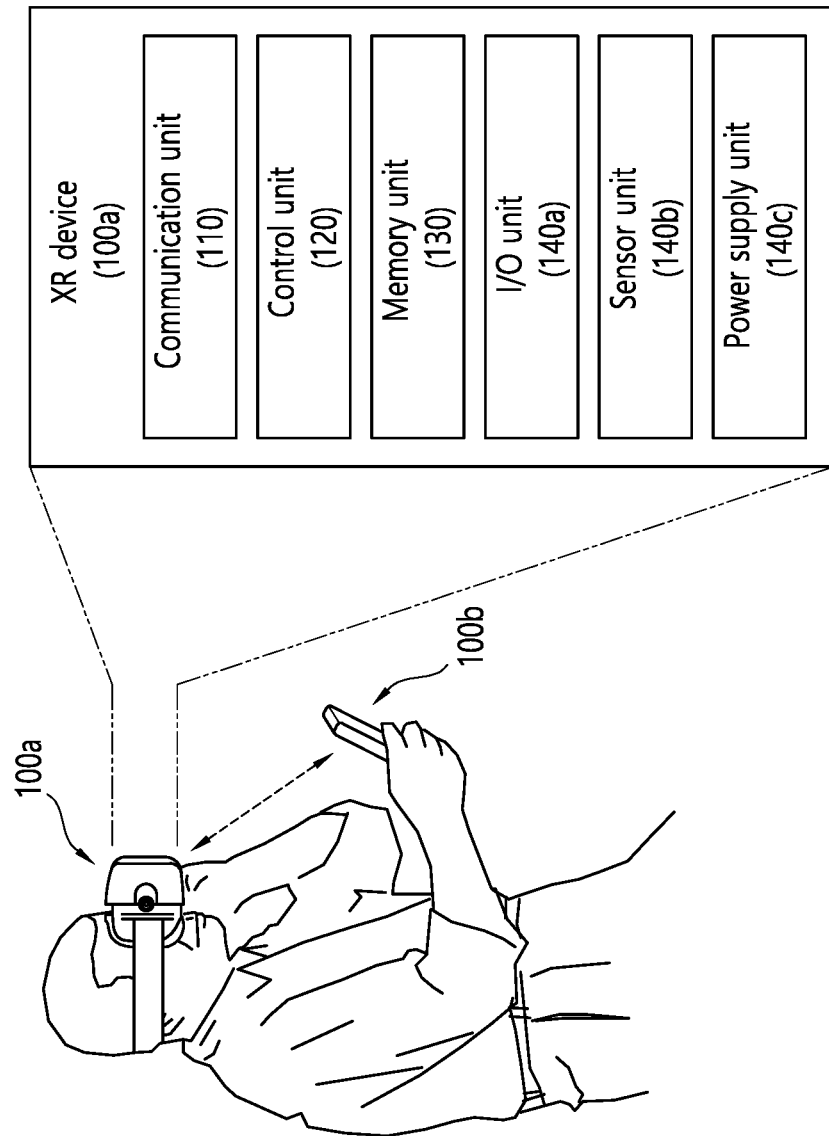
FIG. 54 illustrates a XR device applied to the disclosure.

FIG. 54 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 54, the XR device 100a may include a communication unit 110, a control unit 120, a memory unit 130, an input/output unit 140a, a sensor unit 140b and a power supply unit 140c. Herein, blocks 110 to 130/140a to 140c correspond to blocks 110 to 130/140 in FIG. 50.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100a to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100a/creating an XR object. The input/output unit 140a may obtain control information, data, and the like from the outside, and may output the generated XR object. The input/output unit 140a may include a camera, a microphone, a user input unit, a display unit, a speaker, and/or a haptic module. The sensor unit 140b may obtain an XR device state, surrounding environment information, user information, and the like. The sensor unit 140b may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating an XR object (e.g., AR/VR/MR object). The input/output unit 140a may obtain a command to operate the XR device 100a from the user, and the control unit 120 may drive the XR device 100a according to the user's driving command. For example, when the user wants to watch a movie or news through the XR device 100a, the control unit 120 transmits the content request information through the communication unit 130 to another device (e.g., the mobile device 100b) or can be sent to the media server. The communication unit 130 may download/stream contents such as movies and news from another device (e.g., the portable device 100b) or a media server to the memory unit 130. The control unit 120 controls and/or performs procedures such as video/image acquisition, (video/image) encoding, and metadata generation/processing for the content, and is acquired through the input/output unit 140a/the sensor unit 140b An XR object can be generated/output based on information about one surrounding space or a real object.

Also, the XR device 100a is wirelessly connected to the portable device 100b through the communication unit 110, and the operation of the XR device 100a may be controlled by the portable device 100b. For example, the portable device 100b may operate as a controller for the XR device 100a. To this end, the XR device 100a may obtain 3D location information of the portable device 100b, and then generate and output an XR object corresponding to the portable device 100b.

Figure 55:
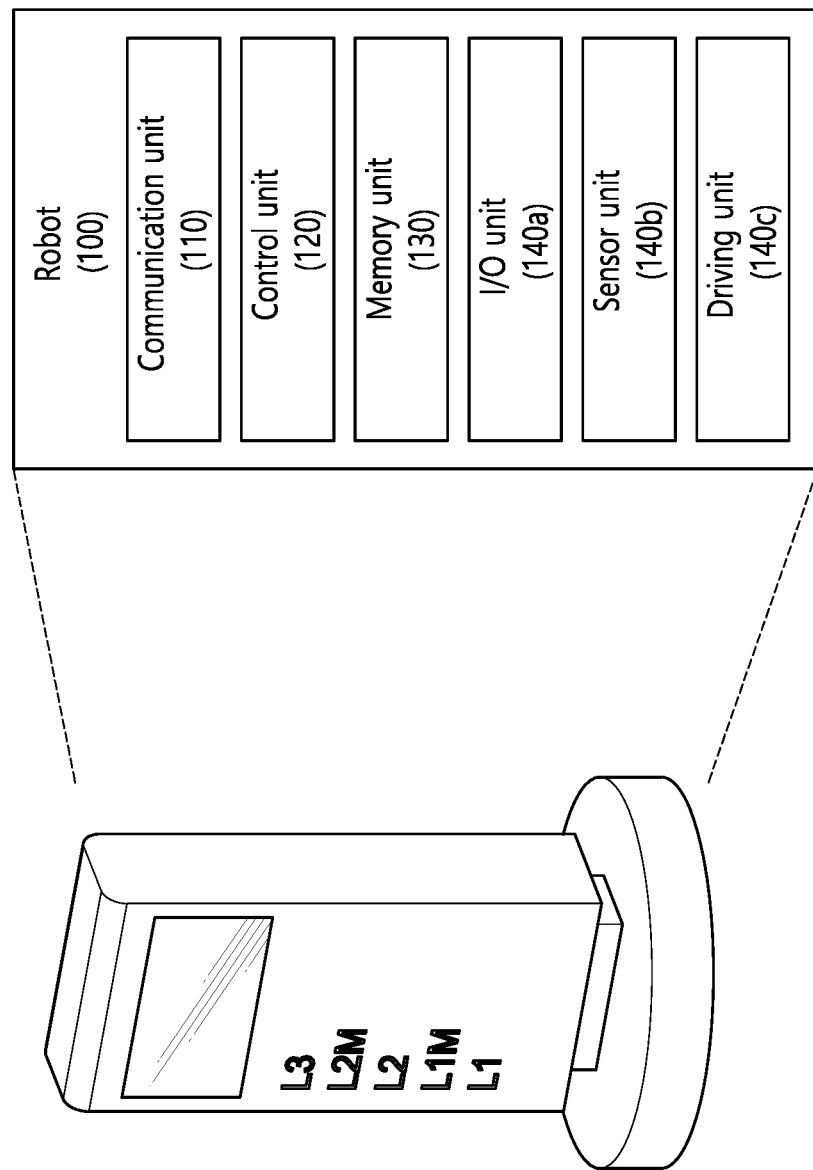
FIG. 55 illustrates a robot applied to the disclosure.

FIG. 55 illustrates a robot applied to the disclosure. The robot may be classified into industrial, medical, home, military, and the like depending on the purpose or field of use.

Referring to FIG. 55, the robot 100 may include a communication unit 110, a control unit 120, a memory unit 130, an input/output unit 140a, a sensor unit 140b, and a driving unit 140c. Herein, blocks 110 to 130/140a to 140c correspond to blocks 110 to 130/140 in FIG. 50.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140a may obtain information from the outside of the robot 100 and may output information to the outside of the robot 100. The input/output unit 140a may include a camera, a microphone, an user input unit, a display unit, a speaker, and/or a haptic module, etc. The sensor unit 140b may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 56:
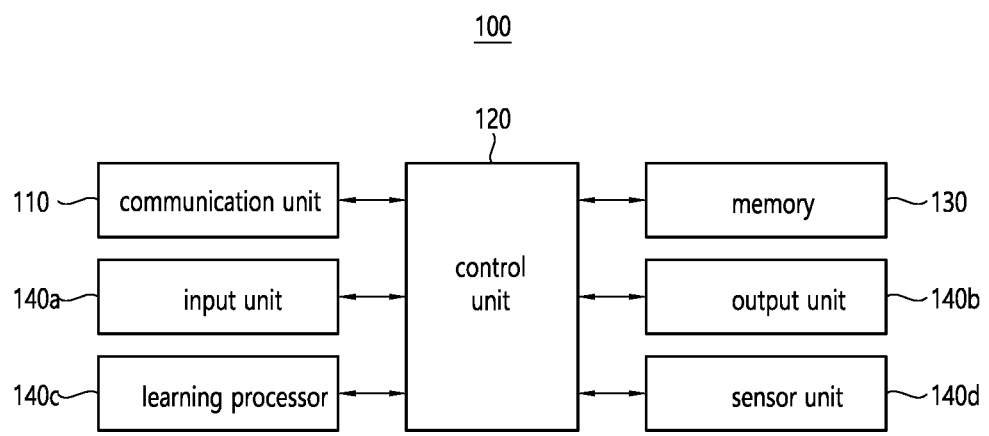
FIG. 56 illustrates an AI device applied to the disclosure.

FIG. 56 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 56, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 50, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 47) or an AI server (e.g., 400 in FIG. 47) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 47). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 47). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method for configuring a type of resource performed by a node in an integrated access and backhaul (IAB) system, the method comprising:
   receiving configuration information for a time domain resource, wherein the time domain resource includes a first region and a second region; and
   configuring a type of resource for the time domain resource based on the configuration information,
   wherein the configuration information informs a starting point of the first region, a first duration time of the first region, an end point of the second region, and a second duration time of the second region,
   wherein the configuration information informs whether the first region and the second region are a downlink resource and an uplink resource, or an uplink resource and a downlink resource, in a sequential order,
   wherein the node configures a resource, which is not the first region and the second region in the time domain resource, as a flexible resource,
   wherein the starting point of the first region is different from a starting point of the time domain resource, and
   wherein the end point of the second region is different from an end point of the time domain resource.

2. The method of claim 1, wherein each of the first duration time and the second duration time is defined with a number of slots and a number of symbols.

3. The method of claim 1, wherein the time domain resource is one slot.

4. The method of claim 3, wherein each of the starting point of the first region, the first duration time of the first region, the end point of the second region, and the second duration time of the second region is defined as a unit of symbol.

5. The method of claim 1, wherein the configuration information is information for a distributed unit (DU) of the node.

6. The method of claim 5, wherein the configuration information is DU-specific information or child link-specific information of the DU.

7. The method of claim 1, wherein the configuration information is information for a mobile termination of the node.

8. The method of claim 7, wherein the configuration information is cell-specific information or MT-specific information.

9. The method of claim 1, wherein the node configures a type of availability for the time domain resource based on the configuration information, and
   wherein the type of availability includes a hard resource, a soft resource, and a non-available resource.

10. The method of claim 9, wherein the type of availability is configured in a unit of slot.

11. The method of claim 1, wherein the configuration information is transmitted by a donor node of the node.

12. The method of claim 1, wherein the configuration information is transmitted through radio resource control (RRC) signaling or F1 application protocol (F1AP) signaling.

13. A node comprising:
   one or more memories storing instructions;
   one or more transceivers; and
   one or more processors connecting the one or more memories with the one or more transceivers, wherein the one or more processors, by executing the instruction, are configured to perform:

receiving configuration information for a time domain resource, wherein the time domain resource includes a first region and a second region; and configuring a type of resource for the time domain resource based on the configuration information, wherein the configuration information informs a starting point of the first region, a first duration time of the first region, an end point of the second region, and a second duration time of the second region, wherein the configuration information informs whether the first region and the second region are a downlink resource and an uplink resource, or an uplink resource and a downlink resource, in a sequential order, wherein the node configures a resource, which is not the first region and the second region in the time domain resource, as a flexible resource, wherein the starting point of the first region is different from a starting point of the time domain resource, and wherein the end point of the second region is different from an end point of the time domain resource.

14. The node of claim 13, wherein the node communicates with at least one of a mobile terminal, a network, and an autonomous driving vehicle except the node.

15. The node of claim 13, wherein the node is a base station or a user equipment.

16. An apparatus configured to control a node, comprising:

one or more processors; and one or more memories workably connected to the one or more processors and store instructions, wherein the one or more processors, by executing the instruction, are configured to perform:

receiving configuration information for a time domain resource, wherein the time domain resource includes a first region and a second region; and configuring a type of resource for the time domain resource based on the configuration information, wherein the configuration information informs a starting point of the first region, a first duration time of the first region, an end point of the second region, and a second duration time of the second region, wherein the configuration information informs whether the first region and the second region are a downlink resource and an uplink resource, or an uplink resource and a downlink resource, in a sequential order, wherein the node configures a resource, which is not the first region and the second region in the time domain resource, as a flexible resource, wherein the starting point of the first region is different from a starting point of the time domain resource, and wherein the end point of the second region is different from an end point of the time domain resource.

* * * * *